(12) United States Patent
Tsukada et al.

(10) Patent No.: US 7,086,281 B2
(45) Date of Patent: Aug. 8, 2006

(54) DETECTOR OF LIQUID CONSUMPTION CONDITION

(75) Inventors: Kenji Tsukada, Nagano-Ken (JP); Munehide Kanaya, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/798,409

(22) Filed: Mar. 12, 2004

(65) Prior Publication Data
US 2004/0168514 A1    Sep. 2, 2004

Related U.S. Application Data

(62) Division of application No. 09/917,217, filed on Jul. 30, 2001, now Pat. No. 6,729,184.

(30) Foreign Application Priority Data

Jul. 28, 2000 (JP) .............................. 2000-229435
Nov. 21, 2000 (JP) .............................. 2000-354802

(51) Int. Cl.
   *G01F 23/28* (2006.01)
(52) U.S. Cl. ........................ 73/290 V; 347/7; 347/68
(58) Field of Classification Search .............. 73/290 V, 73/290 R; 347/7, 68
See application file for complete search history.

(56) References Cited

U.S. PATENT DOCUMENTS

| | | | |
|---|---|---|---|
| 3,110,890 A | * | 11/1963 | Westcott et al. ............ 340/621 |
| 3,220,258 A | * | 11/1965 | Robert ..................... 73/290 R |
| 3,394,589 A | | 7/1968 | Tomioka |
| 3,703,693 A | | 11/1972 | Levinn |
| 3,832,900 A | | 9/1974 | Ross |
| 3,889,247 A | | 6/1975 | Voll |
| 4,008,612 A | | 2/1977 | Nagaoka et al. |
| 4,107,994 A | * | 8/1978 | Sogo ....................... 73/290 V |
| 4,196,625 A | | 4/1980 | Kern |
| 4,310,957 A | | 1/1982 | Sachs |
| 4,329,875 A | * | 5/1982 | Nolting et al. ............ 73/290 V |
| 4,403,227 A | | 9/1983 | Bertschy et al. |
| 4,419,677 A | | 12/1983 | Kasugayama et al. |

(Continued)

FOREIGN PATENT DOCUMENTS

CN   1274645 A   11/2000

(Continued)

OTHER PUBLICATIONS

Patent Abstracts of Japan, Publication NO. 02034353; Feb. 5, 1990; Canon, Inc.

(Continued)

*Primary Examiner*—Hezron Williams
*Assistant Examiner*—Rose M. Miller
(74) *Attorney, Agent, or Firm*—Sughrue Mion, PLLC

(57) ABSTRACT

A detector of liquid consumption condition includes first and second vibrating parts that can vibrate relatively to a containing space that can be filled and refilled with a liquid. At least a portion of the first and second vibrating parts are exposed to the containing space. Each of the vibrating parts are caused to vibrate by piezoelectric devices based on a driving signal and can generate a counter electromotive force signal by a vibration of the vibrating parts. A liquid consumption condition detecting part can detect a liquid consumption condition, based on the counter electromotive force signal from at least one of the piezoelectric devices. The containing space can contains a predetermined volume of the liquid, and the first vibrating part is placed near a surface of the liquid at a first level, and the second part is placed near a surface of the liquid at a second level.

6 Claims, 37 Drawing Sheets

U.S. PATENT DOCUMENTS

| | | | |
|---|---|---|---|
| 4,479,982 A | 10/1984 | Nilsson et al. | |
| 4,570,482 A | 2/1986 | Murata et al. | |
| 4,594,891 A * | 6/1986 | Benz et al. | 73/290 V |
| 4,604,633 A | 8/1986 | Kimura et al. | |
| 4,636,814 A | 1/1987 | Terasawa | |
| 4,677,448 A | 6/1987 | Mizusawa et al. | |
| 4,703,652 A | 11/1987 | Itoh et al. | |
| 4,770,038 A | 9/1988 | Zuckerwar et al. | |
| 4,796,782 A | 1/1989 | Wales et al. | |
| 4,811,595 A | 3/1989 | Marciniak et al. | |
| 4,853,718 A | 8/1989 | El Hatem et al. | |
| 4,935,751 A | 6/1990 | Hamlin | |
| 4,977,413 A | 12/1990 | Yamanaka et al. | |
| 4,984,449 A | 1/1991 | Caldwell et al. | |
| 4,984,457 A | 1/1991 | Morris | |
| 5,035,140 A * | 7/1991 | Daniels et al. | 73/290 V |
| 5,068,836 A | 11/1991 | Steel | |
| 5,132,711 A | 7/1992 | Shinada et al. | |
| 5,179,389 A | 1/1993 | Arai et al. | |
| 5,233,369 A | 8/1993 | Carlotta et al. | |
| 5,247,832 A * | 9/1993 | Umezawa et al. | 73/290 V |
| 5,264,831 A * | 11/1993 | Pfeiffer | 340/621 |
| 5,315,317 A | 5/1994 | Terasawa et al. | |
| 5,319,973 A | 6/1994 | Crayton et al. | |
| 5,353,631 A | 10/1994 | Woringer et al. | |
| 5,410,518 A | 4/1995 | Birkett | |
| 5,463,377 A | 10/1995 | Kronberg | |
| 5,473,353 A | 12/1995 | Soucemarianadin et al. | |
| 5,506,611 A | 4/1996 | Ujita et al. | |
| 5,524,486 A * | 6/1996 | Hermann | 73/290 V |
| 5,583,544 A | 12/1996 | Stamer et al. | |
| 5,586,085 A | 12/1996 | Lichte | |
| 5,610,635 A | 3/1997 | Murray et al. | |
| 5,616,929 A | 4/1997 | Hara | |
| 5,619,238 A | 4/1997 | Higuma et al. | |
| 5,675,367 A | 10/1997 | Scheffelin et al. | |
| 5,689,288 A | 11/1997 | Wimmer et al. | |
| 5,694,156 A | 12/1997 | Hoisington et al. | |
| 5,697,248 A | 12/1997 | Brown | |
| 5,712,667 A | 1/1998 | Sato | |
| 5,737,963 A | 4/1998 | Eckert et al. | |
| 5,747,689 A | 5/1998 | Hampo et al. | |
| 5,774,136 A | 6/1998 | Barbehenn et al. | |
| 5,788,388 A | 8/1998 | Cowger et al. | |
| 5,788,819 A | 8/1998 | Onishi et al. | |
| 5,793,705 A | 8/1998 | Gazis et al. | |
| 5,835,817 A | 11/1998 | Bullock et al. | |
| 5,841,454 A | 11/1998 | Hall et al. | |
| 5,877,997 A | 3/1999 | Fell | |
| 5,900,888 A | 5/1999 | Kurosawa | |
| 5,949,447 A | 9/1999 | Arai et al. | |
| 5,975,102 A | 11/1999 | Schalk | |
| 6,003,966 A | 12/1999 | Ahn | |
| 6,007,190 A | 12/1999 | Murray et al. | |
| 6,012,793 A | 1/2000 | Haigo | |
| 6,012,794 A | 1/2000 | Nakano et al. | |
| 6,044,694 A | 4/2000 | Anderson et al. | |
| 6,050,669 A | 4/2000 | Yano et al. | |
| 6,089,686 A | 7/2000 | Thornton et al. | |
| 6,089,688 A | 7/2000 | Froger et al. | |
| 6,155,664 A | 12/2000 | Cook | |
| 6,164,744 A | 12/2000 | Froger et al. | |
| 6,254,212 B1 | 7/2001 | Coudray et al. | |
| 6,302,527 B1 | 10/2001 | Walker | |
| 6,312,074 B1 | 11/2001 | Walker | |
| 6,312,106 B1 | 11/2001 | Walker | |
| 6,312,115 B1 | 11/2001 | Hara et al. | |
| 6,347,853 B1 | 2/2002 | Kato | |
| 6,361,136 B1 | 3/2002 | Watanabe et al. | |
| 6,390,590 B1 | 5/2002 | Hansburg | |
| 6,416,152 B1 | 7/2002 | Matsuzaki et al. | |
| 6,435,638 B1 | 8/2002 | Wilson et al. | |
| 6,438,500 B1 | 8/2002 | Froger et al. | |
| 6,470,744 B1 * | 10/2002 | Usui et al. | 73/290 R |
| 6,536,861 B1 * | 3/2003 | Usui et al. | 347/7 |
| 6,799,820 B1 * | 10/2004 | Usui et al. | 347/7 |
| 2002/0012015 A1 | 1/2002 | Tsukada et al. | |
| 2002/0015068 A1 | 2/2002 | Tsukada et al. | |
| 2002/0015084 A1 | 2/2002 | Tsukada et al. | |
| 2002/0105555 A1 | 8/2002 | Tsukada et al. | |
| 2002/0135623 A1 | 9/2002 | Tsukada et al. | |
| 2002/0170353 A1 | 11/2002 | Usui et al. | |
| 2003/0043216 A1 | 3/2003 | Usui et al. | |
| 2003/0071862 A1 | 4/2003 | Tsukada et al. | |
| 2003/0117450 A1 | 6/2003 | Usui et al. | |
| 2003/0117451 A1 | 6/2003 | Usui et al. | |
| 2003/0140694 A1 | 7/2003 | Usui et al. | |

FOREIGN PATENT DOCUMENTS

| | | |
|---|---|---|
| EP | 0 553 535 | 8/1993 |
| EP | 0 660 092 | 6/1995 |
| EP | 0 676 624 | 10/1995 |
| EP | 0 684 136 A2 | 11/1995 |
| EP | 0 684 136 A3 | 11/1995 |
| EP | 0 803 364 | 10/1997 |
| EP | 0 853 236 | 7/1998 |
| EP | 0 860 284 A2 | 8/1998 |
| EP | 0 873 873 | 10/1998 |
| EP | 0 881 079 A2 | 12/1998 |
| EP | 0 885 731 A2 | 12/1998 |
| EP | 0 956 964 A2 | 11/1999 |
| EP | 1 055 520 A1 | 11/2000 |
| EP | 1 088 668 | 4/2001 |
| EP | 0 803 365 B1 | 7/2001 |
| FR | 2 572 519 A1 | 5/1986 |
| FR | 2572519 A1 * | 5/1986 |
| FR | 002572519 A1 | 5/1986 |
| GB | 2 304 898 | 3/1997 |
| GB | 2321107 A | 7/1998 |
| JP | 56-061421 | 10/1979 |
| JP | 56-39413 A | 4/1981 |
| JP | 56-039414 | 4/1981 |
| JP | 56-053078 | 5/1981 |
| JP | 56-061421 | 5/1981 |
| JP | 58-201027 | 11/1983 |
| JP | 58-201027 A | 11/1983 |
| JP | 58-205820 | 11/1983 |
| JP | 58-205820 A | 11/1983 |
| JP | 58205820 A * | 11/1983 |
| JP | 59-052422 | 3/1984 |
| JP | 60-4820 | 11/1985 |
| JP | 61-137750 A | 6/1986 |
| JP | 62-95225 | 5/1987 |
| JP | 62-95225 A | 5/1987 |
| JP | 62095225 A * | 5/1987 |
| JP | 62-184856 | 8/1987 |
| JP | 63247047 | 10/1988 |
| JP | 63-295266 | 12/1988 |
| JP | 64-067530 | 3/1989 |
| JP | 02-034353 | 2/1990 |
| JP | 03-036037 | 2/1991 |
| JP | 03-067657 | 3/1991 |
| JP | 03-169642 | 7/1991 |
| JP | 03-211907 | 9/1991 |
| JP | 03-218847 | 9/1991 |
| JP | 04135862 | 5/1992 |
| JP | 04-234670 | 8/1992 |
| JP | 05-025325 | 2/1993 |
| JP | 05-254142 A | 10/1993 |
| JP | 05-318757 | 12/1993 |
| JP | 06-155762 | 6/1994 |
| JP | 06297726 | 10/1994 |
| JP | 07-081290 | 3/1995 |

| | | |
|---|---|---|
| JP | 07-137291 | 5/1995 |
| JP | 07137276 | 5/1995 |
| JP | 08-034123 | 2/1996 |
| JP | 09-020013 | 1/1997 |
| JP | 09-029989 A | 2/1997 |
| JP | 09-029991 | 2/1997 |
| JP | 09039263 | 2/1997 |
| JP | 09-220216 | 8/1997 |
| JP | 09-267488 | 10/1997 |
| JP | 09-286121 | 11/1997 |
| JP | 10026549 | 1/1998 |
| JP | 10-038662 | 2/1998 |
| JP | 10-151753 | 6/1998 |
| JP | 10-175312 | 6/1998 |
| JP | 10-305590 | 11/1998 |
| JP | 10-305590 A | 11/1998 |
| JP | 10305590 A * | 11/1998 |
| JP | 10-323993 | 12/1998 |
| JP | 10-323997 | 12/1998 |
| JP | 11-010909 | 1/1999 |
| JP | 11-020162 | 1/1999 |
| JP | 11-020186 | 1/1999 |
| JP | 11-048490 | 2/1999 |
| JP | 11-277760 | 10/1999 |
| JP | 11-334107 | 12/1999 |
| JP | 2000-43287 A | 2/2000 |
| JP | 2000-190523 | 7/2000 |
| JP | 2000318183 | 11/2000 |
| JP | 2001-146030 | 5/2001 |
| WO | WO 98/09139 * | 3/1998 |
| WO | WO 98/09139 A1 | 3/1998 |
| WO | WO 98/31548 | 7/1998 |
| WO | WO 99/42293 | 8/1999 |
| WO | WO 99/42293 A1 | 8/1999 |

OTHER PUBLICATIONS

Patent Abstracts of Japan, Publication NO. 07081290; Mar. 28, 1995; Pentel KK.

US 5,635,961, 06/1997, Sato (withdrawn)

* cited by examiner

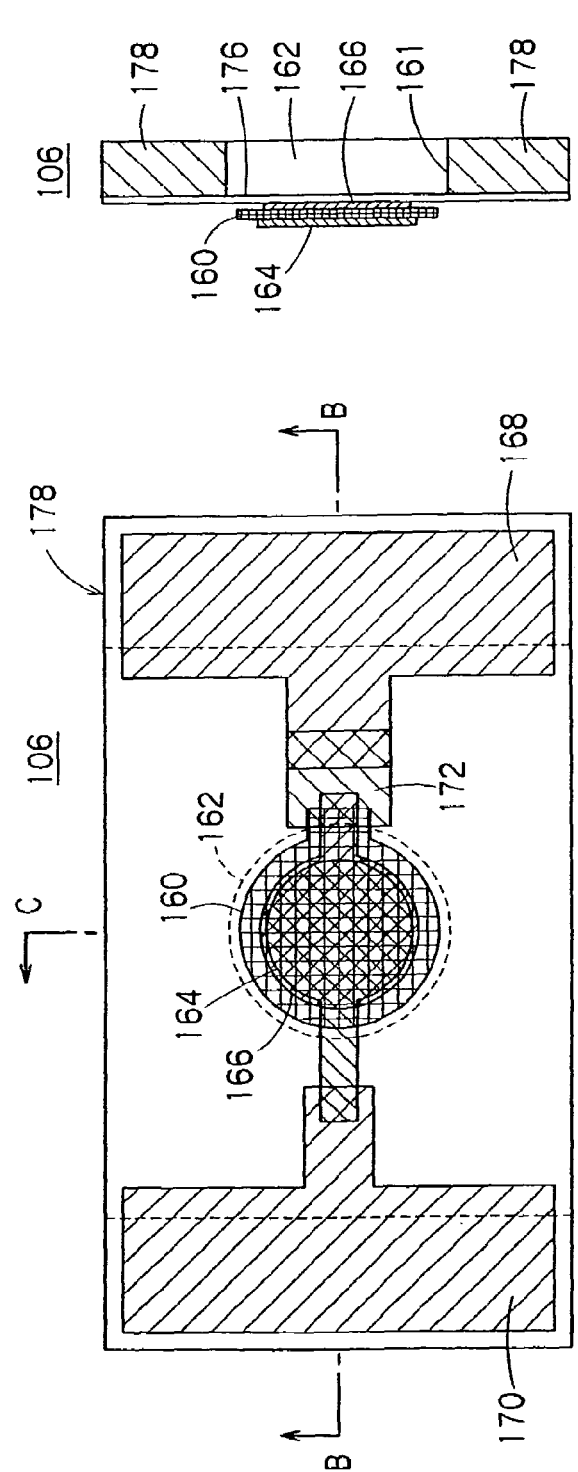
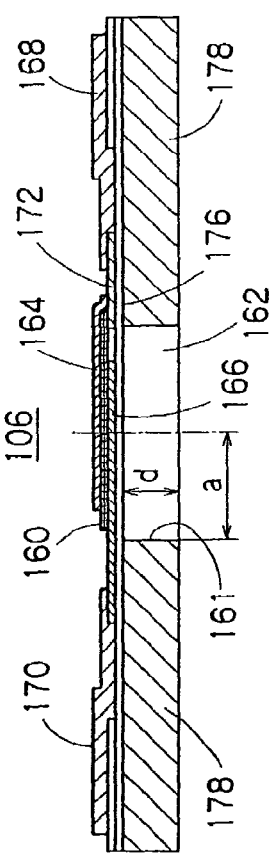
FIG. 1A
FIG. 1B
FIG. 1C

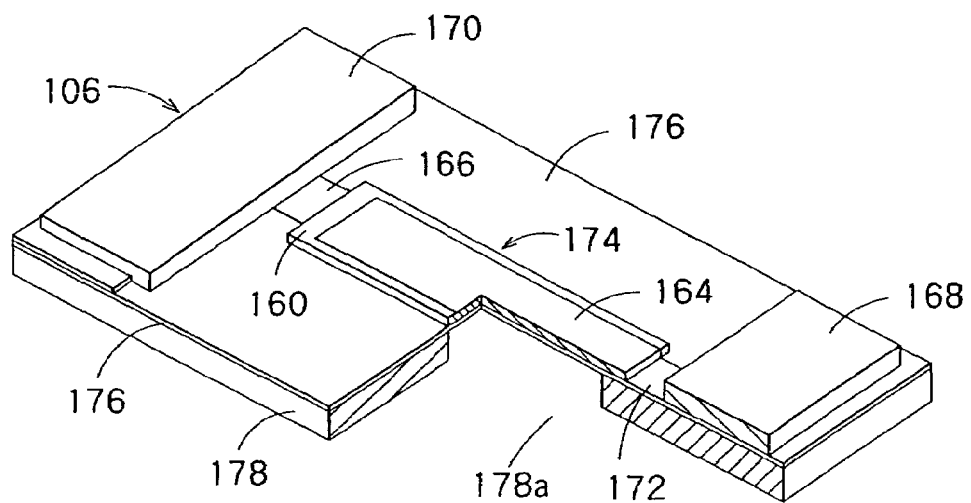
F I G. 19
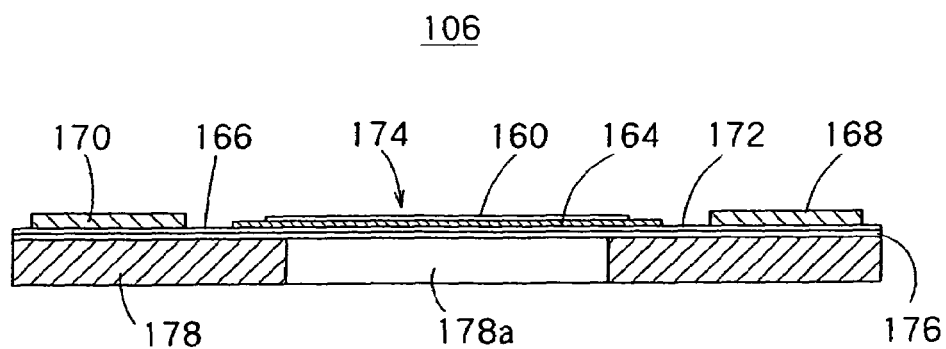
F I G. 20

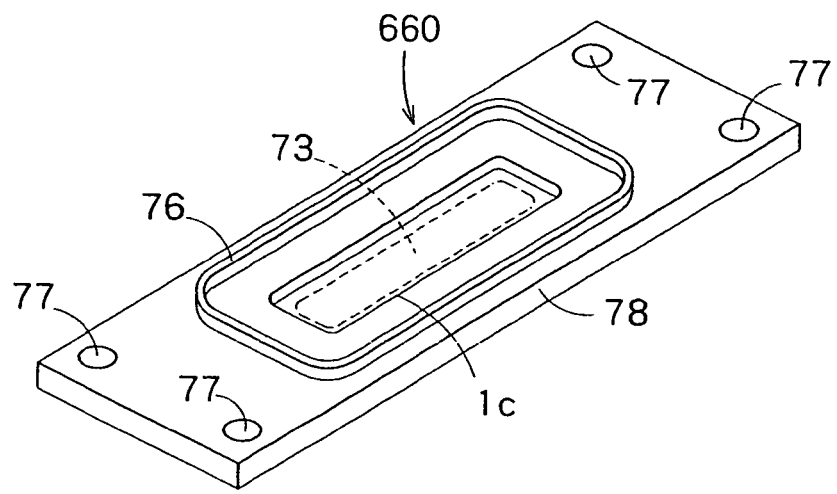
F I G. 24
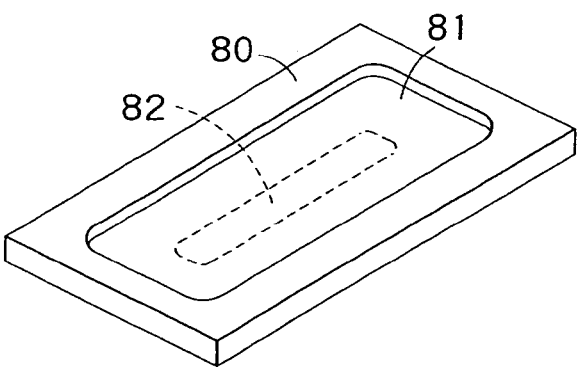
F I G. 25A
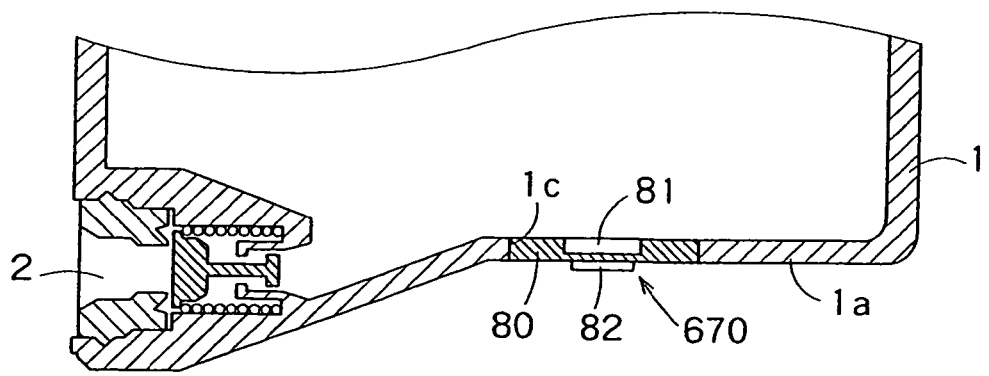
F I G. 25B

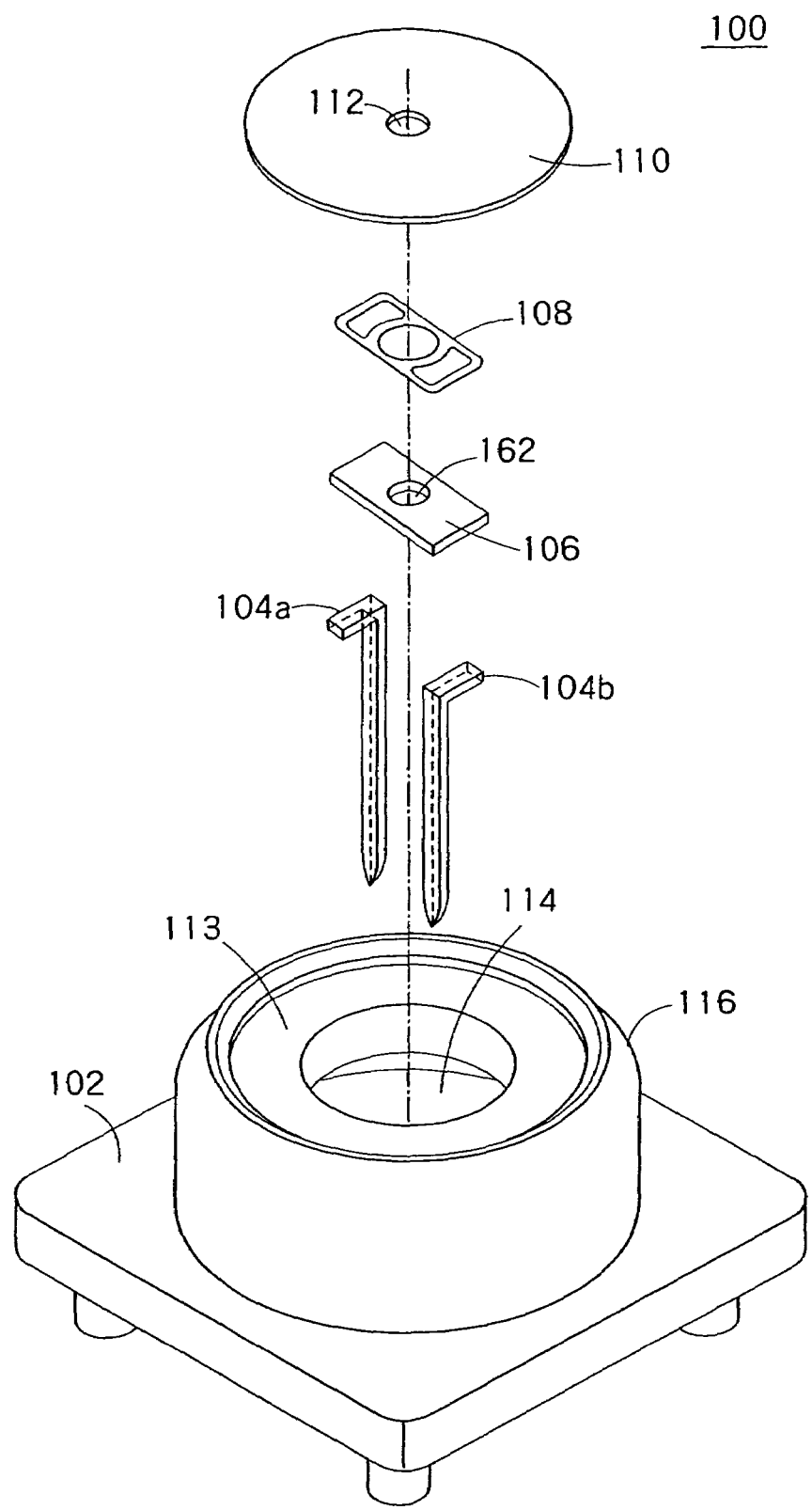
F I G. 27

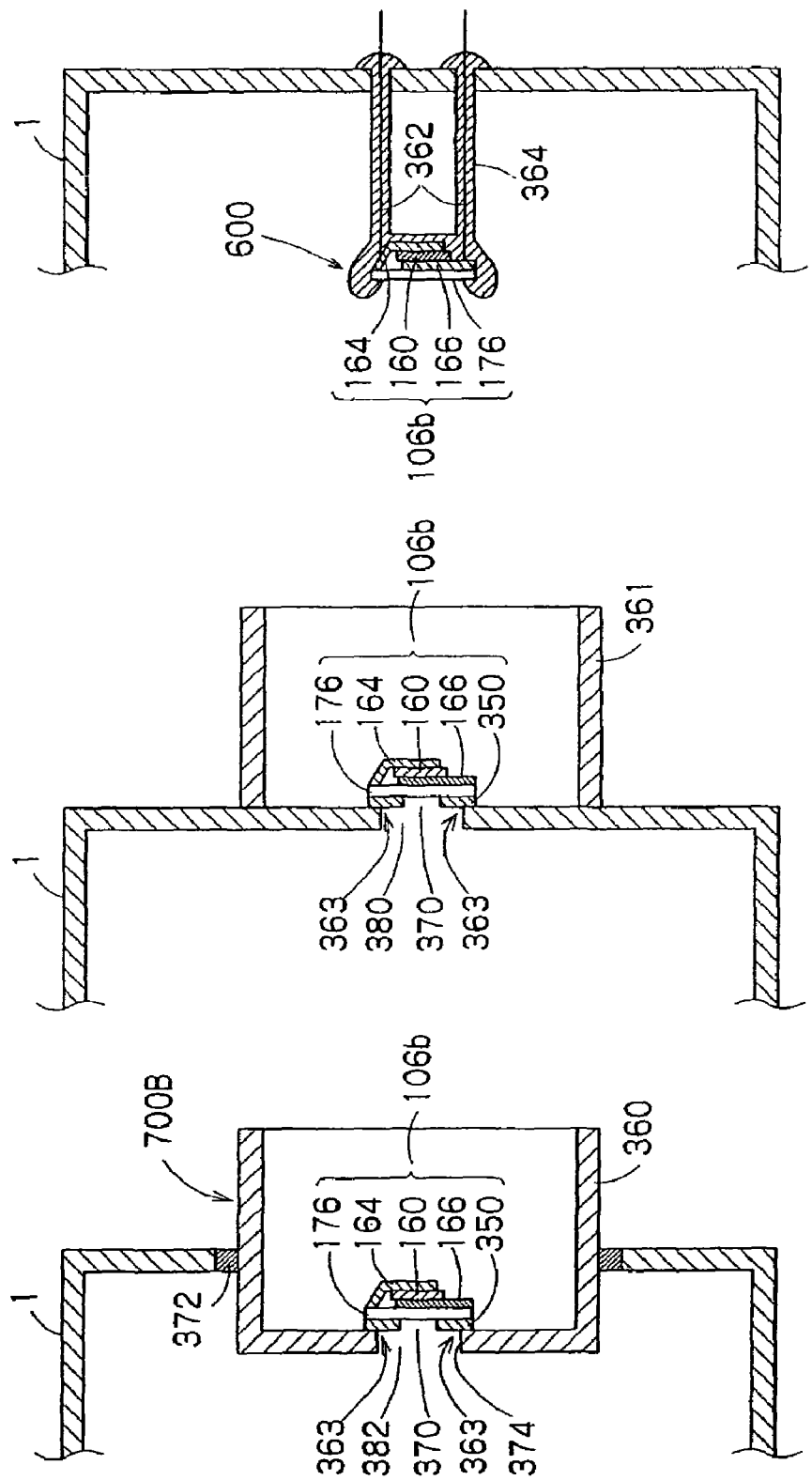

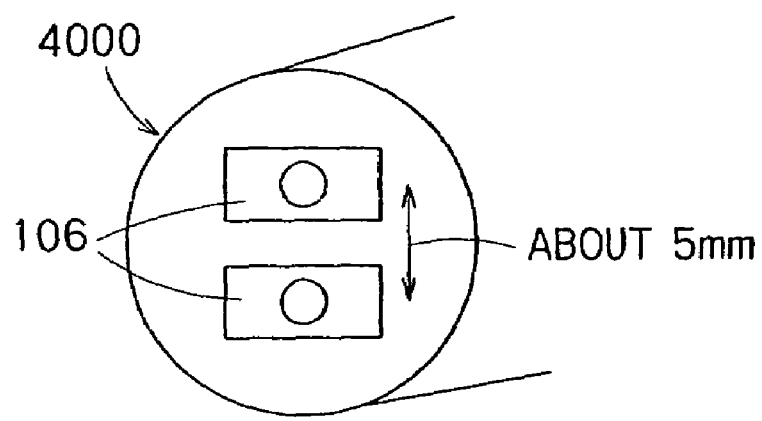
F I G. 34
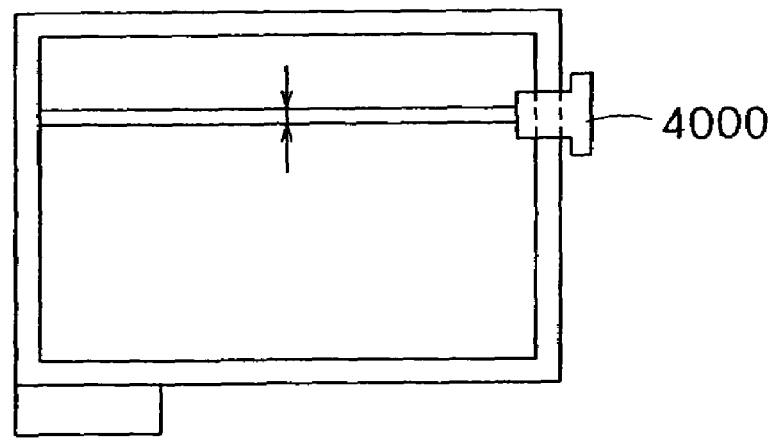
F I G. 35

NOT LIQUID-PHILIC MATERIAL

LIQUID- PHILIC MATERIAL

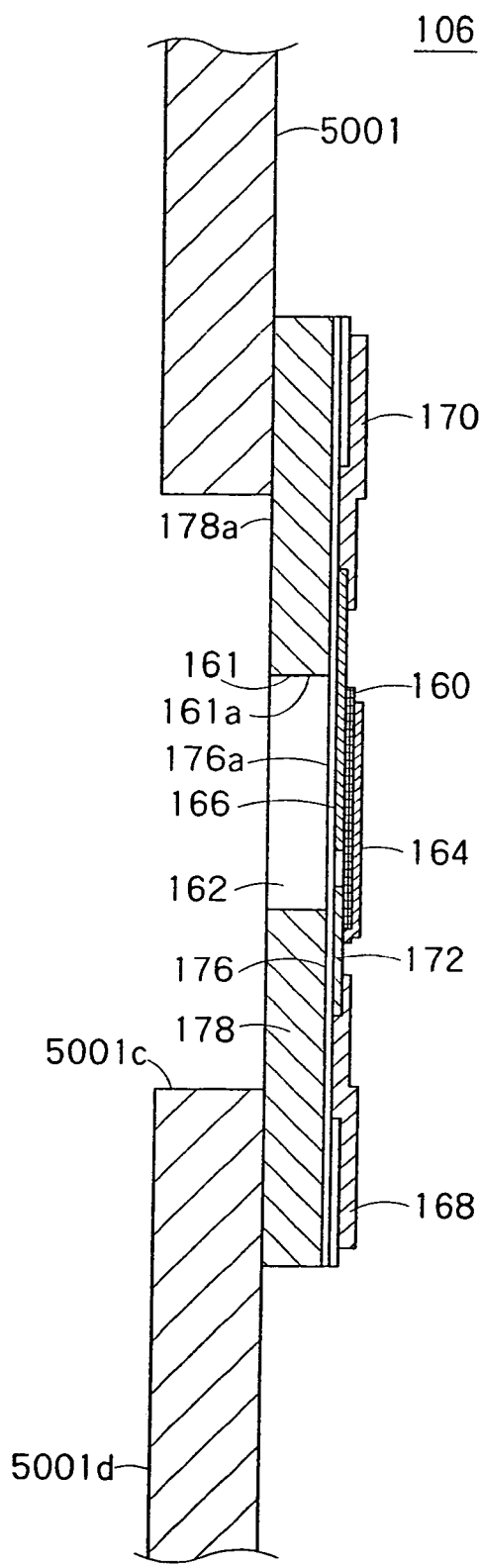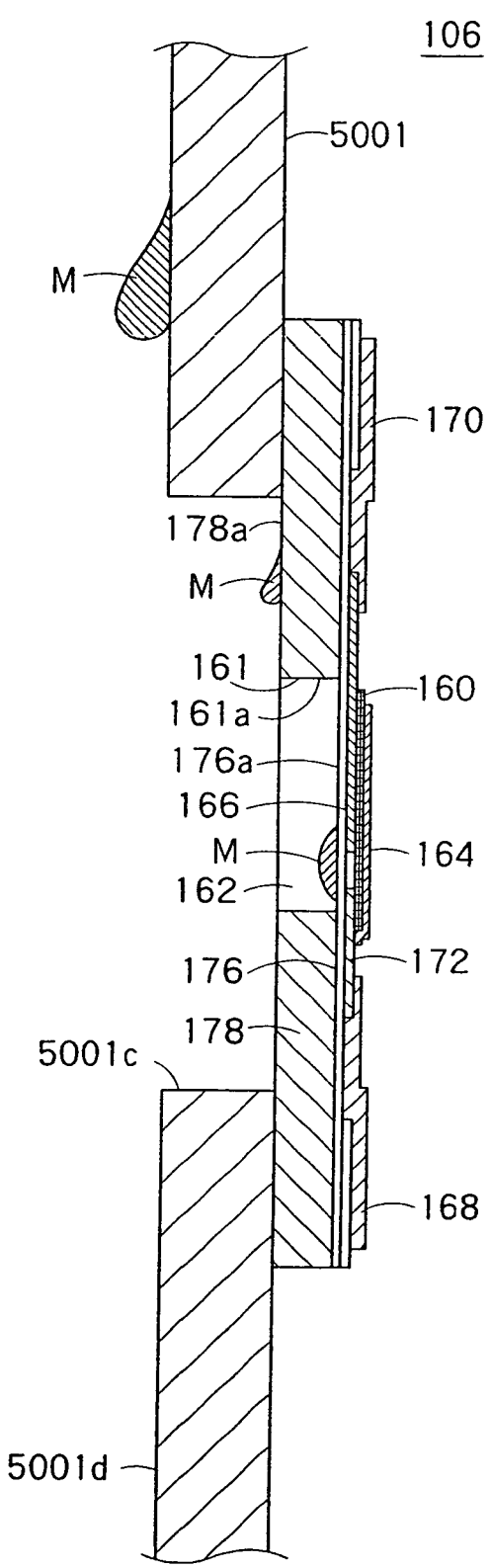
F I G. 39A　　　　F I G. 39B

DETECTOR OF LIQUID CONSUMPTION CONDITION

This is a divisional of application Ser. No. 09/917,217 filed Jul. 30, 2001, which issued as U.S. Pat. No. 6,729,184 on May 4, 2004; the disclosure of which is incorporated herein by reference.

BACKGROUND OF THE INVENTION

1. Field of the Invention

The present invention relates to a detector of a liquid consumption condition that can detect a consumption condition of a liquid such as an ink, by detecting changes in an acoustic impedance, particularly by detecting changes in a resonance frequency.

2. Description of the Related Art

In an ink jet recording apparatus, an ink jet recording head having: a pressure generating means that can pressurize a pressure generating chamber; and a nozzle that can jet pressurized ink as an ink drop, is mounted on a carriage. In the ink jet recording apparatus, ink in an ink tank continues to be fed to the recording head via a flow path, so as to permit continuous printing. The ink tank is generally structured as a removable cartridge that can be simply exchanged by a user when the ink is consumed.

Conventionally, as an ink consumption control method of an ink cartridge, a method for totalizing the number of ink drops jetted by the recording head and the ink amount sucked at the maintenance step by means of some software and controlling the ink consumption from calculation; and a method for attaching electrodes for detecting a liquid level to the ink cartridge, detecting the point of time when the ink is actually consumed by a predetermined amount, thereby controlling the ink consumption; are known.

The method for totalizing the number of jetted ink drops and the sucked ink amount by the software and controlling the ink consumption from calculation has an advantage in cost, because the method needs no special detector. However, in the method, some errors may be caused by difference of printing manners that can be selected by the user. In addition, larger errors may be generated when the same cartridge is refitted. Furthermore, pressure in the ink cartridge and ink viscosity may be varied with a use environment (for example, extremely high or low room temperature), or an elapsed time after opening the ink cartridge, so that unnegligible errors may be caused between the ink consumption from calculation and the actual consumption.

On the other hand, the method of controlling the point of time of ink consumption by the electrodes can detect the actual amount of ink consumption at a certain point, so that it can control the residual quantity of ink with high reliability. However, the ink has to be conductive so as to detect the ink level, accordingly the kind of ink to be used (detected) is limited. Further, a problem arises that the liquid tight structure between the electrodes and the ink cartridge is complicated. Furthermore, as a material of the electrodes, a noble metal which is enough conductive and highly corrosion-resistant is ordinarily used, so that a problem also arises that manufacturing cost of an ink cartridge is increased. Furthermore, two electrodes must be mounted, so that many manufacturing steps are required and the manufacturing cost is more increased.

An object of the present invention is to provide a detector of liquid consumption condition that can effectively make good use of the detection of the liquid consumption condition.

SUMMARY OF THE INVENTION

The invention is a detector of liquid consumption condition comprising: a vibrating part that can vibrate relatively to a containing space that can be filled and refilled with a liquid, at least a portion of the vibrating part being exposed to the containing space; a piezoelectric device that can cause the vibrating part to vibrate based on a driving signal and that can generate a counter electromotive force signal by a vibration of the vibrating part; and a liquid consumption condition detecting part that can detect a liquid consumption condition based on the counter electromotive force signal from the piezoelectric device; wherein the containing space can contain only a predetermined volume of the liquid, and the vibrating part is provided in a vicinity of a liquid surface in the containing space when the containing space contains the predetermined volume of the liquid.

According to the feature, a liquid-full condition of the containing space can be detected highly reliably. This feature is very effective for a liquid replenishment operation to fill the containing space to a liquid-full condition.

Alternatively, the invention is a detector of liquid consumption condition comprising: a vibrating part that can vibrate relatively to a containing space that can be filled and refilled with a liquid, at least a portion of the vibrating part being exposed to the containing space; a piezoelectric device that can cause the vibrating part to vibrate based on a driving signal and that can generate a counter electromotive force signal by a vibration of the vibrating part; a second vibrating part that can vibrate relatively to the containing space, at least a portion of the second vibrating part being exposed to the containing space; a second piezoelectric device that can cause the second vibrating part to vibrate based on a driving signal and that can generate a counter electromotive force signal by a vibration of the second vibrating part; and a liquid consumption condition detecting part that can detect a liquid consumption condition based on the counter electromotive force signal from at least one of the piezoelectric devices; wherein the containing space can contain only a predetermined volume of the liquid, the vibrating part and the piezoelectric device are provided in a vicinity of a liquid surface in the containing space when the containing space contains the predetermined volume of the liquid, and the second vibrating part and the second piezoelectric device are provided in a vicinity of a liquid surface in the containing space when the liquid is exhausted from the containing space.

According to the feature, a liquid-full condition and a liquid-end condition of the containing space can be detected highly reliably. This feature is very effective for a liquid replenishment operation to fill the containing space to a liquid-full condition after a liquid-end condition has been detected.

Alternatively, the invention is a detector of liquid consumption condition comprising: a vibrating part that can vibrate relatively to a containing space that can be filled and refilled with a liquid, at least a portion of the vibrating part being exposed to the containing space; a piezoelectric device that can cause the vibrating part to vibrate based on a driving signal and that can generate a counter electromotive force signal by a vibration of the vibrating part; a second vibrating part that can vibrate relatively to the containing space, at least a portion of the second vibrating part being exposed to the containing space; a second piezoelectric device that can cause the second vibrating part to vibrate based on a driving signal and that can generate a counter electromotive force signal by a vibration of the second vibrating part; and a liquid consumption condition detecting part that can detect a liquid consumption condition based on the counter electromotive force signal from at least one of the piezoelectric devices; wherein the vibrating part and the piezoelectric device are provided in a vicinity of and higher than a predetermined level in the containing space, and the second vibrating part and the second piezoelectric device are provided in a vicinity of and lower than the predetermined level in the containing space.

According to the feature, it can be detected highly reliably whether a liquid surface level in the containing space exists in a predetermined area defined by the two vibrating parts or not. This feature is very effective for maintaining a liquid surface level at a substantially fixed point to maintain a liquid-head pressure at a substantially fixed point.

For example, the liquid consumption condition detecting part may be adapted to measure a frequency of the counter electromotive force signal. Thus, the liquid consumption condition can be detected simply and precisely because the frequency of the counter electromotive force signal corresponds to the resonance frequency of the object or objects in the containing space.

In detail, the liquid consumption condition detecting part may have a counter that can count the number of vibrations in the counter electromotive force signal for a predetermined time, and the liquid consumption condition detecting part may be adapted to measure the frequency of the counter electromotive force signal based on the number counted by the counter.

Alternatively, the liquid consumption condition detecting part may have a clock-counter that can measure a time for which the counter electromotive force signal vibrates a predetermined number of times, and the liquid consumption condition detecting part may be adapted to measure the frequency of the counter electromotive force signal based on the time measured by the clock-counter.

In addition, preferably, the portion of the vibrating part exposed to the containing space has a symmetric shape as seen from a side of the containing space. Furthermore, preferably, the piezoelectric device is fixed to a side of the vibrating part opposite to the containing space at a substantially central position of the portion of the vibrating part exposed to the containing space.

In particular, it is very preferable that the portion of the vibrating part exposed to the containing space has a circular shape as seen from the side of the containing space.

In addition, preferably, the piezoelectric device is adapted to vibrate in a direction substantially perpendicular to the portion of the vibrating part exposed to the containing space.

In addition, preferably, the portion of the vibrating part exposed to the containing space has a liquid-philic characteristic with respect to the liquid. In the case, it is not easy for the liquid to stick the portion, so that a mistake in detection, which may be caused by sticking of the liquid to the portion, can be prevented.

In addition, preferably, a cavity part having a liquid-philic characteristic with respect to the liquid is provided in such a manner that the cavity part surrounds the portion of the vibrating part exposed to the containing space. In the case, a condition wherein the liquid exists in the cavity and doesn't exist outside the cavity can be set as a threshold condition for judging the liquid consumption condition. In the case, precision of the judgement of the liquid consumption condition can be improved.

A liquid container (for example, an ink cartridge) including a detector of liquid consumption condition with at least one above feature and a wall part defining the containing space for containing the liquid: should be protected by the application. In addition, a liquid container without the liquid consumption condition detecting part (a liquid container wherein the liquid consumption condition detecting part is arranged outside the liquid container) should be protected by the application as well.

That is, it is intended to protect a liquid container comprising: a wall part defining a containing space that can contain a liquid in a refillable manner; a vibrating part that can vibrate relatively to the containing space, at least a portion of the vibrating part being exposed to the containing space; and a piezoelectric device that can cause the vibrating part to vibrate based on a driving signal and that can generate a counter electromotive force signal by a vibration of the vibrating part; wherein the containing space can contain only a predetermined volume of the liquid, and the vibrating part is provided in a vicinity of a liquid surface in the containing space when the containing space contains the predetermined volume of the liquid.

It is also intended to protect a liquid container comprising: a wall part defining a containing space that can contain a liquid in a refillable manner; a vibrating part that can vibrate relatively to the containing space, at least a portion of the vibrating part being exposed to the containing space; a piezoelectric device that can cause the vibrating part to vibrate based on a driving signal and that can generate a counter electromotive force signal by a vibration of the vibrating part; a second vibrating part that can vibrate relatively to the containing space, at least a portion of the second vibrating part being exposed to the containing space; and a second piezoelectric device that can cause the second vibrating part to vibrate based on a driving signal and that can generate a counter electromotive force signal by a vibration of the second vibrating part; wherein the containing space can contain only a predetermined volume of the liquid, the vibrating part and the piezoelectric device are provided in a vicinity of a liquid surface in the containing space when the containing space contains the predetermined volume of the liquid, and the second vibrating part and the second piezoelectric device are provided in a vicinity of a liquid surface in the containing space when the liquid is exhausted from the containing space.

It is also intended to protect a liquid container comprising: a wall part defining a containing space that can contain a liquid in a refillable manner; a vibrating part that can vibrate relatively to the containing space, at least a portion of the vibrating part being exposed to the containing space; a piezoelectric device that can cause the vibrating part to vibrate based on a driving signal and that can generate a counter electromotive force signal by a vibration of the vibrating part; a second vibrating part that can vibrate relatively to the containing space, at least a portion of the second vibrating part being exposed to the containing space; and a second piezoelectric device that can cause the second vibrating part to vibrate based on a driving signal and that can generate a counter electromotive force signal by a vibration of the second vibrating part; wherein the vibrating part and the piezoelectric device are provided in a vicinity of and higher than a predetermined level in the containing space, and the second vibrating part and the second piezoelectric device are provided in a vicinity of and lower than the predetermined level in the containing space.

The liquid container may further comprise a liquid consumption condition detecting part that can detect a liquid consumption condition based on the counter electromotive force signal from the piezoelectric device.

In the case, preferably, the liquid container may further comprise a storage that can store the liquid consumption condition detected by the liquid consumption condition detecting part.

In addition, preferably, a region of the wall part in a vicinity of the portion of the vibrating part exposed to the containing space has a liquid-philic characteristic with respect to the liquid.

Especially, if a cavity part having a liquid-philic characteristic with respect to the liquid is provided in such a manner that the cavity part surrounds the portion of the vibrating part exposed to the containing space, it is preferable that a region of the wall part adjacent to the cavity part has a liquid-philic characteristic with respect to the liquid. In the case, sticking of the liquid, which may cover the whole cavity, can be prevented.

On the contrary, even if a cavity part having a liquid-philic characteristic with respect to the liquid is provided in such a manner that the cavity part surrounds the portion of the vibrating part exposed to the containing space, it may be preferable that a region of the wall part adjacent to the cavity part has a liquid-phobic characteristic with respect to the liquid, in view of precision of the judgement of the liquid consumption condition.

A method of manufacturing a liquid container having such a liquid-philic portion may comprise: a liquid-philic-part forming step of structuring the portion of the vibrating part exposed to the containing space as a part having a liquid-philic characteristic with respect to the liquid; and a mounting step of attaching the liquid consumption condition detecting part to the wall part, after the liquid-philic-part forming step.

Alternatively, a method of manufacturing a liquid container having such a liquid-philic portion may comprise: a mounting step of attaching the liquid consumption condition detecting part to the wall part; and a liquid-philic-part forming step of providing a liquid-philic characteristic with respect to the liquid for the portion of the vibrating part exposed to the containing space, after the mounting step.

A liquid consuming apparatus (for example, an ink-jet recording apparatus) including a liquid container with at least one above feature and a liquid consuming body that can consume the liquid contained in the liquid container, the liquid consuming body being connected to the liquid container: should be protected by the application as well.

In the case, preferably, the liquid consuming apparatus may further comprise: a liquid replenishing unit that can replenish the containing space in the liquid container with the liquid; and a replenishment controller that can control the liquid replenishing unit based on the liquid consumption condition detected by the liquid consumption condition detecting part.

In addition, preferably, the liquid consuming apparatus may further comprise: a controlling circuit that can control a liquid consuming operation of the liquid consuming body, based on the liquid consumption condition detected by the liquid consumption condition detecting part.

Alternatively, preferably, the liquid consuming apparatus may further comprise: a storage that can store the liquid consumption condition detected by the liquid consumption condition detecting part; and a controlling circuit that can control a liquid consuming operation of the liquid consuming body, based on the liquid consumption condition stored by the storage.

Furthermore, a controlling unit that can control a detector of liquid consumption condition with at least one above feature, that can give the driving signal to the piezoelectric device and that can cause the liquid consumption condition detecting part to detect the liquid consumption condition: should be protected by the application as well.

The above controlling unit and one or more components thereof can be materialized by a computer system. A program for materializing the controlling unit or one or more components thereof in the computer system, and a storage medium storing the program capable of being read by a computer, should be protected by the application as well.

The storage medium may be not only a substantial object such as a floppy disk or the like, but also a network for transmitting various signals.

BRIEF DESCRIPTION OF THE DRAWINGS

FIGS. 1A, 1B and 1C are drawings showing details of an actuator 106;

FIG. 19 is a cross sectional view of a portion of the actuator 106 shown in FIG. 18;

FIG. 20 is a cross sectional view of the whole of the actuator 106 shown in FIG. 19;

FIG. 24 is a perspective view of another embodiment of the actuator;

FIGS. 25A and 25B are a perspective view and a cross sectional view of another embodiment of the actuator;

FIG. 27 is an exploded view showing constitution of the module 100 shown in FIG. 26;

FIGS. 33A to 33C show other embodiments of the module;

FIG. 34 is a schematic view of a module with two built-in actuators;

FIG. 35 is a schematic view showing a mounting position of the module of FIG. 34;

FIGS. 39A and 39B are enlarged views of the neighborhood of the actuator;

DESCRIPTION OF THE PREFERRED EMBODIMENTS

The present invention will be explained hereunder with reference to embodiments of the present invention. However, the present invention defined only by claims is not limited to the embodiments described below, and combinations of characteristics explained in the embodiments are not always necessary.

A basic strategy of the present invention is to detect a liquid condition in a liquid container (whether a liquid exists or not, a volume of the liquid, a surface level of the liquid, a kind of the liquid, composition of the liquid, and so on) by using a vibration phenomenon.

Some methods have been developed as concrete methods for detecting a liquid condition in a liquid container by using a vibration phenomenon. For example, there is a method of detecting a kind of medium or a change in condition of the medium in a liquid container: by generating an elastic wave toward an inside of the liquid container by means of an elastic-wave generating means; and by receiving a reflected wave that is reflected by a liquid surface or an opposite wall. There is also a method of detecting a change in acoustic impedance from a vibration characteristic of a vibrating object.

As a method of using the change in the acoustic impedance, there is a method of detecting a resonance frequency or an amplitude of a counter electromotive force waveform as the change in the acoustic impedance: by causing a vibrating part of a piezoelectric device having a piezoelectric member or an actuator to vibrate, and then by measuring the counter electromotive force generated by residual vibration remaining in the vibrating part. Alternatively, there is a method of measuring an impedance characteristic or an admittance characteristic of the liquid by means of a measuring instrument such as an impedance analyzer (for example, a transmission circuit), and measuring a change in a current value or a voltage value, or a change in a frequency of a current value or a voltage value when a vibration is given to the liquid.

Figure 2:
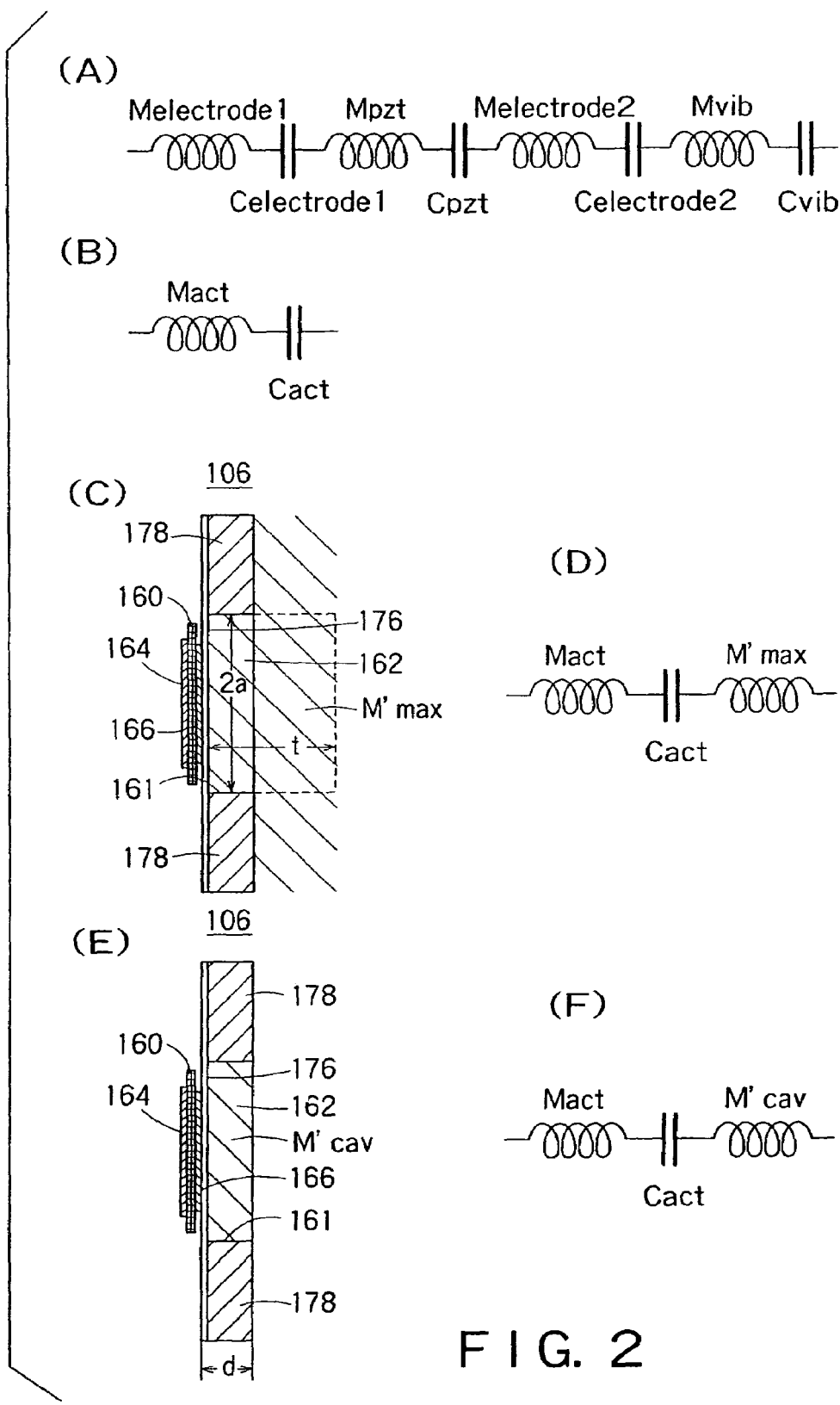
FIG. 2 is a drawing for explaining constitution of the actuator 106 and its periphery, and equivalent circuits thereof.

Then, an operating principle of a piezoelectric device or an actuator will be explained hereunder in detail. FIGS. 1A to 2 show details and equivalent circuits, of an actuator 106 that is an embodiment of the piezoelectric device.

The actuator 106 is used for a method of detecting at least changes in an acoustic impedance and detecting the consumption condition of a liquid in a liquid container. Particularly, the actuator 106 is used for a method of detecting a resonance frequency by residual vibration, thereby detecting changes in the acoustic impedance, and detecting the consumption condition of a liquid in a liquid container.

FIG. 1A is an enlarged plan view of the actuator 106. FIG. 1B is a cross sectional view taken along the line B—B of the actuator 106. FIG. 1C is a cross sectional view taken along the line C—C of the actuator 106. Furthermore, FIG. 2, (A) and (B) show equivalent circuits of the actuator 106. FIG. 2, (C) and (D) respectively show an area including the actuator 106 and its equivalent circuit when an ink cartridge is full of ink. FIG. 2, (E) and (F) respectively show the area including the actuator 106 and its equivalent circuit when the ink cartridge contains no ink.

The actuator 106 has: a substrate 178 having a circular opening 161 at a substantially center thereof, a vibrating plate 176 arranged on one side (hereinafter referred to as the surface) of the substrate 178 so as to cover the opening 161, a piezoelectric layer 160 arranged on the surface side of the vibrating plate 176, an upper electrode 164 and a lower electrode 166 sandwiching the piezoelectric layer 169 therebetween, an upper electrode terminal 168 electrically connecting with the upper electrode 164, a lower electrode terminal 170 electrically connecting with the lower electrode 166, and an auxiliary electrode 172 that is arranged between the upper electrode 164 and the upper electrode terminal 168 and electrically connects the two with each other.

Each of the piezoelectric layer 160, the upper electrode 164, and the lower electrode 166 has a circular part as an essential section. The respective circular parts of the piezoelectric layer 160, the upper electrode 164 and the lower electrode 166 form a piezoelectric element.

The vibrating plate 176 is formed on the surface of the substrate 178 so as to cover the opening 161.

A cavity 162 is formed by a portion of the vibrating plate 176 facing the opening 161 and the opening 161 of the substrate 178. The surface (hereinafter referred to as the back) of the substrate 178 on the opposite side of the piezoelectric element faces inside of the liquid container side. Thus, the cavity 162 is structured so as to come in contact with the liquid. The vibrating plate 176 is attached to the substrate 178 liquid-tightly, so as to prevent a liquid leakage onto the surface side of the substrate 178 even if the liquid enters inside the cavity 162.

The lower electrode 166 is positioned on the surface of the vibrating plate 176 on the opposite side of the liquid container, in such a manner that the center of the circular part (main (essential) part) of the lower electrode 166 and the center of the opening 161 almost coincide with each other. The area of the circular part of the lower electrode 166 is set so as to be smaller than the area of the opening 161.

On the other hand, on the surface side of the lower electrode 166, the piezoelectric layer 160 is arranged (formed) in such a manner that the center of the circular part thereof and the center of the opening 161 almost coincide with each other. The area of the circular part of the piezoelectric layer 160 is set so as to be smaller than the area of the opening 161 and larger than the area of the circular part of the lower electrode 166.

On the other hand, on the surface side of the piezoelectric layer 160, the upper electrode 164 is arranged (formed) in such a manner that the center of the circular part (main part) thereof and the center of the opening 161 almost coincide with each other. The area of the circular part of the upper electrode 164 is set so as to be smaller than the areas of the opening 161 and of the circular part of the piezoelectric layer 160 and larger than the area of the circular part of the lower electrode 166.

Therefore, the main part of the piezoelectric layer 160 is structured so as to be sandwiched respectively from the surface side and the back side by the main part of the upper electrode 164 and the main part of the lower electrode 166. Thus, the piezoelectric layer 160 can be effectively deformed and driven. That is, the circular parts (main parts) of the piezoelectric layer 160, the upper electrode 164 and the lower electrode 166 form the piezoelectric element of the actuator 106.

As mentioned above, the piezoelectric element is in contact with the vibrating plate 176. Among the circular part of the upper electrode 164, the circular part of the piezoelectric layer 160, the circular part of the lower electrode 166, and the opening 161, the area of the opening 161 is the largest. Because of such a structure, a vibration area of the vibrating plate 176 that can actually vibrate is determined by the opening 161.

The circular part of the upper electrode 164, the circular part of the piezoelectric layer 160, and the circular part of the lower electrode 166 are smaller in the area than the opening 161, so that the vibrating plate 176 can vibrate more easily.

Furthermore, among the circular part of the lower electrode 166 and the circular part of the upper electrode 164, which are electrically connected to the piezoelectric layer 160, the circular part of the lower electrode 166 is smaller. Therefore, the circular part of the lower electrode 166 determines a part of the piezoelectric layer 160 that generates a piezoelectric effect.

The circular parts of the piezoelectric layer 160, the upper electrode 164 and the lower electrode 166, which form the piezoelectric element, have centers that substantially coincide with the center of the opening 161. The center of the circular opening 161, which determines the vibration portion of the vibrating plate 176, substantially coincides with a center of the whole actuator 106. Thus, a center of vibration of the actuator 106 almost coincides with the center of the actuator.

In addition, since the main portion of the piezoelectric element and the vibration portion of the vibrating plate 176 have circular shapes, the vibrating part of the actuator 106 has a symmetric shape with respect to the center of the actuator 106.

Since the vibration portion has a symmetric shape with respect to the center of the actuator 106, undesired vibration, which may be caused by asymmetry of the structure, can not be excited. Thus, the detection accuracy of the resonance frequency may be improved.

In addition, since the vibration portion has a symmetric shape with respect to the center of the actuator 106, manufacture thereof may be so easy that dispersion in shapes of the piezoelectric elements may be small. That is, dispersion in the resonance frequencies of the piezoelectric elements may be small.

In addition, since the vibration portion has a circular (isotropic) shape, it can be adhesively attached without affected by dispersion in fixing. Thus, it can be adhesively attached to the liquid container more uniformly. That is, mounting performance of the actuator 106 to the liquid container is better.

In addition, since the vibration portion of the vibrating plate 176 has a circular shape, a lower resonance mode such as a first resonance mode becomes predominant as a resonance mode of residual vibration of the piezoelectric layer 160. That is, a single peak appears in resonance modes of the residual vibration. Thus, the peak can be clearly distinguished from noise, so that the resonance frequency of the residual vibration can be detected more precisely.

In addition, if the area of the vibrating portion of the circular vibrating plate 176 is increased, an amplitude of the counter electromotive force waveform and a change rate of the resonance frequency depending on the existence of the liquid are increased. Thus, the detection accuracy of the resonance frequency may be further improved.

The actuator 106 has the two layers that are the base plate 178 whose compliance is small (difficult to be moved by the vibration) and the vibrating plate 176 whose compliance is large (easy to be moved by the vibration). Because of the two-layer structure, the actuator can be surely fixed to the liquid container by means of the base plate 178, and displacement of the vibrating plate 176 can be enlarged. Thus, amplitude of the counter electromotive force waveform and a change rate of the resonance frequency depending on the existence of the liquid are increased, so that the detection accuracy of the resonance frequency may be improved.

In addition, since the vibrating plate 176 has a larger compliance, attenuation of the vibration is so small that the detection accuracy of the resonance frequency may be improved.

In addition, a node of the vibration of the actuator 106 is located at an outside peripheral portion of the cavity 162, that is, near to an edge of the opening 161.

The upper electrode terminal 168 is formed on the surface side of the vibrating plate 176 so as to be electrically connected to the upper electrode 164 via the auxiliary electrode 172. On the other hand, the lower electrode terminal 170 is formed on the surface side of the vibrating plate 176 so as to be electrically connected to the lower electrode 166. The upper electrode 164 is formed on the surface side of the piezoelectric layer 160, so that, in the middle of connection to the upper electrode terminal 168, the upper electrode 164 must have a level difference equal to the sum of the thickness of the piezoelectric layer 160 and the thickness of the lower electrode 166. It is difficult that only the upper electrode 164 forms this level difference. Even if it can do, the connection condition between the upper electrode 164 and the upper electrode terminal 168 becomes weak, and there is a risk of cutting. Accordingly, the auxiliary electrode 172 is used as an auxiliary member so that the upper electrode 164 and the upper electrode terminal 168 are connected. By doing this, also the piezoelectric layer 160 and also the upper electrode 164 are structured so as to be supported by the auxiliary electrode 172, desired mechanical strength can be obtained, and furthermore the upper electrode 164 and the upper electrode terminal 168 can be connected surely.

The piezoelectric element and the vibration area of the vibrating plate 176 facing the piezoelectric element are the vibration part of the actuator 106 that can vibrate actually. Further, it is preferable that the members included in the actuator 106 are calcined and formed integrally mutually. When the actuator 106 is formed integrally, it can be handled easily.

Furthermore, when the strength of the substrate 178 is increased, the vibration characteristic can be improved. Namely, when the strength of the substrate 178 is increased, only the vibration part of the actuator 106 vibrates and a residual portion of the actuator 106 other than the vibration part do not vibrate. Further, in order to prevent the residual part of the actuator 106 other than the vibration part from vibrating, it is effective to make the piezoelectric element of the actuator 106 thinner and smaller and to make the vibrating plate 176 thinner, in addition to increasing the strength of the substrate 178.

As a material of the piezoelectric layer 160, it is preferable to use lead zirconate titanate (PZT), lead lanthanum zirconate titanate (PLZT), or a leadless piezoelectric film using no lead. As a material of the substrate 178, it is preferable to use zirconia or alumina. It is preferable to use the same material for the vibrating plate 176 as the material of the substrate 178. For the upper electrode 164, the lower electrode 166, the upper electrode terminal 168, and the lower electrode terminal 170, a conductive material, for example, a metal such as gold, silver, copper, platinum, aluminum, or nickel may be used.

The actuator 106 structured as mentioned above can be applied to a container that can contain a liquid. For example, it can be mounted to an ink cartridge or an ink tank to be used in an ink jet recording apparatus or to a container for containing a cleaning liquid for cleaning a recording head.

The actuator 106 shown in FIGS. 1A to 2 is mounted at a predetermined location of the liquid container in such a manner that the cavity 162 comes in contact with a liquid contained in the liquid container. When a liquid is sufficiently contained in the liquid container, the cavity 162 and the outside thereof are full of liquid.

On the other hand, when the liquid of the liquid container is consumed and the liquid level lowers below the actuator mounting location, a condition wherein no liquid exists in the cavity 162 is generated, or a condition wherein a liquid remains only in the cavity 162 and air exists outside the cavity 162 is generated.

The actuator 106 detects at least a difference in the acoustic impedance caused by this change in the condition. Thereby, the actuator 106 can detect whether a liquid is sufficiently contained in the liquid container or a fixed amount of liquid or more is consumed. Furthermore, the actuator 106 can detect also the kind of liquid contained in the liquid container.

Next, principle of liquid level detection by the actuator will be explained.

In order to detect changes in the acoustic impedance of a medium, an impedance characteristic or an admittance characteristic of the medium is measured. When the impedance characteristic or the admittance characteristic is measured, for example, a transmission circuit can be used. The transmission circuit impresses a periodic voltage having a fixed amplitude to the medium, changes a frequency thereof, and measures a current flowing through the medium. Alternatively, the transmission circuit supplies a periodic current having a fixed amplitude to the medium, changes a frequency thereof, and measures a voltage impressed to the medium. Changes in the current or the voltage measured by the transmission circuit indicate changes in the acoustic impedance. Changes in the frequency fm at which the current or the voltage is maximized or minimized also indicates changes in the acoustic impedance.

Separately from the method aforementioned, the actuator 106 can detect changes in the acoustic impedance of a liquid by using changes in the resonance frequency. The resonance frequency can be detected by measuring a counter electromotive force caused by the residual vibration remaining in the vibration part, for example, after the vibration part of the actuator has vibrated. In the case, for example, the above piezoelectric element can be used.

The above piezoelectric element generates a counter electromotive force by the residual vibration remaining in the vibration part of the actuator. The magnitude of the counter electromotive force varies with the amplitude of the vibration part of the actuator. Therefore, as the amplitude of the vibration part of the actuator increases, the detection becomes easier. Further, a changing cycle of magnitude of the counter electromotive force varies with the frequency of the residual vibration remaining in the vibration part of the actuator. That is, the frequency of the vibration part of the actuator corresponds to the frequency of the counter electromotive force. Here, the resonance frequency is referred to as a frequency in a resonance state between the vibration part of the actuator and a medium in contact with the vibration part.

In order to obtain the resonance frequency fs, a waveform obtained by measurement of the counter electromotive force when the vibration part and the medium are in a resonance state is subjected to the Fourier transformation. The vibration of the actuator is accompanied by various deformations such as deflection and extension instead of deformation only in one direction. Thus, the vibration of the actuator has various frequencies including the resonance frequency fs. Therefore, the waveform of the counter electromotive force when the piezoelectric element (vibrating part) and the medium are in a resonance state is subjected to the Fourier transformation and the most dominant frequency component is identified, thereby the resonance frequency fs is judged.

When the admittance characteristic of a medium is maximum or when the impedance characteristic thereof is minimum, the frequency fm may be slightly different from the resonance frequency fs due to a dielectric loss of the medium or a mechanical loss thereof. However, it requires a great deal of time to derive the resonance frequency fs from the frequency fm that can be measured, so that the frequency fm is generally used instead of the resonance frequency fs. Then, when the output of the actuator 106 is inputted to the transmission circuit, the actuator 106 can detect at least the acoustic impedance.

Some experiments have proved that there is little difference between the frequency fm that can be identified by the method of measuring the impedance characteristic of the medium or the admittance characteristic thereof and the resonance frequency fs that can be identified by the method of measuring the counter electromagnetic force caused by the residual vibration in the vibration part of the actuator.

The vibration area of the actuator 106 includes a portion of the vibrating plate 176 constituting the cavity 162 defined by the opening 161. When a liquid is sufficiently contained in the liquid container, the cavity 162 is full of liquid and the vibration area is in contact with the liquid in the liquid container. On the other hand, when no liquid is sufficiently contained in the liquid container, the vibration area is in contact with a liquid remaining in the cavity in the liquid container or in contact with gas or a vacuum instead of a liquid.

The actuator 106 of the present invention is provided with the cavity 162. The reason thereof is indicated below.

Depending on the mounting position or a mounting angle of the actuator 106 to the liquid container, a liquid may adhere to the vibration area of the actuator, even if the liquid level in the liquid container is lower than the mounting position of the actuator. When the actuator detects existence of a liquid only by existence of a liquid in the vibration area, a liquid adhering to the vibration area of the actuator may disturb precise detection of existence of a liquid.

For example, when the liquid level is lower than the mounting position of the actuator, if the liquid container rocks due to a reciprocating motion of the carriage, and thus the liquid waves, and thus the liquid adheres to the vibration area, the actuator may misjudge that the liquid is sufficiently contained in the liquid container.

Therefore, by positively forming a cavity designed so as to precisely detect existence of a liquid even if the liquid remains at the vibration part inversely, malfunctions of the actuator can be prevented even if the liquid container rocks and the liquid level waves. When an actuator having a cavity is used like this, malfunctions can be prevented.

Further, as shown in FIG. 2, (E), a case that there is no liquid in the liquid container and a liquid remains in the cavity 162 of the actuator 106 is set as a threshold value of existence of a liquid. Namely, when there is no liquid around the cavity 162 and the liquid in the cavity is smaller than the threshold value, the actuator judges that there is no ink (an example of liquid). When there is a liquid around the cavity 162 and the liquid in the cavity is larger than the threshold value, the actuator judges that there is ink (liquid).

For example, when the actuator 106 is mounted on a side wall of the liquid container, if the liquid in the liquid container is positioned lower than the mounting position of the actuator, the actuator judges that there is no ink, and if the liquid in the liquid container is positioned higher than the mounting position of the actuator, the actuator judges that there is ink.

When the threshold value is set like this, even when the ink in the cavity is dried and exhausted, the actuator can judge that there is no ink, and even when the ink adheres to the cavity again due to rocking of the carriage nevertheless the ink in the cavity is exhausted, since the amount of the adhering ink does not exceed the threshold value, the actuator can judge that there is no ink.

Next, an operation and a principle for detecting the liquid condition in the liquid container from the resonance frequency between a medium and the vibration part of the actuator 106 obtained by measurement of the counter electromotive force will be explained by referring to FIGS. 1A to 2.

In the actuator 106, a voltage is applied between the upper electrode 164 and the lower electrode 166, respectively via the upper electrode terminal 168 and the lower electrode terminal 170. Thus, an electric field is generated in a portion of the piezoelectric layer 160 sandwiched between the upper electrode 164 and the lower electrode 166. The piezoelectric layer 160 is deformed by this electric field. When the piezoelectric layer 160 is deformed, the vibration area of the vibrating plate 176 is bent and vibrates. For a little while after the piezoelectric layer 160 is deformed, the bending vibration remains in the vibration part of the actuator 106.

The residual vibration is free vibration of the vibration part of the actuator 106 and the medium. Therefore, when the voltage to be impressed to the piezoelectric layer 160 is set to a pulse waveform or a square waveform, the resonance state can be easily obtained between the vibration part after the voltage impression and the medium. The residual vibration includes vibration of the vibration part of the actuator 106, so that it also deforms the piezoelectric layer 160. Therefore, the piezoelectric layer 160 generates a counter electromotive force. The counter electromotive force is detected via the upper electrode 164, the lower electrode 166, the upper electrode terminal 168, and the lower electrode terminal 170. A resonance frequency can be identified by the detected counter electromotive force. The liquid state in the liquid container can be detected based on the resonance frequency.

Generally, the resonance frequency fs is expressed by the following formula:

$$fs = 1/(2 \times \pi \times (M \times Cact)^{1/2})$$ Formula 1

In this case, M indicates the sum of inertance Mact of the vibration part and additional inertance M', and Cact indicates compliance of the vibration part.

FIG. 1C is a cross sectional view of the actuator 106 of this embodiment when no ink remains in the cavity 162. FIG. 2, (A) and (B) show equivalent circuits of the vibration part of the actuator 106 and the cavity 162 when no ink remains in the cavity.

Mact is a value obtained by dividing the product of the thickness and density of the vibration part by the area of the vibration part. In detail, it is expressed by the following formula as shown in FIG. 2, (A).

$$Mact = Mpzt + Melectrode1 + Melectrode2 + Mvib$$ Formula 2

In this case, Mpzt is a value obtained by dividing the product of the thickness and density of the piezoelectric layer 160 in the vibration part by the area of the piezoelectric layer 160. Melectrode1 is a value obtained by dividing the product of the thickness and density of the upper electrode 164 in the vibration part by the area of the upper electrode 164. Melectrode2 is a value obtained by dividing the product of the thickness and density of the lower electrode 166 in the vibration part by the area of the lower electrode 166. Mvib is a value obtained by dividing the product of the thickness and density of the vibrating plate 176 in the vibration part by the area of the vibration area of the vibrating plate 176.

However, in order to allow Mact to be calculated from the thickness, density, and area of the whole vibration part, it is preferable that although the areas of the piezoelectric layer 160, the upper electrode 164, the lower electrode 166, and the vibration area of the vibrating plate 176 have the magnitude relations aforementioned, the mutual differences between the areas are minute.

In the embodiment, in the piezoelectric layer 160, the upper electrode 164 and the lower electrode 166, it is preferable that the residual parts other than the circular parts which are the main parts thereof are so minute as to be ignored for the main parts. Therefore, in the actuator 106, Mact is the sum of inertance of each of the upper electrode 164, the lower electrode 166, the piezoelectric layer 160, and the vibration area of a vibrating plate 176. The compliance Cact is compliance of a part formed by the upper electrode 164, the lower electrode 166, the piezoelectric layer 160, and the vibration area of the vibrating plate 176.

FIG. 2, (A), (B), (D), and (F) indicate equivalent circuits of the vibration part of the actuator 106 and the cavity 162. In the equivalent circuits, Cact indicates the compliance of vibration part of the actuator 106. Cpzt, Celectrode1, Celectrode2, and Cvib respectively indicate compliance of the the piezoelectric layer 160, the upper electrode 164, the lower electrode 166, and the vibrating plate 176, in the vibration part. Cact is expressed by Formula 3 indicated below.

$$1/Cact=(1/Cpzt)+(1/Celectrode1)+(1/Celectrode2)+(1/Cvib) \quad \text{Formula 3}$$

By Formulas 2 and 3, FIG. 2, (A) can be indicated as FIG. 2, (B).

The compliance Cact indicates a volume of a medium that can be received by deformation when pressure is applied to a unit area of the vibration part. That is, the compliance Cact may be said to indicate deformation easiness.

FIG. 2, (C) indicates a cross sectional view of the actuator 106 when a liquid is sufficiently contained in the liquid container and the periphery of the vibration part of the actuator 106 is full of liquid. M' max shown in FIG. 2, (C) indicates a maximum value of the additional inertance (a value obtained by dividing the additional mass (mass that can affect the vibration of the vibration area) by square of the area) when a liquid is sufficiently contained in the liquid container and the periphery of the vibration part of the actuator 106 is full of liquid. M' max is indicated as follows:

$$M'\max=(\pi\times\rho/(2\times k^3))\times(2\times(2\times k\times a)^3/(3\times\pi))/(\pi\times a^2)^2 \quad \text{Formula 4}$$

where a indicates a radius of the vibration part, ρ density of the medium, and k a wave-number.

Formula 4 is satisfied when the vibration area of the actuator 106 is a circle having a diameter of a. The additional inertance M' is a value indicating that the mass of the vibration part is apparently increased by a medium existing in the neighborhood of the vibration part. Formula 4 shows that M' max greatly varies with the radius a of the vibration part and the density ρ of the medium.

The wave-number k is expressed by the following:

$$k=2\times\pi\times fact/c \quad \text{Formula 5,}$$

where fact indicates a resonance frequency of the vibration part, and c indicates an acoustic speed propagating through the medium.

FIG. 2, (D) shows an equivalent circuit of the vibration part of the actuator 106 and the cavity 162 shown in FIG. 2, (C) wherein the liquid is sufficiently contained in the liquid container and the periphery of the vibration part of the actuator 106 is full of the liquid.

FIG. 2, (E) indicates a cross sectional view of the actuator 106 when the liquid in the liquid container is consumed and there is no liquid remaining around the vibration part of the actuator 106, although the liquid remains in the cavity 162 of the actuator 106.

Formula 4 is a formula indicating maximum inertance M' max decided from the ink (liquid) density ρ, when the liquid container is full of the liquid. On the other hand, when the liquid in the liquid container is consumed, and the liquid remains in the cavity 162, and the liquid around the vibration area of the actuator 106 is replaced with air or a vacuum, the additional inertance M' can be indicated as follows (in detail, see Formula 8):

$$M'=\rho\times t/S \quad \text{Formula 6,}$$

where t indicates a thickness of a medium relating to vibration, and S indicates the area of the vibration area of the actuator 106. When the vibration area is a circle having a radius of a, $S=\pi\times a^2$.

Therefore, the additional inertance M' follows Formula 4 when the liquid is sufficiently contained in the liquid container and the periphery of the vibration part of the actuator 106 is full of the liquid. On the other hand, when the liquid is consumed, and the liquid remains in the cavity 162, and the liquid around the vibration area of the actuator 106 is replaced with air or a vacuum, the additional inertance M' follows the Formula 6.

Here, as shown in FIG. 2, (E), the additional inertance M' when the liquid in the liquid container is consumed and there is no liquid remaining around the vibration area of the actuator 106, although the liquid remains in the cavity 162 of the actuator 106, is indicated by M' cav for convenience, so as to distinguish it from the additional inertance M' max when the periphery of the vibration area of the actuator 106 is full of the liquid.

FIG. 2, (F) shows an equivalent circuit of the vibration part of the actuator 106 and the cavity 162 shown in FIG. 2, (E) wherein the liquid in the liquid container is consumed and there is no liquid remaining around the vibration area of the actuator 106, although the liquid remains in the cavity 162 of the actuator 106.

In this case, parameters concerning the medium condition are the medium density ρ and a medium thickness t in Formula 6. When the liquid is sufficiently contained in the liquid container, the liquid is in contact with the vibration part of the actuator 106. On the other hand, when the liquid is not sufficiently contained in the liquid container, the liquid remains in the cavity, or gas or a vacuum is in contact with the vibration part of the actuator 106. When the liquid around the actuator 106 is consumed, the additional inertance M' var in a process of moving from M' max shown in FIG. 2, (C) to M' cav shown in FIG. 2, (E) is changed as the medium density ρ and/or the medium thickness t is changed depending on the liquid containing condition in the liquid container. Thus, the resonance frequency fs is also changed. Therefore, by identifying the resonance frequency fs, the containing condition (existence) of liquid in the liquid container can be detected.

In this case, when t=d is set as shown in FIG. 2, (E) and M' cav is expressed by using the Formula 6, by substituting the depth d of the cavity for t given in Formula 6, the following is obtained:

$$M' cav=\rho\times d/S \quad \text{Formula 7.}$$

If a medium is a liquid different in the kind, since the density ρ is different depending on the difference in the composition, the additional inertance M' and the resonance frequency fs are also different. Therefore, by identifying the resonance frequency fs, the kind of liquid can be detected.

Figure 3A:
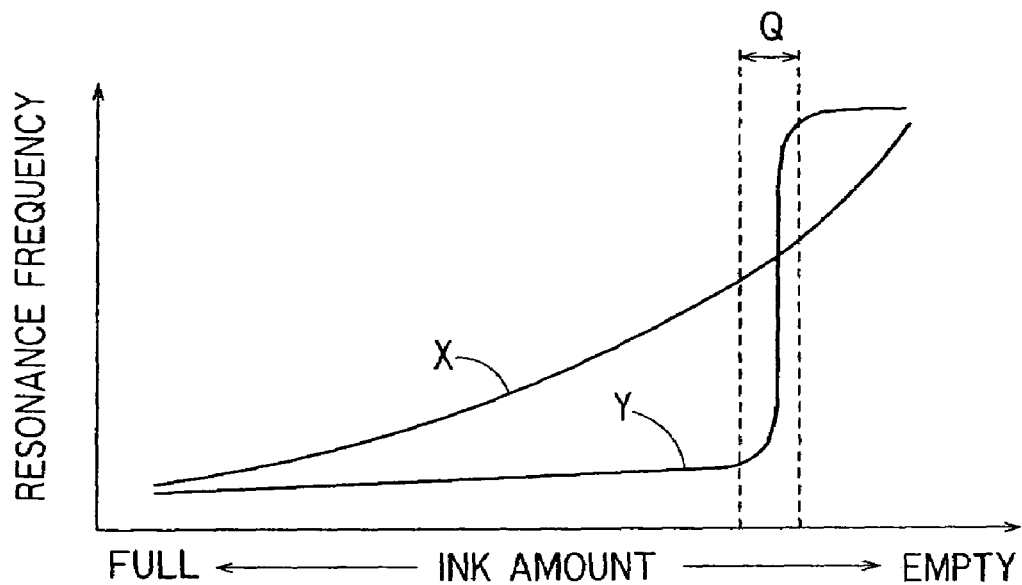
FIGS. 3A and 3B are drawings showing a relationship between ink density and resonance frequency of ink detected by the actuator 106.

FIG. 3A shows graphs indicating a relationship between an ink amount in an ink tank and a resonance frequency fs of ink and a vibration part. Here, ink will be explained as an example of a liquid. The ordinate axis indicates the resonance frequency fs, and the transverse axis indicates the ink amount. When the ink composition is fixed, as the residual amount of ink reduces, the resonance frequency fs increases.

When the ink is sufficiently contained in the ink container and the periphery of the vibration area of the actuator 106 is full of the ink, the maximum additional inertance M' max is the value expressed by Formula 4. On the other hand, when the ink is consumed, and the ink remains in the cavity 162, and the periphery of the vibration area of the actuator 106 is not full of the ink, the additional inertance M' var is calculated from Formula 6 on the basis of the medium thickness t. Since "t" in Formula 6 is the thickness of the medium relating to vibration, when the thickness d (FIG. 1B) of the cavity 162 of the actuator 106 in which the ink can remain is made small, that is, the substrate 178 is made sufficient thin, the process in which the ink is gradually consumed can be also detected (FIG. 2, (C)). Here, t ink is assumed as an ink thickness relating to the vibration, and t ink-max is assumed as t ink in M' max.

For example, the actuator 106 is arranged on a bottom of the ink cartridge almost horizontally with the ink surface level. In the case, when the ink is consumed and the ink surface level reaches the height of t ink-max or less from the actuator 106, M' var is slowly changed according to Formula 6 and the resonance frequency fs is slowly changed according to Formula 1. Therefore, as long as the ink level is within the range of t, the actuator 106 can gradually detect the ink consumption condition.

Alternatively, the actuator 106 is arranged on a side wall of the ink cartridge almost perpendicularly to the ink surface level. In the case, when the ink is consumed and the ink surface level reaches the vibration area of the actuator 106, the additional inertance M' reduces as the ink level lowers. Thus, the resonance frequency fs slowly increases according to Formula 1. Therefore, so long as the ink level is within the range of the diameter 2a (FIG. 2, (C)) of the cavity 162, the actuator 106 can gradually detect the ink consumption condition.

A curve X shown in FIG. 3A shows the relationship between the ink amount of the ink contained in the ink tank and the resonance frequency fs of the ink and the vibration part when the cavity 162 of the actuator 106 arranged on the bottom is made sufficiently shallow or when the vibration area of the actuator 106 arranged on the side wall is made sufficiently large or long. It can be seen that the ink amount in the ink tank slowly reduces and the resonance frequency fs of the ink and the vibration part gradually change.

More in detail, a case wherein the process of slow consumption of the ink can be detected is a case wherein a liquid and a gas different in density from each other coexist around the vibration area of the actuator 106 and are related to vibration. As the ink is consumed slowly, with the media relating to vibration around the vibration area of the actuator 106, the liquid reduces, while the gas increases.

For example, when the actuator 106 is arranged horizontally with the ink surface level and t ink is smaller than t ink-max, the media relating to vibration of the actuator 106 include both the ink and the gas. Therefore, assuming the area of the vibration area of the actuator 106 as S, when the condition less than M' max in Formula 4 is expressed by the additional masses of the ink and the gas, the following formula is obtained.

$$M'=M' \text{ air}+M' \text{ ink}=\rho \text{ air} \times t \text{ air}/S+\rho \text{ ink} \times t \text{ ink}/S \qquad \text{Formula 8}$$

where M' air indicates inertance of the air, and M' ink indicates inertance of the ink. ρair indicates air density, and ρink indicates ink density. t air indicates the thickness of air relating to vibration, and t ink indicates the thickness of ink relating to vibration.

Among the media relating to vibration around the vibration area of the actuator 106, as the liquid reduces and the gas increases, if the actuator 106 is arranged almost horizontally with the ink level, t air increases and t ink decreases. Thereby, M' var gradually reduces and the resonance frequency gradually increases. Therefore, the ink amount remaining in the ink tank or the ink consumption amount can be detected. The reason that Formula 7 is a formula of only the liquid density is that a case that the air density is so small as to be ignored for the liquid density is supposed.

When the actuator 106 is arranged almost perpendicularly to the ink level, among the vibration area of the actuator 106, an equivalent parallel circuit (not shown in the drawing) corresponding to a region where the medium relating to vibration of the actuator 106 is only the ink and a region where the medium relating to vibration of the actuator 106 is only the gas can be supposed. Assuming the area of the region where the medium relating to vibration of the actuator 106 is only the ink as S ink and the area of the region where the medium relating to vibration of the actuator 106 is only the gas as S air, the following formula is obtained.

$$1/M'=1/M' \text{ air}+1/M' \text{ ink}=S \text{ air}/(\rho \text{air} \times t \text{ air})+S \text{ ink}/(\rho \text{ink} \times t \text{ ink}) \qquad \text{Formula 9}$$

Formula 9 is applied when no ink is held in the cavity of the actuator 106. When ink is held in the cavity of the actuator 106, the additional inertance can be calculated as the sum of M' by Formula 9 and M' cav by Formula 7.

The vibration of the actuator 106 is changed from the depth of t ink-max to the depth of remaining ink (d). Therefore, when the actuator 106 is arranged on the bottom in such a manner that the depth of remaining ink is slightly smaller than the depth of t ink-max, the process (course) wherein the ink gradually reduces cannot be detected. In the case, from a vibration change of the actuator in a slight change of the ink amount from t ink-max to the residual depth d, it is detected that the ink amount is changed. When the actuator is arranged on the lateral side and the diameter of the opening (cavity) is small, a vibration change of the actuator during passing of the liquid surface through the opening is very little, so that it is difficult to detect the ink amount in the passing process. Thus, it is detected whether the liquid surface level is above or below the opening.

For example, the curve Y shown in FIG. 3A shows a relationship between an ink amount in the ink tank and a resonance frequency fs of the ink and the vibration part in a case of a small circular vibration area. The situation that the resonance frequency fs of the ink and the vibration part is changed strongly by the difference of ink amount Q between before and after the ink surface level in the ink tank passes the mounting position of the actuator is indicated. From this, whether a predetermined amount of the ink remains in the ink tank or not can be detected in a binary manner.

In the method of detecting the existence of the liquid by using the actuator 106, the existence of the ink can be detected by the vibrating plate 176 directly coming into contact with liquid. Thus, its detection accuracy is higher than that by the method of calculating the ink consumption volume by means of software. In addition, in the method of detecting the existence of the ink by using electric conductivity by means of the electrodes, the detection may be affected by the mounting positions of the electrodes to the liquid container and the kind of the ink. However, in the method of detecting the existence of the liquid by using the actuator 106, the detection may be scarcely affected by the mounting position of the actuator 106 to the liquid container and the kind of the ink.

In addition, since both of the generation of the vibration and the detection of the existence of the liquid can be achieved by the single actuator 106, the number of sensors attached to the liquid container may be reduced, compared with a method wherein the generation of the vibration and the detection of the existence of the liquid may be achieved by different sensors. Thus, the liquid container may be manufactured at smaller cost. In addition, it is preferable that the vibration frequency of the piezoelectric layer 160 is set at an inaudible area to reduce the sound generated during the operation of the actuator 106.

Figure 3B:
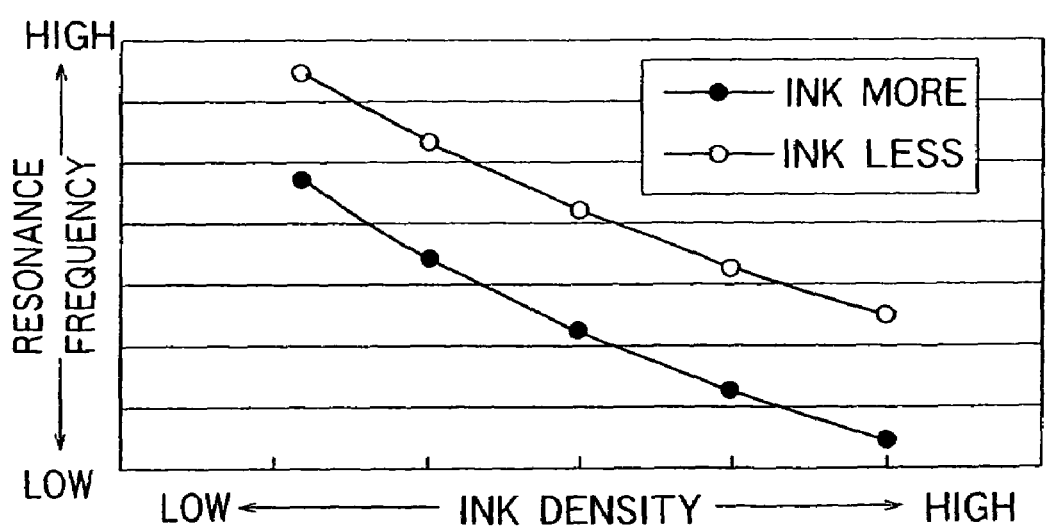

FIG. 3B shows an example of relationship between an ink density and a resonance frequency fs of the ink and the vibration part. Here, the ink is an example of liquid. The "ink-more" and the "ink-less" in FIG. 3B mean two relative conditions, that is, never mean only an ink-full condition and an ink-end condition. As shown in FIG. 3B, if the ink density is high, the additional inertance is so large that the resonance frequency fs is reduced. Namely, the resonance frequency fs varies depending on the kind of the ink. Therefore, if the resonance frequency fs is measured, when the ink is replenished, it can be ascertained whether an ink having different density is mixed in or not. Namely, an ink tank containing a different kind of ink can be discriminated.

Next, the condition wherein the liquid condition can be precisely detected when the size and shape of the cavity are set so that a liquid remains in the cavity 162 of the actuator 106 even when the liquid container contains little liquid will be described in detail. If the actuator 106 can detect the liquid condition when the cavity 162 is full of liquid, it can detect the liquid condition even when the cavity 162 is not full of liquid.

The resonance frequency fs is a function of inertance M. The inertance M is the sum of inertance Mact of the vibration part and the additional inertance M'. The inertance M' is related to the liquid condition. The inertance M' is a quantity showing that the mass of the vibration part is apparently increased by a medium existing in the neighborhood of the vibration part. Namely, it means an increase in the mass of the vibration part by apparently absorbing the medium by vibration of the vibration part.

Therefore, when M' cav is larger than M' max shown in Formula 4, all the apparently absorbed medium is a liquid remaining in the cavity 162. Therefore, it is the same condition as that when the liquid container is full of liquid. In this case, the medium relating to vibration does not become smaller than M' max, so that, even if the ink is consumed, its changes cannot be detected.

On the other hand, when M' cav is smaller than M' max shown in Formula 4, the apparently absorbed medium is a liquid remaining in the cavity 162 and a gas or a vacuum in the liquid container. In this case, M' changes unlike the condition that the liquid container is full of liquid, so that the resonance frequency fs changes. Therefore, the actuator 106 can detect the liquid condition in the liquid container.

Namely, when the liquid container contains no liquid and a liquid remains in the cavity 162 of the actuator 106, the condition under which the actuator 106 can precisely detect the liquid condition is that M' cav is smaller than M' max. The condition M' max>M' cav under which the actuator 106 can precisely detect the liquid condition is independent of the shape of the cavity 162.

M' cav indicates mass inertance of a liquid in almost the same volume as that of the cavity 162. Therefore, from the inequality M' max>M' cav, the condition under which the actuator 106 can precisely detect the liquid condition can be expressed as a condition of the volume of the cavity 162. For example, assuming the radius of the opening 161 of the circular cavity 162 as a and the depth of the cavity 162 as d, the following formula is held:

$$M'\ max > \rho \times d / \pi a^2 \qquad \text{Formula 10.}$$

When Formula 10 is expanded, the following condition is obtained:

$$a/d > 3 \times \pi / 8 \qquad \text{Formula 11}$$

Therefore, when the cavity 162 of the actuator 106 has the diameter a of the opening 161 and the depth d of the cavity 162 which satisfy Formula 11, even if the liquid container contains little liquid and the liquid remains in the cavity 162, the actuator 106 can detect the liquid condition free of malfunctions.

Formulas 10 and 11 are satisfied only when the shape of the cavity 162 is circular. When the shape of the cavity is not circular, if a corresponding formula of M' max is used and $\pi a^2$ in Formula 10 is substituted for the area thereof, the relationship of a dimension such as the width and length of the cavity with the depth thereof can be derived.

The additional inertance M' affects the acoustic impedance characteristic, so that it may be said that the method of measuring the counter electromotive force generated in the actuator 106 by the residual vibration detects at least changes in the acoustic impedance.

According to this embodiment, the actuator 106 generates the vibration and then the counter electromotive force generated in the actuator 106 by the residual vibration is measured. However, it is not always necessary that the vibration part of the actuator 106 gives the vibration to the liquid by its own vibration by the driving voltage. Namely, even if the vibration part itself does not generate the vibration, it may vibrate together with a liquid in contact therewith within a certain region, thereby the piezoelectric layer 160 may be bent and deformed. The bent and deformation generates the counter electromotive force and transfers the counter electromotive force to the upper electrode 164 and the lower electrode 166. The liquid condition may be detected by using this phenomenon. For example, in an ink jet recording apparatus, by using vibration of the periphery of the vibration part of the actuator generated by a reciprocating motion of a carriage by a scan of a print head during a printing operation, the condition of the ink tank or the ink condition in the ink tank may be detected.

Figure 4A:
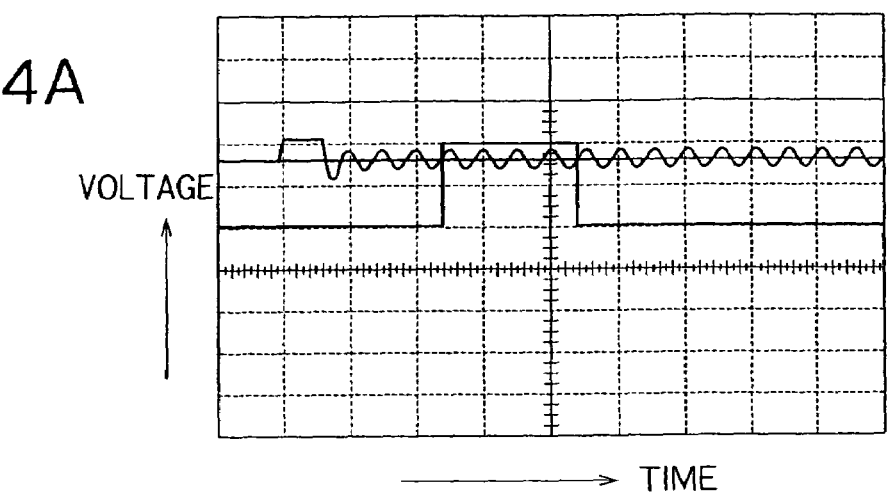
FIGS. 4A, 4B and 4C are drawings for explaining a counter electromotive force waveform of the actuator 106.
Figure 4B:
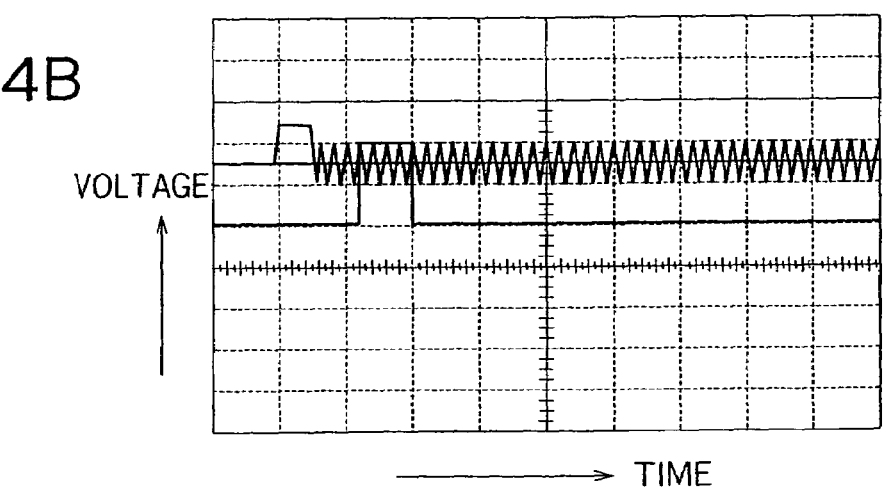
Figure 4C:
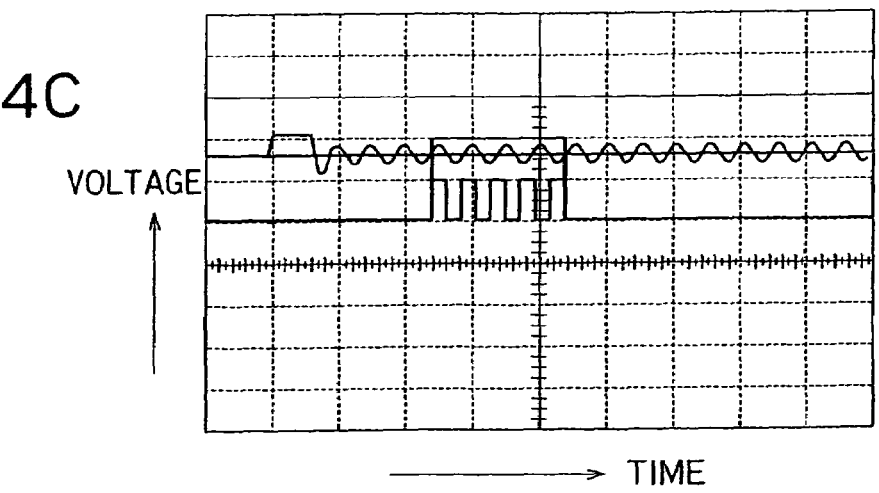

FIGS. 4A, 4B and 4C show a waveform of residual vibration of the actuator 106 after causing the actuator 106 to vibrate and a measuring method for the residual vibration. A vertical position of the ink surface level with respect to the mounting position level of the actuator 106 in the ink cartridge can be detected by changes in the frequency or changes in the amplitude of the residual vibration after the actuator 106 has been caused to vibrate. In FIGS. 4A to 4C, the ordinate axis indicates voltage of counter electromotive force generated by the residual vibration of the actuator 106, and the transverse axis indicates time. By the residual vibration of the actuator 106, as shown in FIGS. 4A to 4C, the waveform of an analog signal of voltage is generated. Next, the analog signal is converted to a digital value corresponding to the signal frequency. In the examples shown in FIGS. 4A to 4C, the time required to generate four pulses from the fourth pulse of the analog signal to the eighth pulse thereof is measured.

More in detail, after the actuator 106 has been caused to vibrate, the number of crossing a predetermined reference voltage from the low voltage side to the high voltage side is counted. A digital signal being high between the 4th count and the 8th count is generated, and the time from the 4th count to the 8th count is measured by a predetermined clock pulse.

FIG. 4A shows a waveform when the ink surface level is positioned above the mounting position level of the actuator 106. On the other hand, FIG. 4B shows a waveform when there is no ink on the mounting position level of the actuator 106. The comparison of FIG. 4A with FIG. 4B shows that the time from the 4th count to the 8th count in FIG. 4A is longer than that in FIG. 4B. In other words, the time from the 4th count to the 8th count varies with the existence of ink. By making use of the difference in time, the consumption condition of the ink can be detected.

Starting to count from the 4th count of the analog waveform means starting the measurement after stabilization of vibration of the actuator 106. Starting from the 4th count is just an example and the time may be counted from any count. In this case, a signal from the 4th count to the 8th count is detected and the time from the 4th count to the 8th count is measured by using a predetermined clock pulse. Based on the measured time, the resonance frequency can be obtained. It is preferable that the clock pulse has a clock equal to the clock for controlling a semiconductor storage unit attached to the ink cartridge. There is no need to measure the time up to the 8th count, and the time up to any count may be measured. In FIGS. 4A and 4B, the time from the 4th count to the 8th count is measured. However, according to circuit constitution for detecting the frequency, the time between different counts may be detected.

For example, when the quality of the ink is stable and the peak of the amplitude varies little, in order to increase the detection speed, the time from the 4th count to the sixth count may be detected, thereby the resonance frequency may be obtained. Or, when the quality of the ink is unstable and the pulse amplitude varies greatly, in order to precisely detect the residual vibration, the time from the 4th count to the 12th count may be detected.

Further, in another embodiment, the wave-number of the voltage waveform of counter electromotive force within a predetermined period may be counted (not shown in the drawing). Also by this method, the resonance frequency can be determined. More in detail, after generation of the vibration in the actuator 106, a digital signal being high for a predetermined period is generated and the number of crossing a predetermined standard voltage from the low voltage side to the high voltage side for the predetermined period is counted. By measuring the number, the existence of the ink can be detected.

Furthermore, the comparison of FIG. 4A with FIG. 4B shows that the amplitude of the counter electromotive force waveform is different between a case that the ink cartridge is full of the ink and a case that the ink cartridge contains no ink. Therefore, by measuring the amplitude of the counter electromotive force waveform without obtaining the resonance frequency, the ink consumption condition in the ink cartridge may be detected.

More in detail, for example, a standard voltage is set between the peak of the counter electromotive force waveform shown in FIG. 4A and the peak of the counter electromotive force waveform shown in FIG. 4B. When the actuator 106 vibrates, a digital signal being high for a predetermined time is generated, and the counter electromotive force waveform crosses the standard voltage, the actuator 106 judges that there is no ink. When the counter electromotive force waveform does not cross the standard voltage, the actuator 106 judges that there is ink.

FIG. 4C shows an example wherein the time from the 4th count to the 8th count of the pulse waveform shown in FIG. 4A is measured by using a predetermined clock pulse. In the drawing, five clock pulses appear between the 4th count and the 8th count. Although 100 to 200 clock pulses appear therebetween actually, the smaller number of clock pulses is supposed for a simple explanation. The clock pulse has a fixed period. Thus, if the number of clock pulses is counted, time can be measured. If the time from the 4th count to the 8th count is measured, the resonance frequency can be obtained. The period of the clock pulse is preferably shorter than a period of the counter electromotive force waveform. For example, if the frequency of the counter electromotive force waveform is about 400 kHz, it is preferable that the frequency of the clock pulse is as high as 16 MHz.

Figure 5:
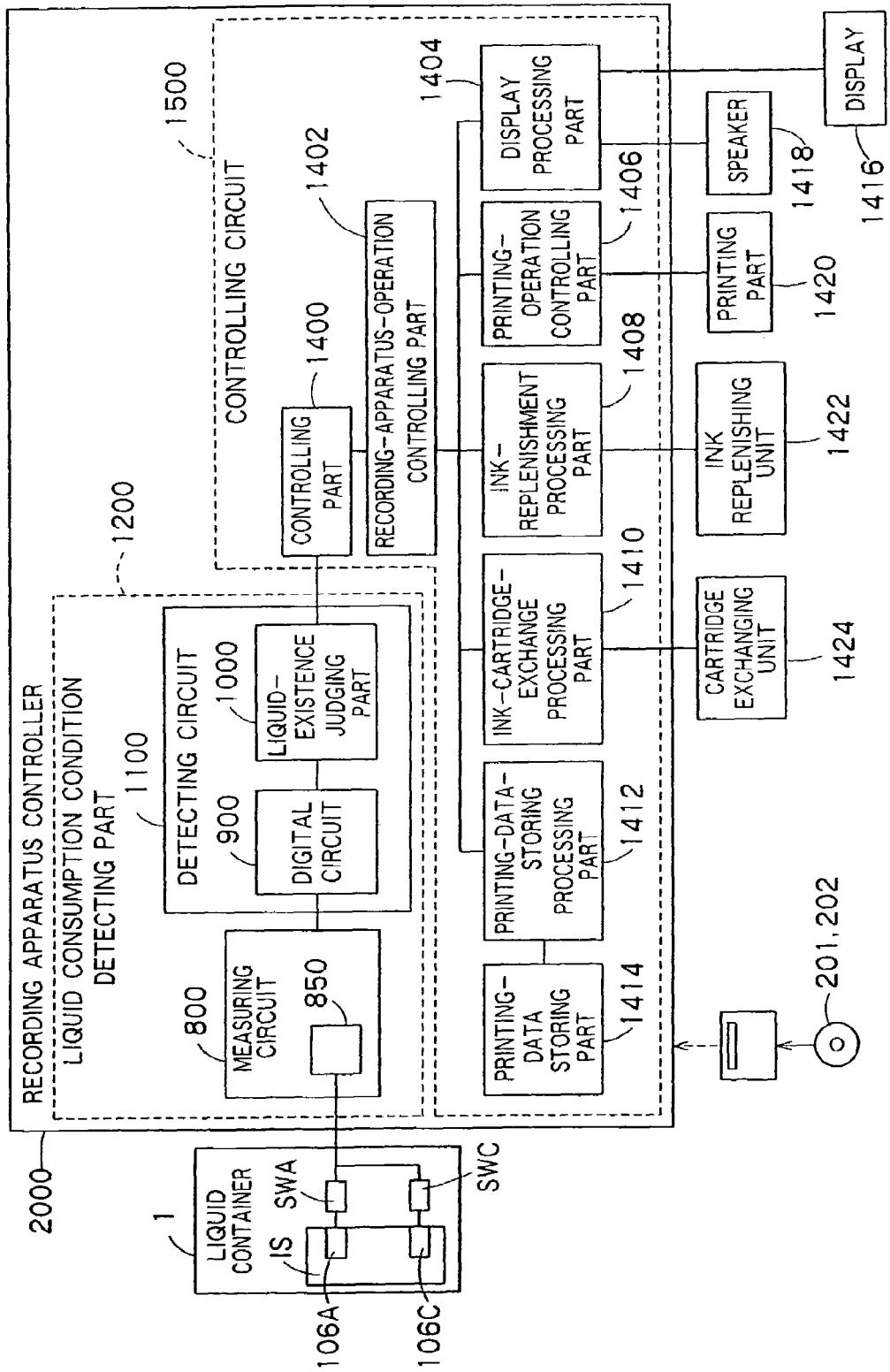
FIG. 5 is a block diagram schematically showing construction of a recording apparatus controller 2000, which can detect a consumption condition of a liquid in a liquid container 1 by an actuator 106 detecting changes in an acoustic impedance and that can control an ink-jet recording apparatus based on the detected result.

FIG. 5 shows a structure of a recording apparatus controller 2000 that can detect a consumption condition of a liquid in a liquid container 1 by an actuator 106 detecting changes in an acoustic impedance and that can control an ink-jet recording apparatus based on the detected result.

The recording apparatus controller 2000 has: a liquid consumption condition detecting part 1200 that can give a voltage for selectively driving actuators 106A and 106C to the actuators 106A and 106C set in an ink containing part (ink containing space) IS of the liquid container 1 and that can detect the liquid consumption condition from the changes in the acoustic impedance detected by the actuators 106A and 106C; and a controlling circuit 1500 that can control the recording apparatus based on the detected result about existence of the liquid outputted from the liquid consumption condition detecting part 1200.

Figure 6:
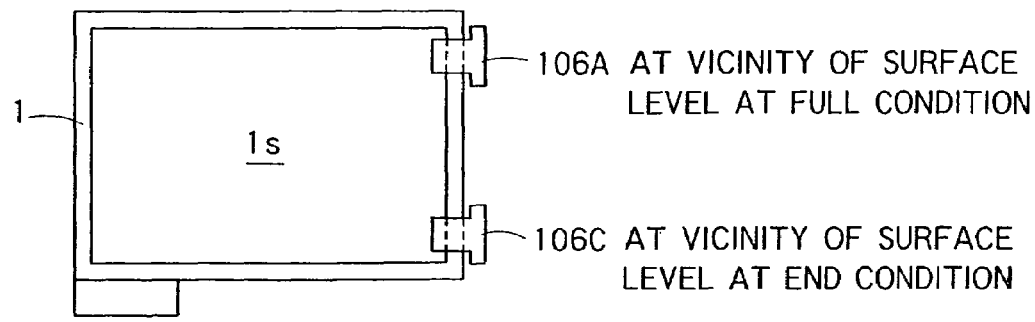
FIG. 6 is a schematic view showing mounting positions of the actuators 106A and 106C in the case of FIG. 5.

As shown in FIG. 5, the two actuators 106A and 106C are set at different positions in a vertical direction, in which a liquid surface level goes down when the liquid is consumed. In the case, as shown in FIG. 6, the actuator 106A is attached in the vicinity of a liquid surface level when the ink containing part (ink containing space) IS is full of the liquid (liquid-full), and the actuator 106C is attached in the vicinity of a liquid surface level when the liquid in the ink containing part (ink containing space) IS is exhausted (liquid-end). The actuators 106A and 106C are connected to semiconductor switches SWA and SWC, respectively. For example, each of the semiconductor switches SWA and SWC may be controlled by a controlling part 1400. When one of the switches is closed (connected), the other of the switches may be open (non-connected).

The controlling circuit 1500 further includes: the controlling part 1400 that can operate based on the detected result about existence of the liquid outputted from the liquid consumption condition detecting part 1200; and a recording-apparatus-operation controlling part 1402 that can control an operation of the recording apparatus based on an instruction from the controlling part 1400. The controlling circuit 1500 further includes: a display processing part 1404, a printing-operation controlling part 1406, an ink-replenishment processing part 1408, an ink-cartridge-exchange processing part 1410, a printing-data-storing processing part 1412 and a printing-data storing part 1414. Operations of these components may be controlled by the recording-apparatus-operation controlling part 1402.

Although the recording apparatus controller 2000 may be arranged in the ink-jet recording apparatus, a part of the recording apparatus controller 2000 may be arranged outside the ink-jet recording apparatus. For example, a function of the controlling circuit 1500 may be given by an outside unit such as a computer that is connected to the recording apparatus. In addition, a partial function of the recording apparatus controller 2000 may be stored in and supplied from a recording medium as a program. If the partial function of the recording apparatus controller 2000 is supplied to a computer connected to the recording apparatus as a program stored in a recording medium, the program may be easily revised and stored again in the recording medium so as to easily achieve the latest function when the partial function of the recording apparatus controller 2000 is improved. Thus, the operation of the recording apparatus can be controlled always by means of the latest function.

In addition, the partial function of the recording apparatus controller 2000 may be sent from an information processing unit such as a server to a terminal unit such as a computer connected to the recording apparatus via an electric communication line, as a program. In the case, the latest function can be easily obtained from the server via the electric communication line and can be stored in a recording medium in the computer. Thus, the recording apparatus can always achieve the latest function.

The liquid consumption condition detecting part 1200 drives the actuators 106A and 106C and detects the existence of the liquid in the liquid container 1 based on the changes in the acoustic impedance. For example, the liquid consumption condition detecting part 1200 has: a measuring circuit 800 that can measure a counter electromotive force (for example, a voltage value) generated by each of the actuators 106A and 106C due to the residual vibration; a detecting circuit 1100 that can output a signal indicating whether the liquid exists in the liquid container 1 or not based on the counter electromotive force measured by the measuring circuit 800.

The measuring circuit 800 has a driving-voltage generating part 850 that can generate a driving voltage for driving the actuators 106A and 106C. By means of the driving voltage generated by the driving-voltage generating part 850, one of the actuators 106A and 106C, whose corresponding switch is closed (connected) by the controlling part 1400, is driven (caused) to vibrate. The actuator continues to vibrate after it has been caused to vibrate. Such residual vibration cause the actuator to generate a counter electromotive force. The measuring circuit 800 converts a waveform of an analogue signal of the counter electromotive force generated by the actuator to a digital signal having the same frequency as the analogue signal, and outputs the digital signal to a digital circuit 900.

The detecting circuit 1100 includes: the digital circuit 900 that can digitally count the number of pulses in the digital signal outputted by the measuring circuit 800 for a fixed time; a liquid-existence judging part 1000 that can judge whether the liquid exists or not based on the number of pulses counted by the digital circuit 900.

In this embodiment, as shown in FIGS. 4A and 4B, the digital circuit 900 outputs a digital signal being high from the 4th count to the 8th count of the counter electromotive force waveform outputted by the measuring circuit 800. In addition, as shown in FIG. 4C, the digital circuit 900 counts the number of pulses of a predetermined clock pulse, which has a shorter period than that of the counter electromotive force waveform, while the digital signal is high (from the 4th count to the 8th count). The time from the 4th count to the 8th count can be measured by counting the number of pulses of the clock pulse having the fixed period. For example, five clock pulses appear in the case of FIG. 4C. Thus, the time can be calculated by multiply the number five and the period of the clock pulse together.

The shown clock pulse has a low frequency for a simple explanation. However, an actually used clock pulse may have a higher frequency such as 16 MHz. The liquid-existence judging part 1000 judges whether the liquid exits in the liquid container 1 or not based on the number outputted from the digital circuit 900, and outputs the judgment result to a controlling circuit 1500.

In this embodiment, the plurality of actuators 106A and 106C are set at the different positions in the direction, in which the liquid surface level goes down when the liquid is consumed. Thus, respective liquid consumption conditions at the mounting positions of the actuators can be detected stepwise.

The output signals from an actuator depend on whether a liquid surface level is higher or lower than the mounting position of the actuator. For example, if the frequency or the amplitude of a detected counter electromotive force changes greatly, thereby a detected signal also changes. The liquid consumption condition detecting part 1200 can judge whether the liquid surface level goes down through each of the mounting positions of the actuators 106A and 106C or not, based on the signals detected from the actuators. The detecting process may be periodically carried out, for example at predetermined timings.

Here, a condition wherein the liquid surface level is lower than the mounting position of the actuator is assumed to be a "liquid-not-existence" condition, and a condition wherein the liquid surface level is higher than the mounting position of the actuator is assumed to be a "liquid-existence" condition. If the liquid surface level goes down through the actuator, the detected result changes from the "liquid-existence" condition to the "liquid-not-existence" condition. In this embodiment, detecting a passage of the liquid surface level means such a change in the detected result.

As a feature of this embodiment, the controlling part 1400 selects one actuator used for detecting the impedance, in the direction in which the liquid surface level goes down, according to progress of liquid consumption. In detail, just after the liquid container 1 is set, that is, when the liquid container 1 is full of the liquid, only the semiconductor switch SWA is closed (connected) so as to use only the actuator 106A. If the liquid is consumed and the liquid surface level goes down through the actuator 106A, the actuator 106A detects the "liquid-not-existence" condition. Then, the controlling part 1400 makes the semiconductor switch SWA open (unconnected) and makes only the semiconductor switch SWC closed (connected) so as to change the detecting position to the lower mounting position. If the liquid is consumed and the liquid surface level goes down through the actuator 106C, the actuator 106C detects the "liquid-not-existence" condition.

If the liquid consumption condition detecting part 1200 outputs a judgment result of "liquid-not-existence" by the actuator 106C, a small-ink-amount dealing-with process (a process that can deal with a small-ink-amount) or an ink-replenishment process is carried out. The controlling part 1400 carries out a predetermined small-ink-amount dealing-with process by controlling the recording-apparatus-operation controlling part 1402. The small-ink-amount dealing-with process is a process that prohibits or restricts an operation of the recording apparatus such as an unsuitable printing, taking into consideration that the residual amount of the ink is only small. The recording-apparatus-operation controlling part 1402 controls operations of the display processing part 1404, the printing-operation controlling part 1406, the ink-replenishment processing part 1408, the ink-cartridge-exchange processing part 1410 and/or the printing-data-storing processing part 1412, based on an instruction of the controlling part 1400, in order to carry out the small-ink-amount dealing-with process.

The display processing part 1404 indicates information corresponding to whether the liquid exists in the liquid container 1 or not, which has been detected by the actuator 106. For example, the information is shown in a display 1416 or informed by a speaker 1418. The display 1416 may be a display panel of the recording apparatus or a screen of a computer connected to the recording apparatus. Alternatively, if the display processing part 1404 is connected to the speaker 1418 and the actuator 106 detects the "liquid-not-existence" condition, an alarm call may be outputted from the speaker 1418. The speaker 1418 may be a speaker in the recording apparatus or a speaker of an outside unit such as a computer connected to the recording apparatus. Suitably, the alarm call may be a voice signal. A composite voice that indicates an ink consumption condition may be generated by a voice composite process.

The printing-operation controlling part 1406 controls a printing part 1420 to stop a printing operation of the recording apparatus. Due to the stop of the printing operation, a printing operation after the ink has been exhausted can be avoided. In addition, the printing-operation controlling part 1406 may prohibit carrying out the next printing process after completing a printing process, as another example of small-ink-amount dealing-with process. Thus, it can be avoided that a printing operation is stopped in the middle of one printing process, for example a printing process for one series of sentences. In addition, as an example of prohibition of the printing process, it is also preferable that a printing operation is stopped after completing a page-changing process, in order to prevent the printing process from being stopped while printing the same page.

The ink-replenishment processing part 1408 controls an ink replenishing unit 1422 to automatically replenish the liquid container 1 with ink. Due to such a replenishment of the ink, the printing operation can be continued.

The ink-cartridge-exchange processing part 1410 controls a cartridge exchanging unit 1424 to automatically exchange an ink cartridge. Due to such a dealing-with process, the printing operation can be continued without making trouble for the user.

The printing-data-storing processing part 1412 stores printing data that has been not printed yet into the printing-data storing part 1414, as a small-ink-amount dealing-with process. The printing data are data sent to the recording apparatus after the ink-end condition has been detected. By storing the printing data, it can be avoided that the printing data that has been not printed yet are lost.

It is unnecessary for all the components 1404–1412 to be arranged in the recording apparatus controller 2000. In addition, it is unnecessary for all the components 1404–1412 to carry out their own small-ink-amount dealing-with processes. That is, it is sufficient that at least one small-ink-amount dealing-with process is carried out. For example, if the ink-replenishment processing part 1408 or the ink-cartridge-exchange processing part 1410 carries out the process, it is unnecessary for the printing-operation controlling part 1406 to carry out the process for stopping the printing operation.

In addition, another structure that can carry out a small-ink-amount dealing-with process, that is, another structure that can avoid an unsuitable operation due to an ink shortage may be provided. The above small-ink-amount dealing-with process may be preferably carried out after the actuator 106C has detected the "liquid-not-existence" condition at the mounting position thereof and then a printing operation by a predetermined "reserve" has been carried out. The predetermined "reserve" may be set to a suitable value smaller than that until all the ink is consumed after the actuator 106C has detected the "liquid-not-existence" condition.

According to this embodiment, since the detecting position is switched, all the actuators don't operate at the same time. That is, frequency of the operation of each actuator is small. Thus, an amount of data processing in the controlling part 1400 can be restricted. Therefore, the detecting operation may not reduce throughput of the printing operation.

In addition, the driving-voltage generating part 850 and so on are commonly provided for the plurality of actuators. Thus, the structure of the circuits achieves a high efficiency in arrangement space and cost.

In addition, according to the embodiment, a "liquid-full" condition can be detected by the actuator 106A, and a "liquid-end" condition can be detected by the actuator 106C. Thus, it is very suitable for a control wherein the liquid container 1 is replenished with the liquid to the "liquid-full" condition when the "liquid-end" condition has been detected.

Figure 7:
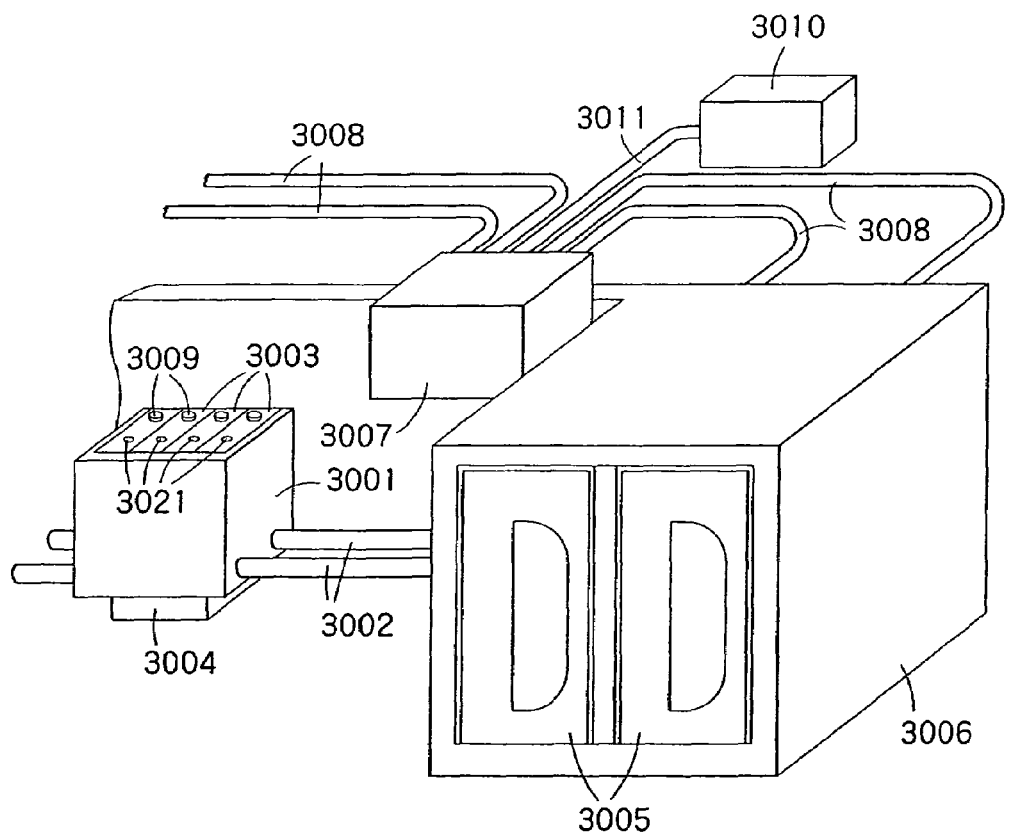
FIG. 7 is a schematic perspective view showing an example of ink replenishing unit.

Herein, a concrete example of the ink replenishing unit 1422 will be explained with reference to FIG. 7. As shown in FIG. 7, a carriage 3001 is guided by a guide member 3002 and can be reciprocated by a driving means not shown.

Four ink-supplying units 3003, each of which has a liquid container 1, are mounted on an upper portion of the carriage 3001. A recording head 3004 is provided at an under side of the carriage 3001.

Cartridge holders 3006, each of which can contain a or more ink cartridge 3005, are arranged on both sides of a movable area of the carriage 3001. An ink replenishing unit 3007 is arranged above a non-printing area in the movable area of the carriage 3001.

The ink replenishing unit 3007 is connected to the ink cartridges 3005 via tubes 3008. The ink replenishing unit 3007 can be connected to ink pouring ports 3009 of the ink-supplying units 3003 in order to introduce ink into the ports when the carriage 3001 reaches an ink replenishment area. In FIG. 7, 3010 indicates a pump unit that is an ink-pouring pressure source connected to the ink replenishing unit 3007 via a tube 3011, and 3021 indicates atmospheric open ports of the ink-supplying units 3003.

The detailed structure of the ink-supplying unit 3003 is substantially the same as that shown in Japanese Patent Application 11-315071. Thus, this reference to Japanese Patent Application 11-315071 serves as the explanation. Due to the reference, this specification includes all the contents of Japanese Patent Application 11-315071.

As seen from the explanation of the present invention, it is unnecessary to provide a float for detecting a liquid surface level, differently from the ink-supplying unit in the above Japanese Patent Application. The feature wherein the float is unnecessary can lead to advantage such as a simpler structure, and hence a reduced cost, an achievement of small-sized and lightweight structure, release from various troubles caused by malfunction of the float (improvement of operation reliability), and so on.

The number of arranged actuators is not limited. Intervals between two adjacent actuators may be unfixed. For example, it is preferable that an interval between two actuators is smaller when the two actuators are located at lower positions. The modification can be applied to the following other embodiments, similarly.

In addition, in the above embodiment, the driving circuit and so on are commonly formed for the two actuators 106A and 106C. However, the circuit may be independently formed for each actuator. In the case, for example, resonance frequencies of the two actuators 106A and 106C may be detected at the same time, so that a liquid consumption condition can be judged based on whether the two resonance frequencies are the same or not. For example, if the resonance frequencies detected from the two actuators 106A and 106C are substantially the same, the liquid consumption condition is either an ink-end condition or an ink-full condition.

Figure 8:
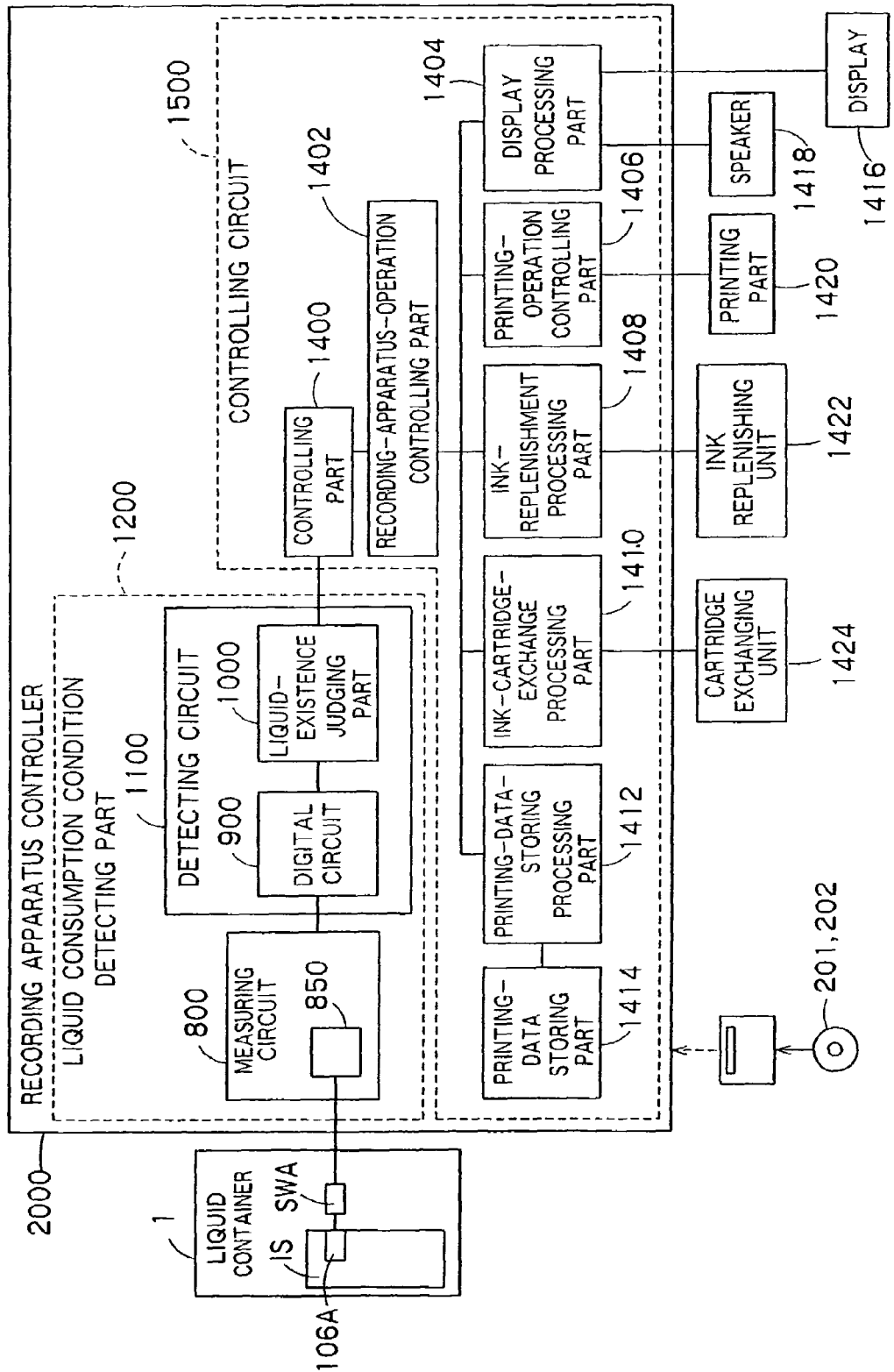
FIG. 8 is a block diagram, similar to FIG. 5, of another embodiment modified in an actuator-setting manner.
Figure 9:
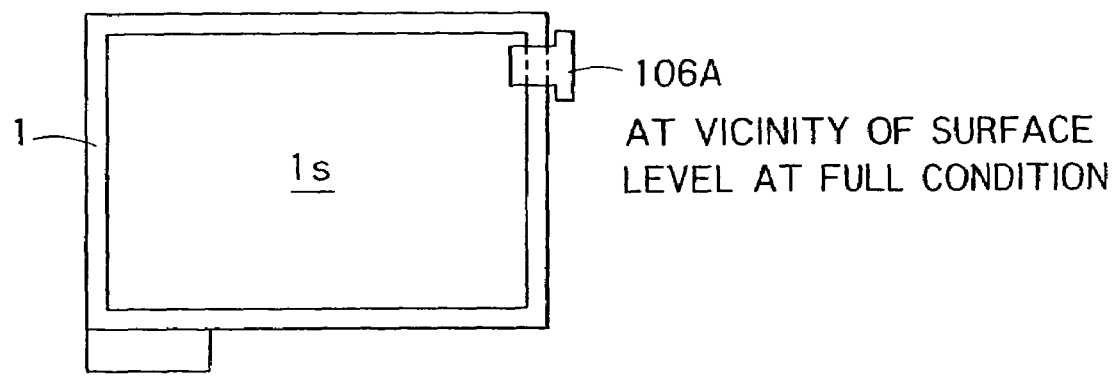
FIG. 9 is a schematic view showing a mounting position of the actuator 106A in the case of FIG. 8.

As shown in FIGS. 8 and 9, if only one actuator 106A is provided, only an ink-full condition can be detected. This manner is very suitable for a unit that replenishes the liquid container with the liquid to the "liquid-full" condition immediately if the liquid consumption condition is not the "liquid-full" condition. In this case, the semiconductor switch SWA can be omitted.

Figure 10:
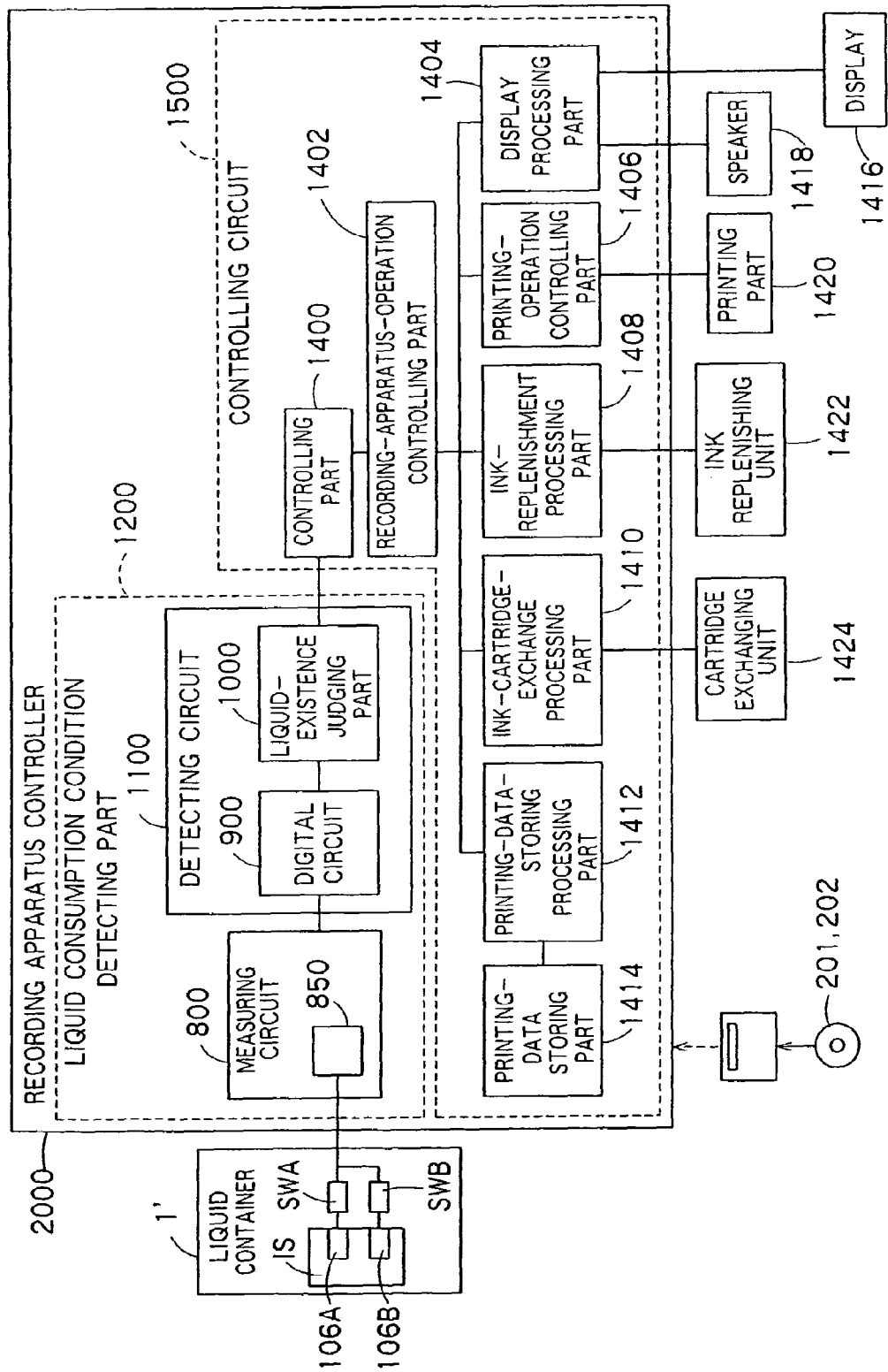
FIG. 10 is a block diagram, similar to FIG. 5, of another embodiment modified in an actuator-setting manner.
Figure 11:
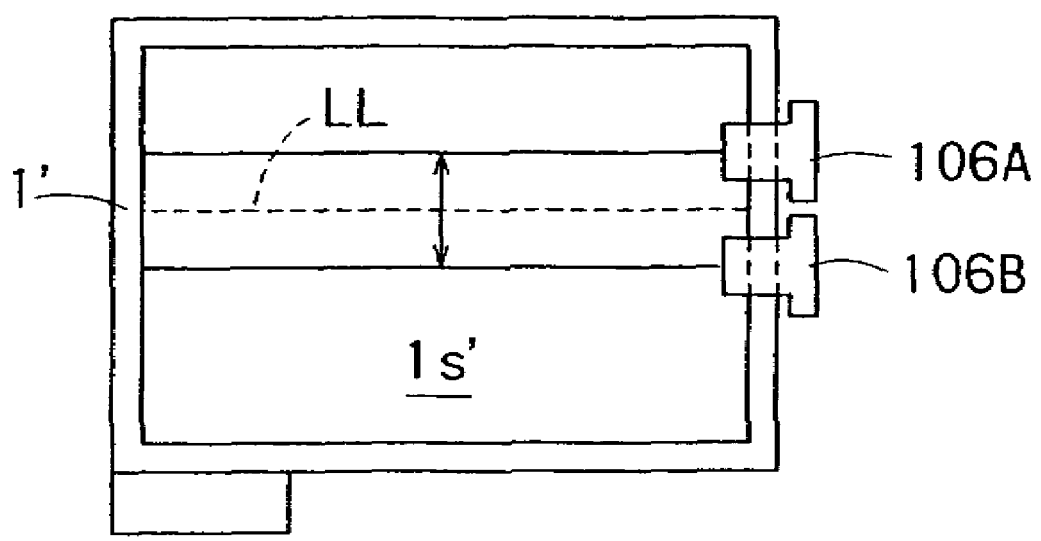
FIG. 11 is a schematic view showing mounting positions of the actuators 106A and 106B in the case of FIG. 10.

FIG. 10 is a block diagram of the recording apparatus controller 2000 of FIG. 5 together with another liquid container 1'. As shown in FIG. 11, in this embodiment, an actuator 106A is set at a position in the vicinity of and higher than a predetermined level LL of the ink containing part IS' of the liquid container 1', and an actuator 106B is set at a position in the vicinity of and lower than a predetermined level LL of the ink containing part IS' of the liquid container 1'. Other structure is substantially the same as the embodiment shown in FIG. 5.

This embodiment is effective for always maintaining a liquid surface level in the liquid container 1' at the vicinity of the predetermined level LL. That is, when the actuator 106B detects the "liquid-not-existence" condition, the liquid is supplied into the liquid container 1', and when the actuator 106A detects the "liquid-existence" condition, the supply of the liquid into the liquid container 1' is stopped. Thus, the liquid surface level can be always maintained at the vicinity of the predetermined level LL. If the liquid surface level is substantially fixed, a liquid-head pressure thereof is also substantially fixed. In the case, liquid jetting performance may be improved remarkably.

Figure 12:
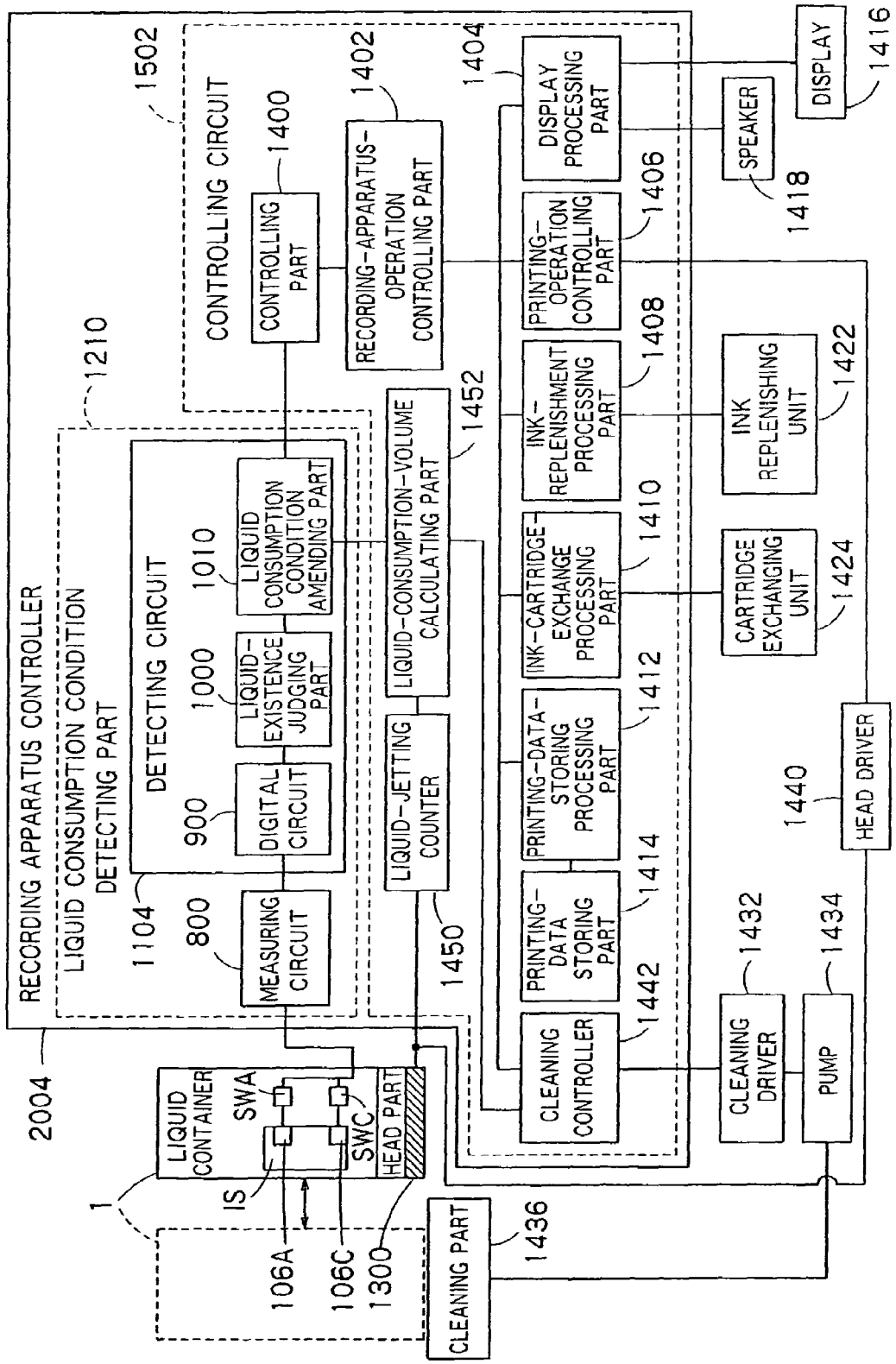
FIG. 12 is a block diagram of another embodiment wherein the recording apparatus controller 2000 shown in FIG. 5 is modified.

FIG. 12 shows an embodiment wherein the recording apparatus controller 2000 shown in FIG. 5 is modified. The liquid container 1 of FIG. 12 is mounted on the carriage so as to communicate with a head part 1300, which can jet the liquid in the liquid container 1 toward a recording medium such as a recording paper to carry out a printing operation. The head part 1300 is adapted to be driven by a head driver 1440. The recording apparatus of FIG. 12 has a cleaning part 1436 that can absorb the liquid from the head part 1300 to clean nozzles in the head part 1300. By a cleaning driver 1432 driving a pump 1434, the cleaning part 1436 is adapted to absorb the liquid from the head part 1300.

A controlling circuit 1502 of a recording apparatus controller 2004 shown in FIG. 12 further includes: a liquid-jetting counter (dot counter) 1450 that can count the number of ink drops jetted from the head part 1300; a liquid-consumption-volume calculating part 1452 that can calculate an ink consumption volume based on the number of ink drops counted by the liquid-jetting counter 1450; and a cleaning controller 1442 that can control the cleaning driver 1432 based on the ink consumption condition detected by the liquid consumption condition detecting part 1210; in addition to the components that the recording apparatus controller 2000 shown in FIG. 5 has. In addition, a detecting circuit 1104 has a liquid consumption condition amending part 1010 that can amend the number of ink drops counted by the liquid-jetting counter 1450 based on the ink consumption condition detected by a plurality of actuators 106A to 106C.

Then, operations of the components newly added in FIG. 12 will be explained. The liquid-jetting counter 1450 counts the number of ink drops jetted from the head part 1300 during the printing operation, and outputs the number to the liquid-consumption-volume calculating part 1452. The liquid-consumption-volume calculating part 1452 calculates an ink volume jetted from the head part based on the number by the liquid-jetting counter 1450.

In addition, the ink is also consumed even when a driving signal not relating to the printing operation is given to the printing head to jet ink drops in vain in order to recover menisci in the nozzles of the head part 1300 from their disordered state or in order to prevent the nozzles from clogging with the ink (flushing operation). Thus, the liquid-jetting counter 1450 also counts the number of ink drops during the flushing operation, and outputs the number to the liquid-consumption-volume calculating part 1452.

The liquid-consumption-volume calculating part 1452 calculates the ink consumption volume from the numbers of ink drops jetted from the head part 1300 during the printing operation and during the flushing operation, and outputs the calculated ink consumption volume to the liquid consumption condition amending part 1010. The ink volume calculated by the liquid-consumption-volume calculating part 1452 is shown by the display 1416 of the display processing part 1404.

In addition, even when the head part 1300 is cleaned by the cleaning part 1436 (cleaning operation), the ink in the liquid container 1 is consumed because the ink in the head part 1300 is absorbed. Thus, the liquid-consumption-volume calculating part 1452 calculates an ink consumption volume during the cleaning operation by multiplying a time for which the cleaning driver 1432 drives the pump 1434 via the cleaning controller 1442 (for example, a time for which the pump 1434 is driven by electric power) and an ink absorbing volume per unit time of the pump 1434 together.

Thus, the liquid-consumption-volume calculating part 1452 calculates the ink consumption volume by means of the liquid-jetting counter 1450 and the cleaning controller 1442. The liquid consumption condition amending part 1010 amends the calculated value by the liquid-consumption-volume calculating part 1452 based on the judgment result of the liquid-existence judging part 1000.

The reason for the two outputs from the liquid-existence judging part 1000 and the liquid-consumption-volume calculating part 1452 to be used for detecting the ink consumption condition is as follows.

The output of the liquid-existence judging part 1000 is information obtained by the plurality of actuators 106A to 106C actually measuring the liquid surface level. On the other hand, the output of the liquid-consumption-volume calculating part 1452 is an estimated ink consumption volume calculated from the number of ink drops counted by the liquid-jetting counter 1450 and the driving time of the pump.

The calculated value may include an error, which may be caused by an ink pressure in the ink cartridge or an ink viscosity changing dependently on a printing manner set by the user or a use environment, for example a case wherein the room temperature is extremely high or low, or a case wherein a long time has passed since the ink cartridge was opened.

Then, the liquid consumption condition amending part 1010 amends the ink consumption volume calculated by the liquid-consumption-volume calculating part 1452, based on the judgment result outputted from the liquid-existence judging part 1000. In addition, the liquid consumption condition amending part 1010 amends parameters in formulas that the liquid-consumption-volume calculating part 1452 uses for calculating the ink consumption volume, based on the judgment result outputted from the liquid-existence judging part 1000. Such an amendment of the parameters in the formulas can make the formulas fit in with the environment where the ink cartridge is used. Thus, a value obtained by the formulas may be closer to an actually used value.

If the actuator 106C detects an "ink-not-existence" condition, the printing-operation controlling part 1406, the ink-replenishment processing part 1408, the ink-cartridge-exchange processing part 1410, the printing-data-storing processing part 1412 and the cleaning controller 1442, which are controlled by the recording-apparatus-operation controlling part 1402, carry out at least one predetermined small-ink-amount dealing-with process.

The printing-operation controlling part 1406 may control the head driver 1440 to stop jetting the ink from the head part 1300 or to reduce the amount of jetted ink. Thus, an unsuitable printing operation after the ink has been exhausted can be avoided.

The cleaning controller 1442 may reduce the amount of absorbed ink by prohibiting the cleaning operation of the head part 1300 by the cleaning part 1436, by reducing the number of cleaning operations or by weakening an absorption force of the pump 1434, as a small-ink-amount dealing-with process. During the cleaning operation of the head part 1300, a relatively large amount of the ink is absorbed from the head part 1300. Thus, if the cleaning operation is prohibited when the amount of residual ink is small, it can be avoided that the small amount of residual ink is absorbed from the head part 1300 for the cleaning purpose. That is, it can be avoided that the ink becomes short due to the cleaning operation. Alternatively, as mentioned above, the number of cleaning operations may be reduced or the absorption force of the pump 1434 may be weakened. The controlling part 1400 selects what kind of small-ink-amount dealing-with process the printing-operation controlling part 1406 and the cleaning controller 1442 carry out, based on the volume of the residual ink in the liquid container 1.

Figure 13:
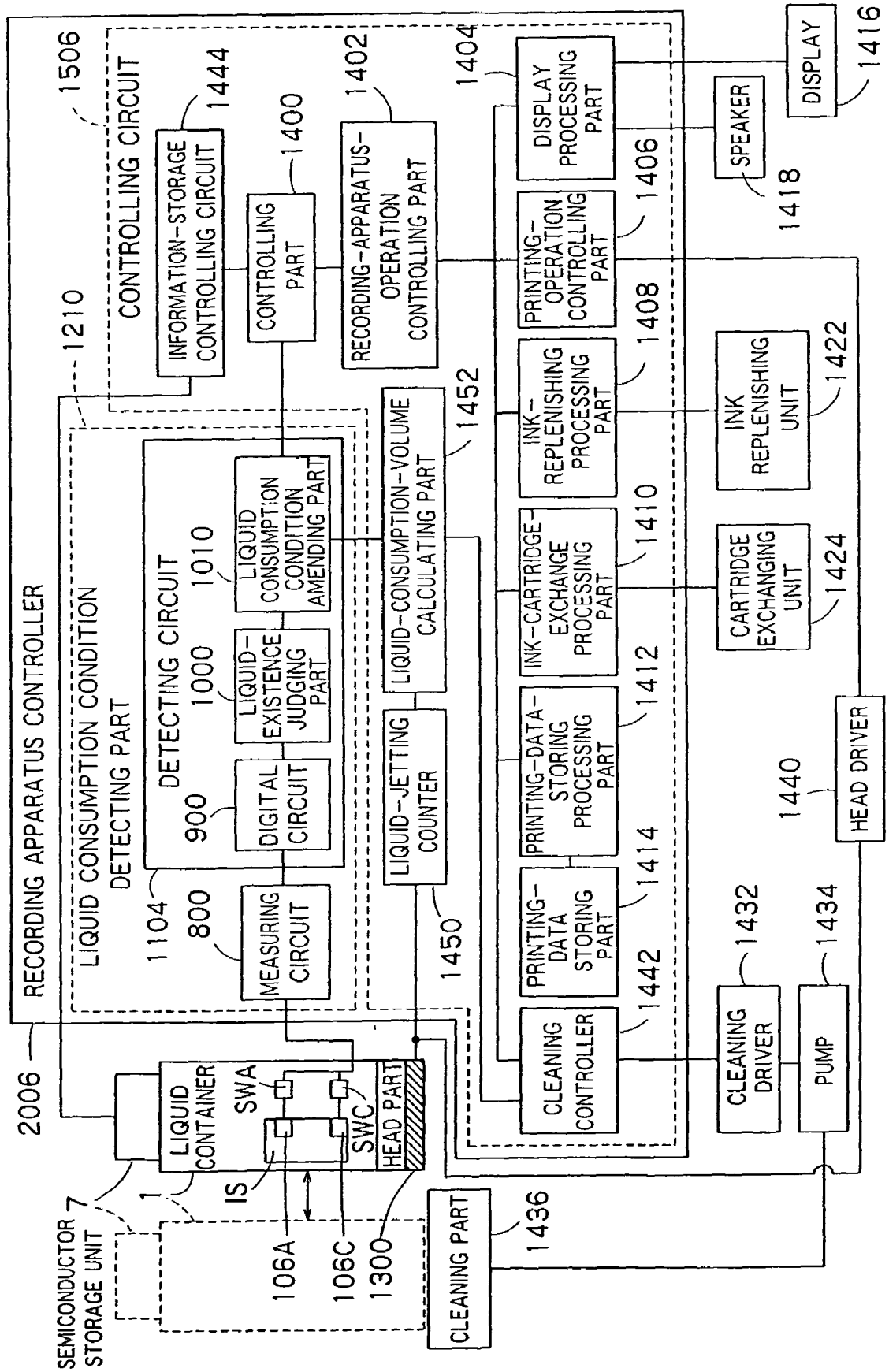
FIG. 13 is a block diagram of another embodiment wherein the recording apparatus controller 2004 shown in FIG. 12 is modified.

FIG. 13 shows an embodiment wherein the recording apparatus controller 2004 shown in FIG. 12 is modified. In the embodiment, a semiconductor storage unit 7 is mounted on the liquid container 1, and a recording apparatus controller 2006 has an information-storage controlling circuit 1444. Other structure is substantially the same as the recording apparatus controller 2004 shown in FIG. 12. Thus, explanation of the components not relating to the semiconductor storage unit 7 and the information-storage controlling circuit 1444 is not repeated.

The liquid container 1 of this embodiment has the semiconductor storage unit 7. The semiconductor storage unit 7 is for example a memory such as an EEPROM that is rewritable. The controlling circuit 1506 has the information-storage controlling circuit 1444.

The liquid consumption condition detecting part 1210 controls the semiconductor switches SWA and SWC and the actuators 106A and 106C to detect a liquid consumption condition in the liquid container 1, and outputs a consumption-relating information, which relates to the detection of the liquid consumption condition by using the actuators 106A and 106C, to the controlling circuit 1506.

The controlling part 1400 writes the consumption-relating information in the semiconductor storage unit 7 via the information-storage controlling circuit 1444. In addition, the information-storage controlling circuit 1444 reads out the consumption-relating information, and outputs it to the controlling part 1400.

Next, the semiconductor storage unit 7 will be explained in detail. The semiconductor storage unit 7 stores the consumption-relating information that relates to the detection of the liquid consumption condition by using the actuators 106A and 106C. The consumption-relating information includes information of a detected liquid consumption condition. The information-storage controlling circuit 1444 writes the information of the liquid consumption condition obtained by using the actuators 106A and 106C, in the semiconductor storage unit 7. Then, the consumption condition information is readout, and used in the recording apparatus controller 2006.

Especially if the liquid container 1 is removable, it is advantageous for the semiconductor storage unit 7 to store the consumption condition information. For example, it is assumed that the liquid container 1 is removed from the ink-jet recording apparatus when the liquid is halfway consumed. Then, the semiconductor storage unit 7 storing the consumption condition information is always together with the liquid container 1. After that, the liquid container 1 may be mounted on the same ink-jet recording apparatus again or another ink-jet recording apparatus. At that time, the consumption condition information is read out from the semiconductor storage unit 7, and the recording apparatus controller 2006 operates based on the consumption condition information. For example, even when the liquid container 1 containing no or only little liquid is mounted, the matter can be informed the user. Thus, when the liquid container 1 is removable, the consumption condition information of the liquid container 1 to that point can be used surely.

The semiconductor storage unit 7 can store a liquid consumption condition calculated by the liquid-consumption-volume calculating part 1452 based on the number of ink drops counted by the liquid-jetting counter 1450. The actuators 106A and 106C can surely detect respective passages of the liquid surface level through the respective mounting positions. However, it is difficult to detect an ink consumption condition before and after the passages of the liquid surface level. Thus, it is preferable to estimate the ink consumption condition before and after the passages of the liquid surface level from the liquid consumption condition calculated by the liquid-consumption-volume calculating part 1452 and to make the semiconductor storage unit 7 store the estimated value.

In addition, the consumption-relating information includes detection characteristic information to be detected correspondingly to a liquid consumption condition. In this embodiment, as the detection characteristic information, before-consumption detection characteristic information and after-consumption detection characteristic information are stored. The before-consumption detection characteristic information means a detection characteristic before the ink consumption is started, that is, a detection characteristic at an ink-full condition. The after-consumption detection characteristic information means a detection characteristic to be detected when the ink is consumed to a predetermined detection target, in detail, a detection characteristic when the ink surface level goes down through the mounting position level of the actuator.

The information-storage controlling circuit 1444 reads out the detection characteristic information from the semiconductor storage unit 7. The liquid consumption condition detecting part 1210 detects a liquid consumption condition by using the actuators, based on the detection characteristic information. If a signal corresponding to the before-consumption detection characteristic is obtained, it is assumed that the ink is not consumed so much and that the volume of the residual ink is large. At least, it can be surely seen that the ink surface level is above the actuator. On the other hand, if a signal corresponding to the after-consumption detection characteristic is obtained, it is assumed that the ink is consumed so much and that the volume of the residual ink is small. That is, it can be seen that the ink surface level is below the actuator.

One advantage of making the semiconductor storage unit 7 store the detection characteristic information will be explained.

The detection characteristic information depends on various factors such as a shape of the liquid container 1, a spec of the actuator, a spec of the ink and so on. Thus, if a design is modified for an improvement or the like, the detection characteristic may be changed thereby. If the liquid consumption condition detecting part 1210 always uses the same detection characteristic information, it is difficult to deal with the change in the detection characteristic. However, according to this embodiment, the detection characteristic information is stored in the semiconductor storage unit 7, and is used effectively. Thus, it is easy to deal with the change in the detection characteristic. For example, even if a liquid container 1 having a new spec is provided, the recording apparatus controller 2006 can easily use detection characteristic information of the liquid container 1.

Even if the spec of the liquid container 1 is the same, the liquid-detection characteristic may be not the same due to manufacture irregularity or the like. For example, the detection characteristic may be different dependently on a shape and/or a thickness of the liquid container 1. Thus, more preferably, detection characteristic information for each liquid container 1 is measured and stored in the semiconductor storage unit 7. In this embodiment, each liquid container 1 has a semiconductor storage unit 7, so that the semiconductor storage unit 7 can store original detection characteristic information. Thus, effect of the manufacture irregularity to the detection may be reduced, so that the detection accuracy may be improved. Thus, this embodiment has an advantage that it can deal with the difference in the detection characteristics of the respective liquid containers 1.

In addition, an ink consumption volume can be detected based on a relative condition (relationship) between characteristic values of the actuators 106A and 106C. In detail, the semiconductor storage unit 7 stores a vibration characteristic value of the actuator 106A detected when a predetermined volume of the ink in the ink cartridge is consumed so that the ink doesn't exist in the vicinity of the actuator 106A. If a vibration characteristic value detected by the actuator 106C becomes substantially equal to the vibration characteristic value of the actuator 106A, it can be judged that the ink surface level passes through the actuator 106C. Since the actuator 106C is arranged in the vicinity of an ink surface level in an ink-end condition, the ink-end condition can be detected when it is judged that the ink surface level has passed through the actuator 106C. In this embodiment, it is unnecessary to measure the vibration characteristic values of the actuators 106A and 106C when the ink doesn't exist in the container 1 in manufacturing steps thereof. Thus, it becomes easier to manufacture the actuators 106A and/or 106C and/or the ink cartridge. The manufacturing steps can be reduced or shortened. It is preferable that the actuators 106A and 106C are manufactured in the same lot. If so, characteristics of the actuators 106A and 106C may be substantially the same. If the actuators 106A and 106C have the same characteristics, the ink condition in the ink cartridge can be detected more precisely.

Figure 14:
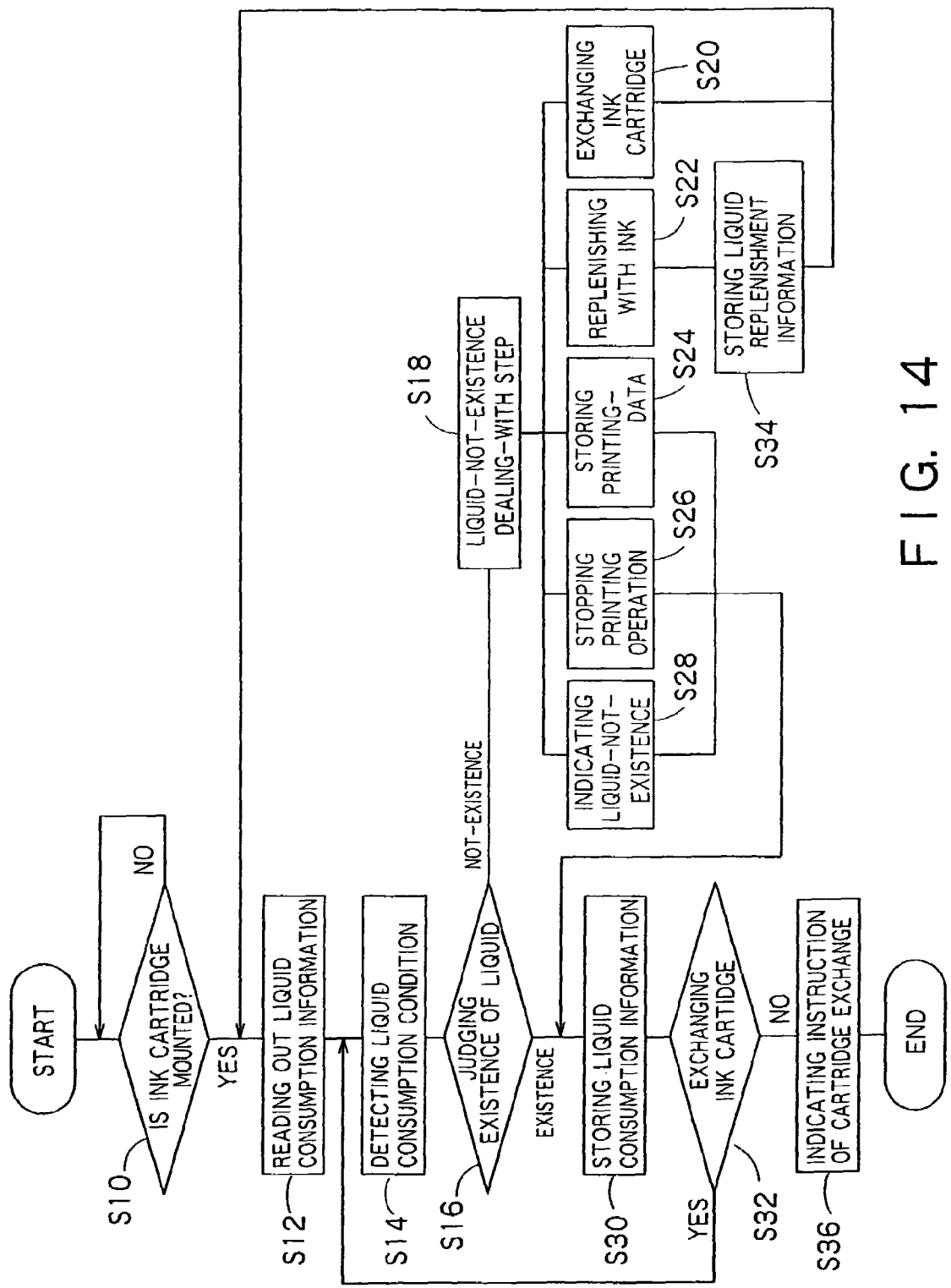
FIG. 14 is a flow chart showing an operation procedure of the recording apparatus controller 2006 shown in FIG. 13.

FIG. 14 is a flow chart showing an operation procedure of the recording apparatus controller 2006 shown in FIG. 13.

At first, it is judged whether an ink cartridge is mounted or not (S10). That is, it can be detected that a new ink cartridge or a halfway-used ink cartridge has been mounted. A switch (not shown) or the like, which is provided in the ink-jet recording apparatus, is used for this process.

If the ink cartridge is mounted, consumption-relating information including detection characteristic information or the like is read out from a semiconductor storage unit 7 (S12). The display processing part 1404, the printing-operation controlling part 1406, the ink-replenishment processing part 1408, the ink-cartridge-exchange processing part 1410, the printing-data-storing processing part 1412 and the cleaning controlling part 1442 uses the read out consumption-relating information. For example, if it is seen from the read out consumption-relating information that the volume of the residual liquid in the liquid container 1 is small, the display 1416 may show the fact that the volume of the residual liquid is small, or the operation of the head part 1300 may be stopped.

The liquid consumption condition detecting part 1210 detects a liquid consumption condition by using the actuators 106A to 106C, based on the read out detection characteristic information (S14). Based on the detected liquid consumption condition, it can be judged whether the liquid exists in the liquid container 1 or not (S16). If a "liquid-not-existence" condition is detected, a liquid-not-existence dealing-with step (S18) is carried out. In the liquid-not-existence dealing-with step (S18), a step of storing the printing data by the printing-data-storing processing part 1412 (S24), a step of stopping the printing operation by the printing-operation controlling part 1406 (S26) and a step of indicating the fact being the "liquid-not-existence" condition by the display processing part 1404 (S28) are included.

In the case, due to the step of indicating the fact being the "liquid-not-existence" condition (S28), the user can exchange the ink cartridge as described below. That is, the ink-jet recording apparatus can be replenished with the ink.

Alternatively, as the liquid-not-existence dealing-with step (S18), the ink cartridge may be automatically exchanged by the ink-cartridge-exchange processing part 1410 (S20), or the ink may be automatically replenished by the ink-replenishment processing part 1408 (S22). In the case, the ink is automatically replenished for the ink-jet recording apparatus, so that it is unnecessary for the user to exchange the ink cartridge. In the case, the procedure goes back to the step of reading out the liquid consumption information (S12) without carrying out a step of judging a cartridge exchange (S32). In addition, when the ink-replenishment step (S22) is carried out, after the ink is replenished, the semiconductor storage unit 7 stores information about how much ink the recording apparatus is replenished with (S34).

After the printing-data storing step (S24), the printing-operation stopping step (S26) and/or the liquid-not-existence displaying step (S28) has been carried out as the liquid-not-existence dealing-with step (S18), the detected liquid consumption condition is stored in the semiconductor storage unit 7 (S30). The user can know the fact that the ink is not in the ink cartridge, due to the liquid-not-existence displaying step (S28). Thus, the user can exchange the ink cartridge according to an instruction of the liquid-not-existence displaying step (S28). In the case (S32, Y), the procedure goes back to the step of detecting a liquid consumption condition (S14). On the other hand, if the user doesn't exchange the ink cartridge, indication for further urging the user to exchange the ink cartridge may be given by the display or the speaker, and then the procedure ends.

Figure 15:
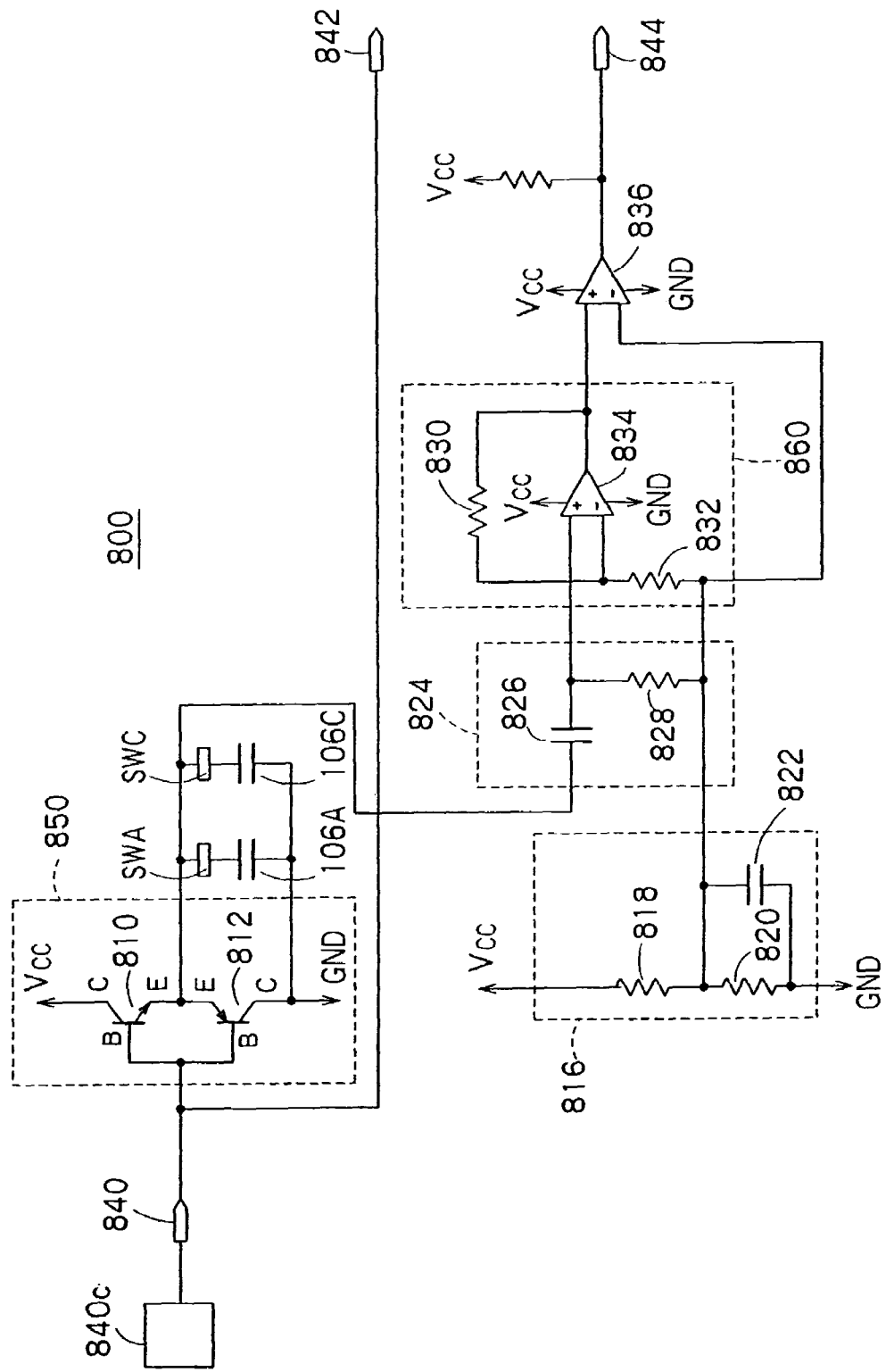
FIG. 15 is a diagram showing a circuit structure of the measuring circuit 800.

FIG. 15 is a diagram showing a circuit structure of the measuring circuit 800. The measuring circuit 800 includes a driving-voltage generating part 850, a standard-voltage generating part 816, a high-pass filter 824, an amplifying part 860 and a comparator 836. The driving-voltage generating part 850 includes two bipolar transistors of an NPN transistor 810 and a PNP transistor 812, whose base terminals B are connected to each other and whose emitter terminals E are connected to each other. The NPN transistor 810 and the PNP transistor 812 are transistors for driving the actuators 106A and 106C. One side terminals of both the actuators 106A and 106C are connected to the emitter terminals E of the NPN transistor 810 and the PNP transistor 812, which are connected to each other, via the semiconductor switches SWA and SWC, respectively. The other side terminals of them are connected to ground (earth) GND. Alternatively, the other side terminals of the actuators 106A and 106C may be connected to a power source Vcc (5V).

If a trigger signal inputted from a terminal 840 to the driving-voltage generating part 850 is switched from LOW to HIGH, the base terminals B of the NPN transistor 810 and the PNP transistor 812, which are connected to each other, stand up (rise), and the NPN transistor 810 and the PNP transistor 812 amplify a current of the inputted trigger signal and give it to one actuator via a connected semiconductor switch. In the case shown in FIG. 15, a voltage between the emitter terminal E and a collector terminal C of the PNP transistor 812 is applied to the actuator. Thus, the actuator is rapidly charged, and hence is caused to vibrate. Then, the actuator generates a counter electromotive force due to residual vibration after caused to vibrate. The counter electromotive force generated by the residual vibration of the actuator is outputted to the amplifying part 860 via the high-pass filter 824.

The NPN transistor 810 (the PNP transistor 812 is similar) has a P-N connection between the base terminal B and the emitter terminal E. Thus, if a voltage difference between the base terminal B and the emitter terminal E is not greater than 0.6 V, little current flows to the emitter terminal E. However, if a voltage difference between the base terminal B and the emitter terminal E is greater than 0.6 V, a greatly amplified current flows to the emitter terminal E. That is, each of the NPN transistor 810 and the PNP transistor 812 has an insensitive band or a bias voltage of 0.6 V. Thus, in total, the NPN transistor 810 and the PNP transistor 812 has a bias voltage of about 1.2 V. If a voltage between the terminals including the counter electromotive force of the actuator is within the insensitive band, the transistors don't operate and the current doesn't flow to the emitter terminals, that is, the residual vibration of the actuator is not restrained by operation of the transistors. If the insensitive band is not provided, the voltage of the actuator is controlled by the transistors to be fixed, that is, it becomes impossible to measure the counter electromotive force.

In FIG. 15, the NPN transistor 810 and the PNP transistor 812 are used as the bipolar transistors. However, electric-field-effect transistors may be used instead of the bipolar transistors. In the case, an N-type electric-field-effect transistor is arranged at a position at which the NPN transistor in FIG. 15 is arranged. A gate of the N-type electric-field-effect transistor is arranged at a position at which the base terminal B of the NPN transistor 810 in FIG. 15 is arranged. A source thereof is arranged at a position at which the emitter terminal E of the NPN transistor in FIG. 15 is arranged. In addition, an P-type electric-field-effect transistor is arranged at a position at which the PNP transistor 812 in FIG. 15 is arranged. A gate of the P-type electric-field-effect transistor is arranged at a position at which the base terminal B of the PNP transistor 812 is arranged. A source thereof is arranged at a position at which the emitter terminal E of the PNP transistor 812 is arranged. In addition, the gates of the P-type electric-field-effect transistor and the N-type electric-field-effect transistor are connected with each other, and the sources of the P-type electric-field-effect transistor and the N-type electric-field-effect transistor are connected with each other. It is preferable that one side terminals of the actuators are connected to the sources of the P-type electric-field-effect transistor and the N-type electric-field-effect transistor, which are connected to each other, via the semiconductor switches, respectively, and that the other side terminals of the actuators are connected to a power source Vcc or a ground (earth) GND.

The high-pass filter 824 has a capacitor 826 and a resistor 828. The output of the driving-voltage generating part 850 is outputted to the amplifying part 860 via the high-pass filter 824. The high-pass filter 824 outputs a high-frequency component of the output from the actuator to the amplifying part 860 and removes a low-frequency component thereof. In addition, the high-pass filter 824 has a role of adjusting the output in such a manner that the output of the amplifying part 860 is within a range of 0 to 5 V (Vcc) with respect to the standard voltage.

The standard-voltage generating part 816 has resistors 818 and 820 that are connected in series, and a capacitor 822 that is connected parallel to the resistor 820. Thus, the standard-voltage generating part 816 generates a stable direct-current voltage of about 2 to 3 V as a standard voltage, and supplies it to the high-pass filter 824, the amplifying part 860 and the comparator 836. Thus, voltages of signal waveforms outputted from the high-pass filter 824 and the amplifying part 860 oscillate around the standard voltage.

The amplifying part 860 has an operational amplifier 834, and resistors 830 and 832. The operational amplifier 834 and the resistors 830 and 832 are formed as a not-inverting amplifying circuit that amplifies an input signal without inverting and outputs it. The counter electromotive force signal that is outputted from the driving-voltage generating part 850 is inputted to a plus terminal of the operational amplifier 834 via the high-pass filter 824. A minus terminal of the operational amplifier 834 is connected to an output terminal via the negative-feedback resistor 830, and to the standard voltage via the resister 832. Thus, the faint counter electromotive force signal that is outputted from the actuator is amplified around the standard voltage, and then outputted to the comparator 836. The waveform of the amplified counter electromotive force signal may be indicated as an analogue waveform shown in FIG. 4A.

The voltage of the counter electromotive force signal outputted from the amplifying part 860 and the standard voltage generated by the standard-voltage generating part 816 are inputted to the comparator 836. If the voltage of the counter electromotive force signal is higher than the standard voltage, the comparator 836 outputs a signal of HIGH, and if the voltage of the counter electromotive force signal is lower than the standard voltage, the comparator 836 outputs a signal of LOW. Thus, a digital-waveform counter electromotive force signal is generated. That is, since the output of the operational amplifier 834 oscillates around the standard voltage and the minus terminal of the comparator 836 has the same voltage as the standard voltage, the comparator 836 compares the voltage of the counter electromotive force signal to the standard voltage and outputs the digital-waveform counter electromotive force signal. The comparator 836 outputs the generated digital-waveform counter electromotive force signal to a terminal 844.

As described above, the supply of the driving voltage signal to the piezoelectric device is carried out by an input of a trigger signal from the terminal 840. The input of the trigger signal may be carried out by a controlling unit 840c. For example, the controlling unit 840c may be provided in an ink-jet recording apparatus or another liquid consuming apparatus in which the liquid container is mounted.

Figure 16:
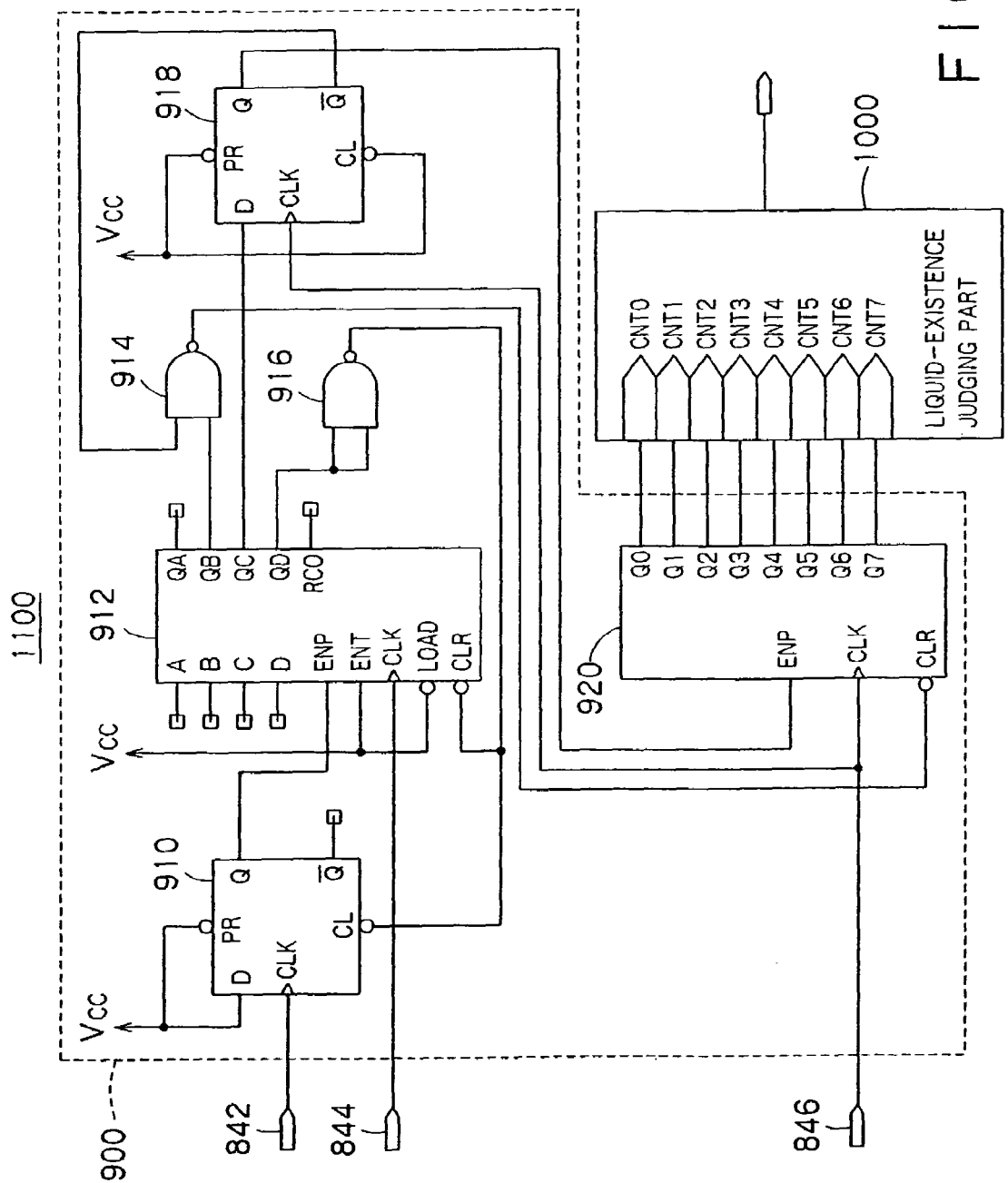
FIG. 16 is a diagram showing a circuit structure of the detecting circuit 1100.

FIG. 16 shows a circuit structure of the detecting circuit 1100 of FIG. 5. The detection circuit 1100 has the digital circuit 900 and the liquid-existence judging part 1000. The digital circuit 900 has: flip-flop circuits 910 and 918, counters 912 and 920, and NAND gates 914 and 916. The counter 920 maintains the highest value after counting the highest value (1111, 1111), without becoming a value (0000, 0000) even if the next clock pulse is inputted.

When a trigger signal is inputted from a terminal 842 to a clock-input pin CLK of the flip-flop circuit 910, the flip-flop circuit 910 outputs a signal, which controls the counter 912 to start the measurement of the number of pulses in the counter electromotive force signal outputted from the measuring circuit 800, to the counter 912. In addition, when the counter 912 counts eight pulses in the counter electromotive force signal, the flip-flop circuit 910 is cleared via the NAND gate 916. Thus, the flip-flop circuit 910 supplies a signal being HIGH from a timing the trigger signal has been inputted to the eighth pulse of the counter electromotive force signal, to a count-enabling terminal ENP of the counter 912.

The counter 912 counts the number of clock pulses only while the signal inputted to the counter-enabling terminal ENP is HIGH. The counter 912 starts to count the number of pulses of the counter electromotive force signal just after the trigger signal has been inputted to the flip-flop circuit 910, and stops counting the number of pulses when the eight pulses are counted so that the signal inputted to the counter-enabling terminal ENP becomes LOW. The counter 912 outputs a signal being HIGH from fourth pulse to eighth pulse from an output pin QC to an input pin D of the flip-flop circuit 918.

The flip-flop circuit 918 receives the signal being HIGH from the fourth pulse to the eighth pulse, which is outputted from the counter 912, from the input pin D. The flip-flop circuit 918 receives a clock pulse signal having a frequency of 16 MHz, which is inputted through the terminal 846, from a clock-input pin CLK. Then, the flip-flop circuit 918 outputs the signal inputted from the input-pin D while synchronizing the signal with the clock pulse signal.

The counter 920 receives the same clock pulse (16 MHz) as inputted to the flip-flop circuit 918, from a clock-input pin CLK. Thus, the counter 920 operates synchronously with the flip-flop circuit 918, so that it can count the number of pulses of the clock pulse of 16 MHz while the output of the output pin Q is HIGH, that is, from the fourth pulse to the eighth pulse. By counting the number of pulses of the clock pulse of 16 MHz, a time for which the four pulses from the fourth pulse to eighth pulse are generated can be measured. The counter 920 outputs the counted value to the liquid-existence judging part 1000. In addition, before the output pin Q of the flip-flop circuit 918 becomes HIGH, that is, before the counter 920 operates, an output of an output pin density $\overline{Q}$ of the flip-flop circuit 918 and an output of an output pin QB of the counter 912 are processed for a NAND calculation at the NAND gate 914, inputted to a clear-input pin CLR of the counter 920 to clear the counter 920.

In the circuit shown in FIG. 16, the number of pulses of the clock pulse of 16 MHz appearing between the 4th pulse and the 8th pulse of the counter electromotive force waveform is counted. However, by adding and/or combining a counting circuit that uses the output of the counter 912, the 8th pulse may be replaced with any other pulse. That is, a time between any two counts can be detected.

Figure 17:
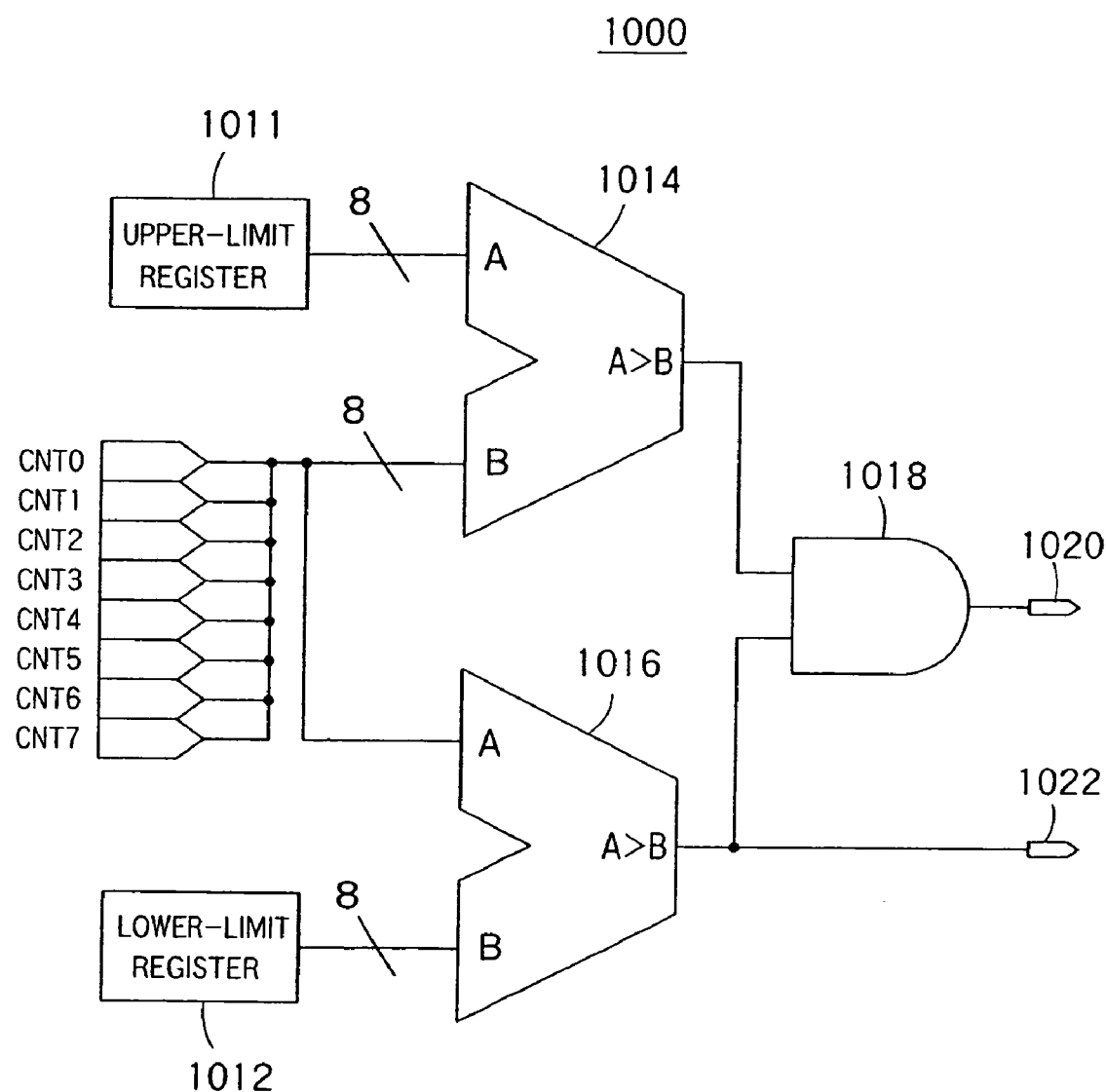
FIG. 17 is a diagram showing a detailed circuit structure of the liquid-existence judging part 1000 shown in FIG. 16.

FIG. 17 shows a detailed circuit structure of the liquid-existence judging part 1000 shown in FIG. 16. The liquid-existence judging part 1000 judges whether the liquid exists in the liquid container 1 or not, based on the counted value of the number of clock pulses of 16 MHz appearing between the 4th pulse and the 8th pulse of the counter electromotive force signal, which is outputted by the counter 920. As shown in FIG. 17, the liquid-existence judging part 1000 has an upper-limit register 1011, a lower-limit register 1012, comparators 1014 and 1016, and an AND gate 1018. An upper limit of the counted value is stored in the upper-limit register 1011. A lower limit of the counted value is stored in the lower-limit register 1012.

The comparator 1014 receives the counted value outputted from the digital circuit 900 via a B terminal, and receives the upper limit of the counted value from the upper-limit register 1011 via an A terminal. If the counted value is smaller than the upper limit value, the comparator 1014 outputs a signal being HIGH to the AND gate 1018. On the other hand, if the counted value is larger than the upper limit value, the comparator 1014 outputs a signal being LOW to the AND gate 1018. If the counted value is larger than the upper limit value, the frequency of the counter electromotive force waveform is lower than a lower limit thereof, which means that the counter electromotive force waveform has been measured not normally. That is, there is a possibility that the liquid container is not mounted on the recording apparatus or that the liquid container is unstably mounted thereon.

On the other hand, the comparator 1016 receives the counted value outputted from the digital circuit 900 via an A terminal, and receives the lower limit of the counted value from the lower-limit register 1012 via a B terminal. If the counted value is larger than the lower limit value, the comparator 1016 outputs a signal being HIGH to the AND gate 1018 and a terminal 1022. On the other hand, if the counted value is smaller than the lower limit value, the comparator 1016 outputs a signal being LOW to the AND gate 1018 and the terminal 1022. If the counted value is smaller than the lower limit value, the liquid in the liquid container 1 may not exist at the mounting position of the actuator 106.

If both the comparators 1014 and 1016 output respective HIGH signals, that is, if the counted value is smaller than the upper limit value and larger than the lower limit value, the AND gate 1018 outputs a signal being HIGH. In the case, the frequency of the counter electromotive force waveform is lower than an upper limit thereof, so that the liquid in the liquid container 1 exists at the mounting position level of the actuator 106. In addition, since the frequency of the counter electromotive force waveform is higher than an lower limit thereof, it can be seen that the liquid container 1 is surely attached to the recording apparatus and the liquid exists at the mounting position level of the actuator 106. That is, the case wherein the terminal 1020 is HIGH is a normal case wherein the liquid container 1 is surely attached to the recording apparatus and the liquid exists at the mounting position level of the actuator 106.

If the comparator 1014 outputs a LOW signal and the comparator 1016 outputs a HIGH signal, that is, if the counted value is larger than the upper limit value and larger than the lower limit value, the AND gate 1018 outputs a signal being LOW. Then, the signal being HIGH is inputted to the terminal 1022. The case is abnormal because the terminal 1020 is LOW. In addition, the case can be judged that the liquid container 1 is not mounted on the recording apparatus or is unstably mounted thereon because the terminal 1022 is HIGH.

If the comparator 1014 outputs a HIGH signal and the comparator 1016 outputs a LOW signal, that is, if the counted value is smaller than the upper limit value and smaller than the lower limit value, the AND gate 1018 outputs a signal being LOW. The case is abnormal because the terminal 1020 is LOW. In addition, the case can be judged that the liquid doesn't exist at the mounting position level of the actuator 106 because the terminal 1022 is LOW.

Each component of the measuring circuit 800 and each component of the detecting circuit 1100 may be independently provided for each actuator. According to such a liquid consumption condition detecting part 1200, the detection of the liquid consumption condition by each actuator may be carried out at the same time. In the case, as described above, the liquid consumption condition can be judged by whether resonance frequencies detected from the two actuators 106A and 106C are the same or not.

Figure 18:
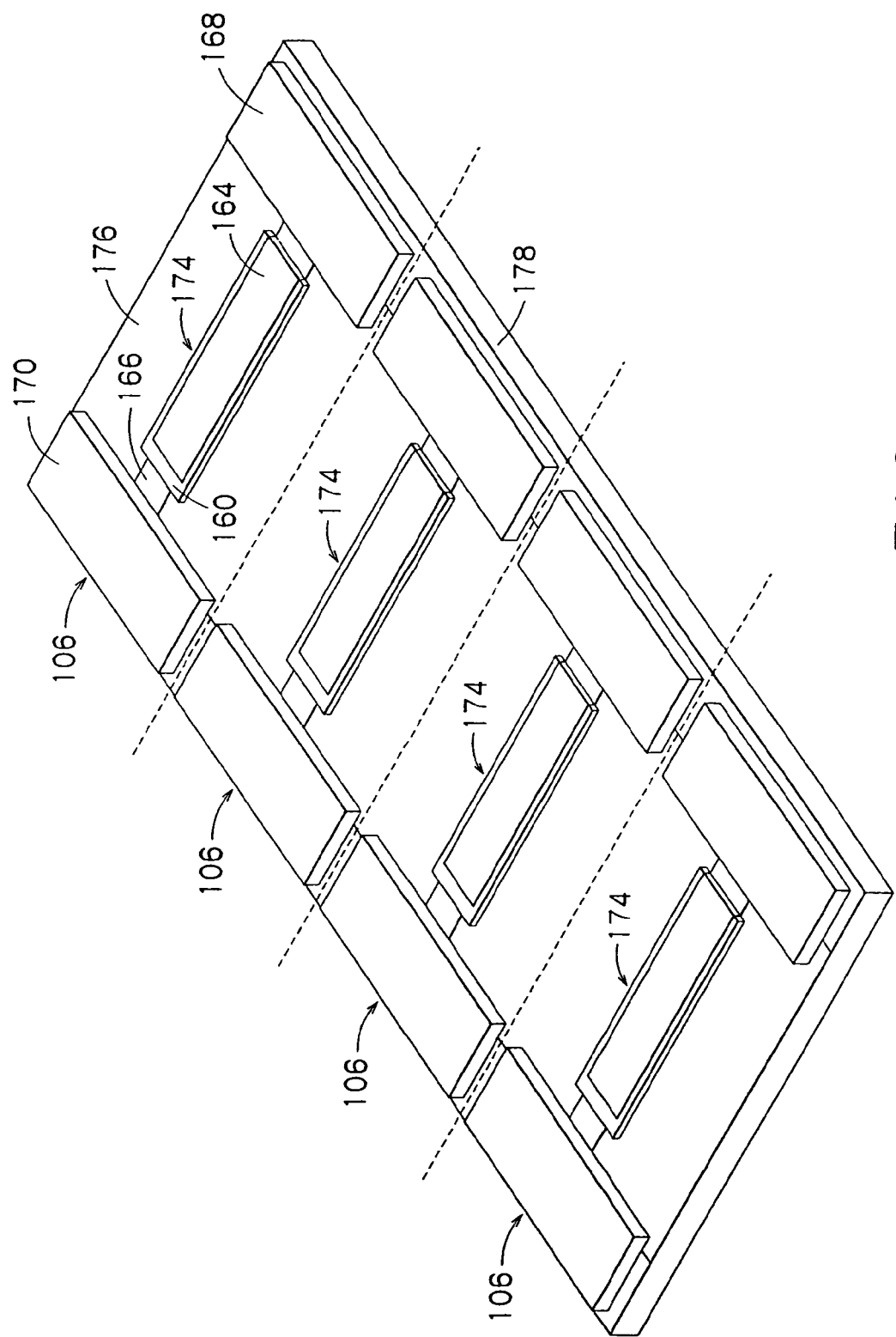
FIG. 18 is a perspective view of another embodiment of the actuator 106.

FIG. 18 shows a manufacturing method of the actuator 106.

In FIG. 18, a plurality of actuators 106 (four actuators 106, in the case of FIG. 18) are formed integrally. If the integrated structure including the plurality of actuators 106 shown in FIG. 18 is cut off separately, an actuator shown in FIG. 19 can be manufactured. If respective piezoelectric devices of the integrated plurality of actuators 106 are circular, the actuator 106 shown in FIG. 1 can be manufactured when the integrated structure is cut off separately. By forming the plurality of actuators 106 integrally, the plurality of actuators 106 can be manufactured efficiently at the same time and can be conveyed easily.

The actuator 106 has a thin plate or a vibrating plate 176, a substrate 178, an elastic-wave generating means or a piezoelectric device 174, a terminal-forming member or an upper electrode terminal 168, and a terminal-forming member or a lower electrode terminal 170.

The piezoelectric device 174 includes a piezoelectric vibrating plate or a piezoelectric layer 160, an upper electrode 164 and a lower electrode 166. The vibrating plate 176 is formed on an upper surface of the substrate 178. The lower electrode 166 is formed on an upper surface of the vibrating plate 176. The piezoelectric layer 160 is formed on an upper surface of the lower electrode 166. The upper electrode 164 is formed on an upper surface of the piezoelectric layer 160. Thus, a main part of the piezoelectric layer 160 is sandwiched between a main part of the upper electrode 164 and a main part of the lower electrode 166.

In the case of FIG. 18, a plurality of (four) piezoelectric devices 174 are formed on the vibrating plate 176. A lower electrode 166 is formed on an upper surface of each vibrating plate 176. A piezoelectric layer 160 is formed on an upper surface of each lower electrode 166. An upper electrode 164 is formed on an upper surface of each piezoelectric layer 160. An upper electrode terminal 168 is formed at an end of the upper electrode 164, and a lower electrode terminal 170 is formed at an end of the lower electrode 166.

Then, the four actuators 106 are cut off separately, so that each of the actuators 106 can be used individually.

FIG. 19 is a cross sectional view of a portion of an actuator 106 including a rectangular piezoelectric device. FIG. 20 is a cross sectional view of the whole of the actuator 106 shown in FIG. 19.

As shown in FIG. 20, the substrate 178 has a through hole 178a at an area facing the piezoelectric device 174. The through hole 178a is sealed by the vibrating plate 176. The vibrating plate 176 is formed by an electric insulating and elastically deformable material, such as alumina, zirconium oxide, and so on.

The piezoelectric device 174 is formed on the vibrating plate 176 at a position corresponding to the through hole 178a. The lower electrode 166 is formed on the vibrating plate 176 to extend from the area of the through hole 178a toward a predetermined direction (left direction, in the case of FIG. 20). The upper electrode 164 is formed on the piezoelectric layer 160 to extend from the area of the through hole 178a toward an opposite direction with respect to the lower electrode (right direction, in the case of FIG. 20).

The upper electrode terminal 168 and the lower electrode terminal 170 are formed on upper surfaces of an assistance electrode 172 and the lower electrode 166, respectively. The lower electrode terminal 170 is electrically in contact with the lower electrode 166. The upper electrode terminal 168 is electrically in contact with the upper electrode 164 via the assistance electrode 172. Thus, signals can be transferred between the piezoelectric device and an outside of the actuator 106. Each of the upper electrode terminal 168 and the lower electrode terminal 170 has a height greater than that of the piezoelectric device 174 including the electrodes 164 and 166 and the piezoelectric layer 160.

Figure 21:
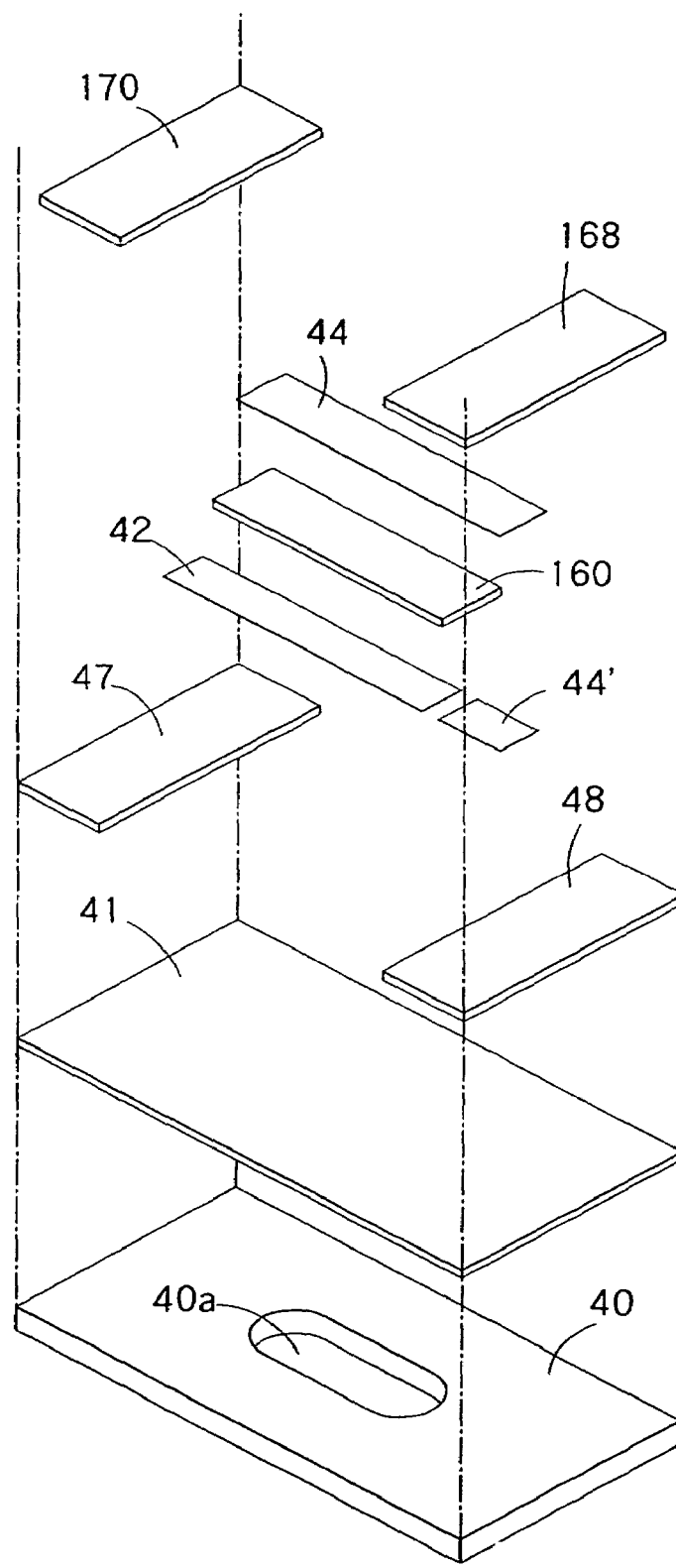
FIG. 21 is a perspective view for explaining a manufacturing method of the actuator 106 shown in FIG. 18.

FIG. 21 shows a manufacturing method of the actuator 106 shown in FIG. 18.

At first, a through hole 40a is formed in a green sheet 40 by a press process or a laser-machining process. The green sheet 40 is to be baked in order to become the substrate 178. The green sheet 40 is formed by a material such as ceramics or the like.

Then, another green sheet 41 is layered on an upper surface of the green sheet 40. The green sheet 41 is to be baked in order to become the vibrating plate 176. The green sheet 41 is formed by a material such as zirconium oxide or the like.

Next, an electric conductive layer 42, a piezoelectric layer 160 and an electric conductive layer 44 are formed in turn on a surface of the green sheet 41 by means of a pressure-membrane-printing method or the like. The electric conductive layer 42 is adapted to become the lower electrode 166. The electric conductive layer 44 is adapted to become the upper electrode 164.

Then, the green sheets 40 and 41, the electric conductive layer 42, the piezoelectric layer 160 and the electric conductive layer 44 are dried and baked.

Spacer members 47 and 48 are adapted to increase heights of the upper electrode terminal 168 and the lower electrode terminal 170 more than that of the piezoelectric device, respectively. The spacer members 47 and 48 are formed by the same material as the green sheet 40 or 41 by a printing process or a layering process. Since the spacer members 47 and 48 are used, an amount of the material for the upper electrode 168 and the lower electrode 170, which is noble metal, can be reduced. In addition, since thicknesses of the upper electrode 168 and the lower electrode 170 can be reduced, the upper electrode 168 and the lower electrode 170 can be printed more precisely, so that the heights thereof can be adjusted more precisely.

If a connecting part 44' for the electric conductive layer 44 and the spacer members 47 and 48 are formed at the same time when the electric conductive layer 42 is formed, the upper electrode 168 and the lower electrode 170 can be formed more easily and fixed more strongly. At last, the upper electrode terminal 168 and the lower electrode terminal 170 are formed at opposite end regions of the electric conductive layers 42 and 44, respectively. When the upper electrode terminal 168 and the lower electrode terminal 170 are formed, the upper electrode terminal 168 and the lower electrode terminal 170 are electrically connected to the piezoelectric layer 160.

Figure 22A:
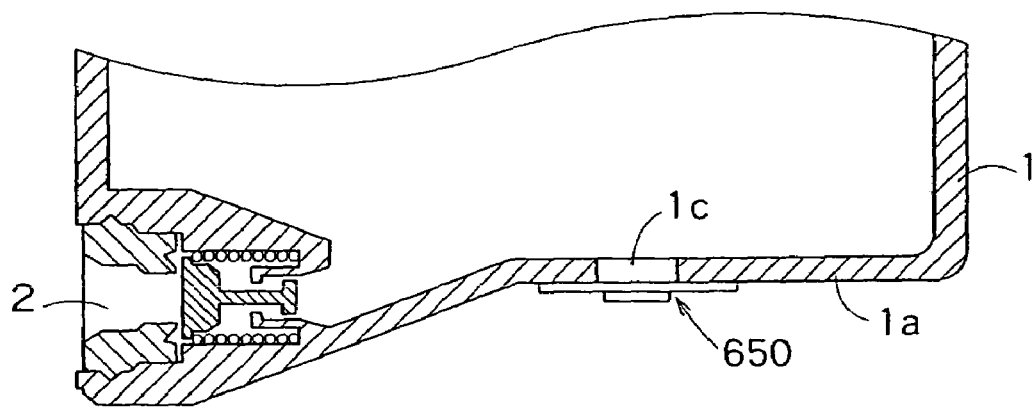
FIGS. 22A to 22C are cross sectional views and a plan view of another embodiment of the ink cartridge.
Figure 22B:
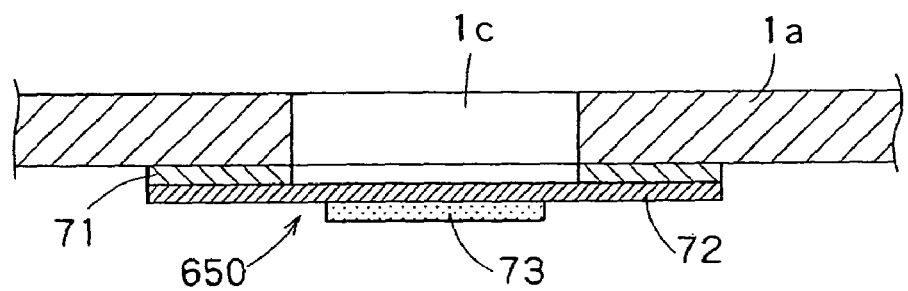
Figure 22C:
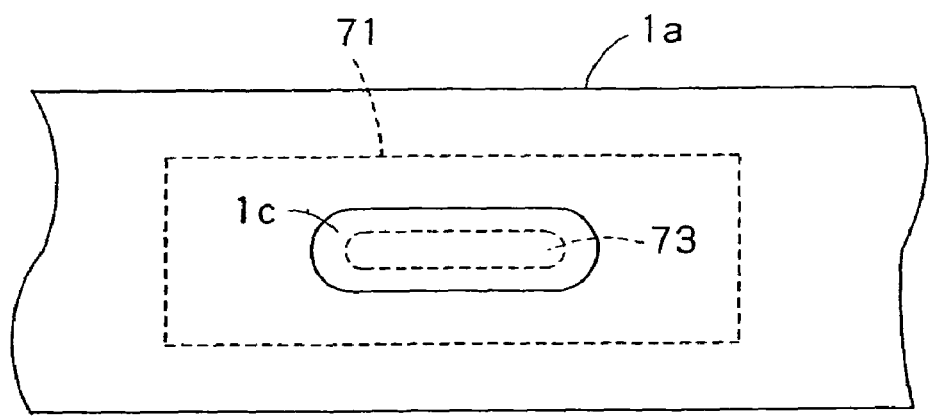

FIGS. 22A to 22C show another embodiment of an ink cartridge according to the invention. FIG. 22A is a cross sectional view of a base portion of the ink cartridge of the embodiment. The ink cartridge of the embodiment has a through hole 1c at a base wall 1a of a container 1 that contains an ink. A base portion of the through hole 1c is sealed by an actuator 650, which forms an ink stagnant area.

FIG. 22B is a detailed cross sectional view of the actuator 650 and the through hole 1c shown in FIG. 22A. FIG. 22C shows a plan view of the actuator 650 and the through hole 1c shown in FIG. 22B. The actuator 650 has a vibrating plate 72 and a piezoelectric device 73 fixed to the vibrating plate 72. The actuator 650 is fixed to the base wall of the container 1 in such a manner that the piezoelectric device 73 faces the through hole 1c via the vibrating plate 72 and a substrate 71. The vibrating plate 72 is elastically deformable and ink-resistant.

Depending on an amount of the ink in the container 1, amplitude and frequency of an counter electromotive force generated by residual vibration of the piezoelectric device 73 and the vibrating plate 72 may change. Since the through hole 1c is formed at the position facing the actuator 650, a predetermined minimum amount of the ink is saved in the through hole 1c. Thus, if a characteristic of the vibration of the actuator 650, which is determined by the amount of the ink saved in the through hole 1c, is measured in advance, an ink-end condition of the container 1 can be surely detected.

Figure 23A:
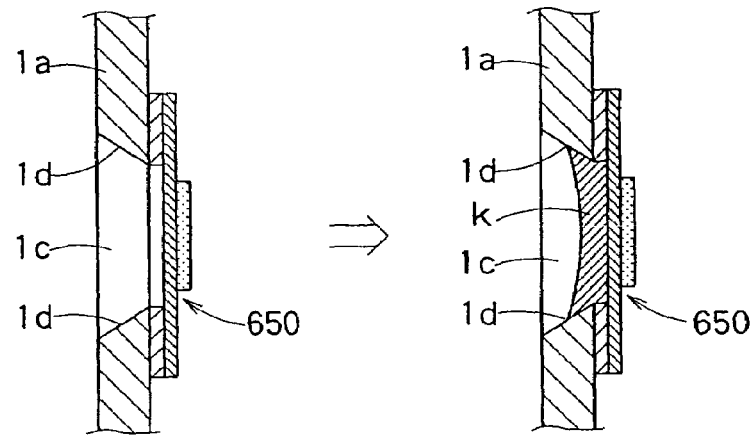
FIGS. 23A to 23C are cross sectional views showing other embodiments of the through hole 1c.
Figure 23B:
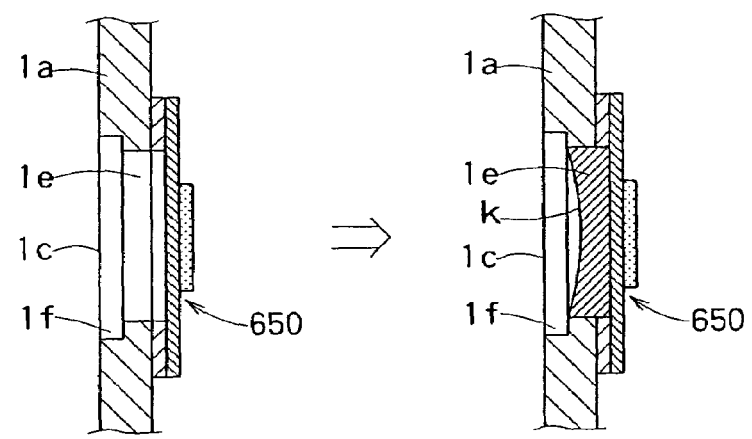
Figure 23C:
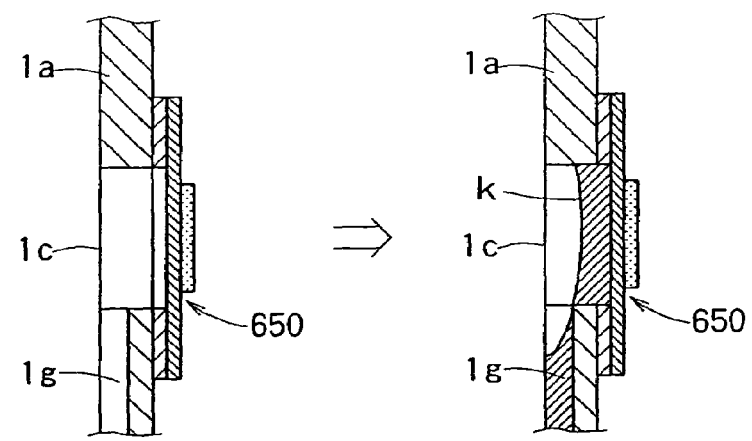

FIGS. 23A to 23C show another embodiment of the through hole 1c. In each of FIGS. 23A to 23C, a condition wherein an ink K doesn't exist in the through hole 1c is shown on the left side, and a condition wherein the ink K remains in the through hole 1c is shown on the right side. In the above embodiment shown in FIGS. 22A to 22C, a side surface of the through hole 1c is perpendicular to the base wall. In FIG. 23A, a side surface 1d of a through hole 1c is oblique in a vertical direction, so that the side surface 1d is enlarged inwardly. In FIG. 23B, a side surface of a through hole 1c consists of an upper step portion 1f and a lower step portion 1e. The upper step portion 1f is wider than the lower step portion 1e. In FIG. 23C, the through hole 1c has a groove 1g extending in a direction in which the ink K is easily discharged, that is, a direction toward an ink supplying port 2.

According to the through holes 1c shown in FIGS. 23A to 23c, the amount of the ink K in the ink stagnant area can be reduced. Thus, M'cav explained with reference to FIGS. 1 and 2 can be made smaller than M'max. Thus, a characteristic of the vibration of the actuator 650 in an ink-end condition may be very different from that in an ink-remaining condition wherein an amount of the ink K sufficient for a printing operation remains in the container 1. Therefore, the ink-end condition can be surely detected.

FIG. 24 is a perspective view of another embodiment of the actuator. An actuator 660 has a packing member 76 outside the through hole 1c of the vibrating plate 72. Caulking holes 77 are formed at an outside periphery of the actuator 660. The actuator 660 is fixed to a container 1 by caulking via the caulking holes 77.

FIGS. 25A and 25B are a perspective view and a cross sectional view of another embodiment of the actuator, respectively. In the embodiment, an actuator 670 has a concave-forming substrate 80 and a piezoelectric device 82. A concave 81 is formed on one side surface of the concave-forming substrate 80 by an etching process or the like. The piezoelectric device 82 is attached on the other side surface thereof. A base portion of the concave 81 among the concave-forming substrate 80 serves as a vibrating area. Thus, a vibrating area of the actuator 670 is defined by a periphery of the concave 81.

The actuator 670 is similar to a structure wherein the substrate 178 and the vibrating plate 176 are integrally formed in the actuator 106 shown in FIG. 1. In the case, manufacturing steps for manufacturing the ink cartridge can be reduced and/or shortened, so that manufacturing cost can be reduced. Preferably, a size of the actuator 670 is suitable for the actuator 670 to be buried in the through hole 1c provided in the container 1. Thus, the concave 81 can serve as a cavity. The actuator 106 shown in FIG. 1 may be formed in such a manner that the actuator 106 can be buried in the through hole 1c, similarly to the actuator 670 shown in FIG. 25.

Figure 26:
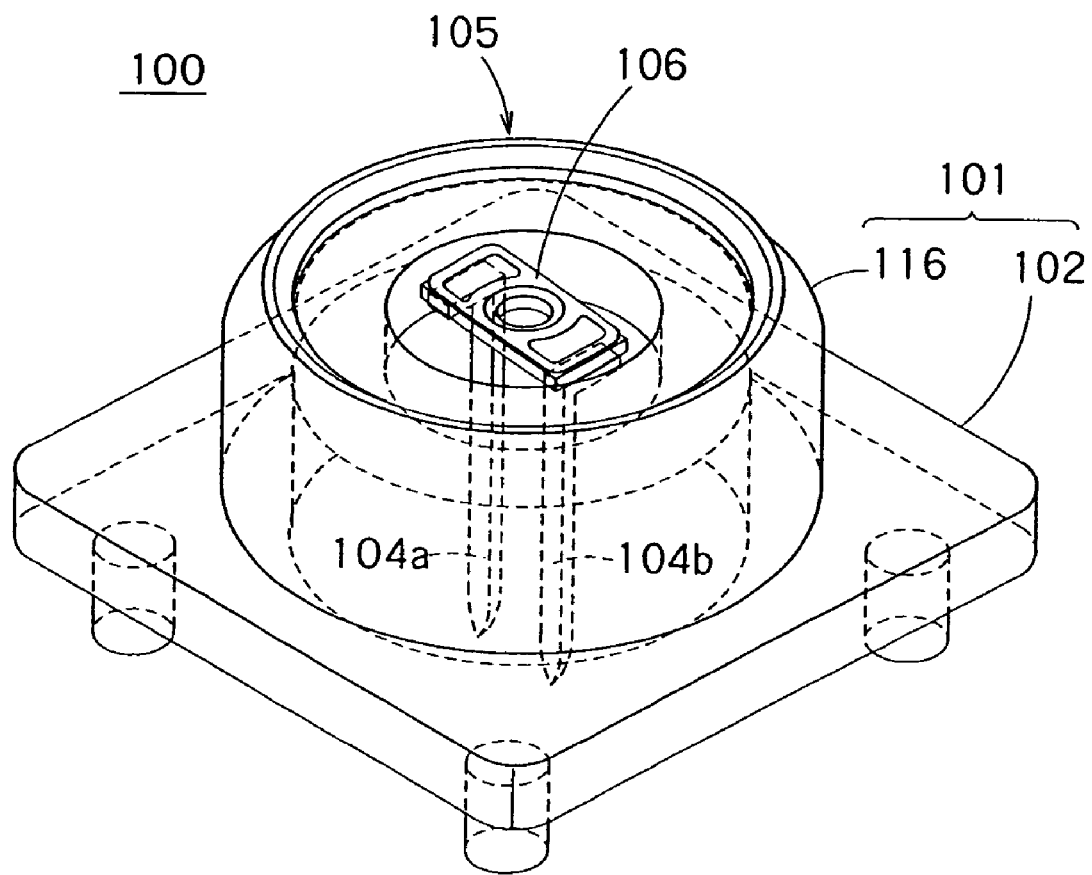
FIG. 26 is a perspective view showing the module 100.

FIG. 26 is a perspective view showing a constitution wherein the actuator 106 is formed integrally as a module 100. The module 100 is mounted at a predetermined location of a container 1 of an ink cartridge. The module 100 is structured so as to detect at least changes in the acoustic impedance in an ink solution, thereby detect the consumption condition of the liquid in the container 1.

The module 100 of this embodiment has a mount portion 101 for mounting the actuator 106 to the container 1. The mount portion 101 has a substrate 102 having an almost rectangular surface, and a column 116 on the substrate 102, the column 116 containing the actuator 106 that can be vibrated by a driving signal. When the module 100 is mounted on the ink cartridge, the actuator 106 of the module 100 is structured so as not to be touched from outside. Thus, the actuator 106 can be protected from external touch. The edge of the column 116 on the top side is rounded, so that it can be easily fit at the time of mounting into the through hole formed in the ink cartridge.

FIG. 27 is an exploded view of the module 100 shown in FIG. 26. The module 100 includes the mount portion 101 made of resin, a plate 110, and a receiving portion 105 having a concavity 113 (see FIG. 26). Furthermore, the module 100 has lead wires 104a and 104b, the actuator 106, and a film 108. It is preferable that the plate 110 is formed from a rust-proof material such as stainless steel or stainless steel alloy.

In the column 116 and the substrate 102 included in the mount portion 101, an opening 114 is formed at the center thereof so as to house the lead wires 104a and 104b. The concavity 113 is formed around the opening 114 so as to house the actuator 106, the film 108, and the plate 110.

The actuator 106 is joined to the plate 110 via the film 108, and the plate 110 and the actuator 106 are fixed to the concavity 113 (mount portion 101). Therefore, the lead wires 104a and 104b, the actuator 106, the film 108, and the plate 110 are attached integrally to the mount portion 101.

The lead wires 104a and 104b are respectively joined to the upper electrode and lower electrode of the actuator 106, transfer a driving signal to the piezoelectric layer, and transfer a signal of resonance frequency detected by the actuator 106 to the recording apparatus or the like.

The actuator 106 temporarily vibrates on the basis of a driving signal transferred from the lead wires 104a and 104b. After the active vibration, residual vibration of the actuator 106 is started so that a counter electromotive force is generated. At this time, by detecting a vibration cycle of the counter electromotive force waveform, a resonance frequency corresponding to a liquid consumption condition in the liquid container can be detected.

The film 108 bonds the actuator 106 to the plate 110 so as to make the actuator liquid-tight. It is preferable to form the film 108 by polyolefin or the like and to bond by thermal fusion. Since the actuator 106 and the plate 110 are bonded in a surface-to-surface manner via the film 108, there is less variation in the bonded area. Thus, a portion other than the vibrating part may not vibrate. Therefore, the vibration characteristic of the actuator 106 does not change even if the actuator 106 is bonded to the plate 110.

In the case, the plate 110 is circular, and the opening 114 of the substrate 102 is formed cylindrically. The actuator 106 and the film 108 are formed rectangularly. The lead wires 104a and 104b, the actuator 106, the film 108, and the plate 110 may be attached to the substrate 102 in a removable manner. The substrate 102, the lead wires 104a and 104b, the actuator 106, the film 108, and the plate 110 are arranged symmetrically with respect to a central axis of the module 100. Further, the centers of the substrate 102, the actuator 106, the film 108, and the plate 110 are arranged almost on the central axis of the module 100.

The area of the opening 114 of the substrate 102 is formed larger than the area of the vibration area of the actuator 106. At the position, which is the center of the plate 110, facing the vibration part of the actuator 106, a through hole 112 is formed. As shown in FIGS. 1A to 2, the cavity 162 is formed in the actuator 106 and the through hole 112 and the cavity 162 form an ink stagnant area. It is preferable that the thickness of the plate 110 is smaller than the diameter of the through hole 112 so as to reduce the effect of residual ink. For example, it is preferable that the depth of the through hole 112 is equal to or less than ⅓ of the diameter thereof. The through hole 112 has an almost circular shape symmetrical about the central axis of the module 100. The area of the through hole 112 is larger than the area of the opening of the cavity 162. The periphery of a section of the through hole 112 may be tapered or stepped. The module 100 is mounted to the side wall, the top wall, or the bottom wall of the container 1 in such a manner that the through hole 112 is directed inward the container 1. When the ink is consumed and the ink around the actuator 106 is exhausted, the resonance frequency of the actuator 106 is changed greatly, so that changes in the ink level can be detected.

Figure 28:
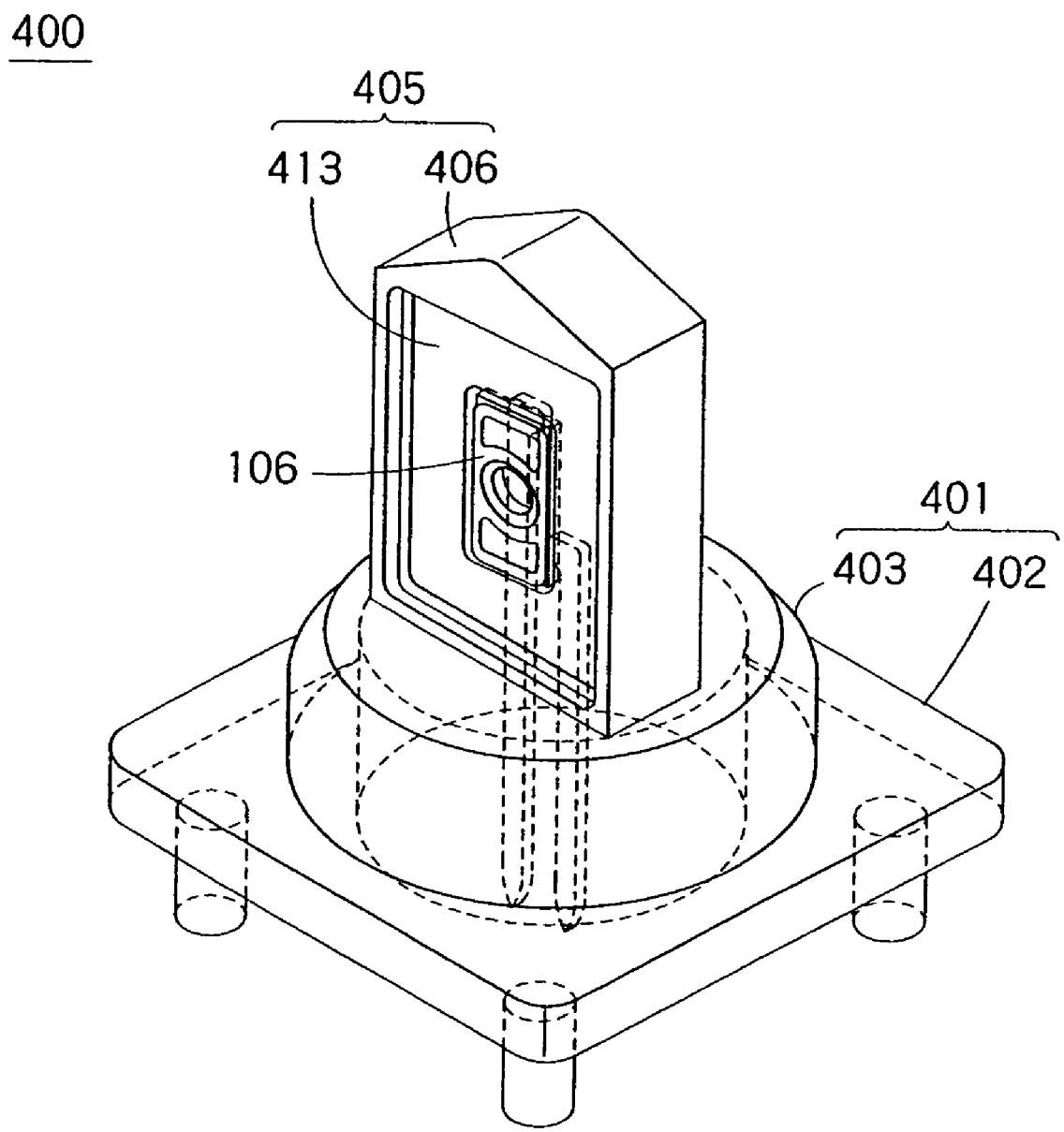
FIG. 28 is a perspective view showing another embodiment of the module.

FIG. 28 is a perspective view showing another embodiment of the module. In a module 400 of this embodiment, a receiving portion 405 is formed on a mount portion 401. The mount portion 401 has a substrate 402 having an almost square surface with round corners, and a cylindrical column 403 formed on the substrate 402. Further, the receiving portion 405 includes a plate element 406 erected on the column 403 and a concavity 413. In the concavity 413 formed on a side surface of the plate element 406, the actuator 106 is arranged in a vertical attitude. The top end of the plate element 406 is chamfered at a predetermined angle so as to be easily fit at the time of mounting in the through hole formed in the ink cartridge.

Figure 29:
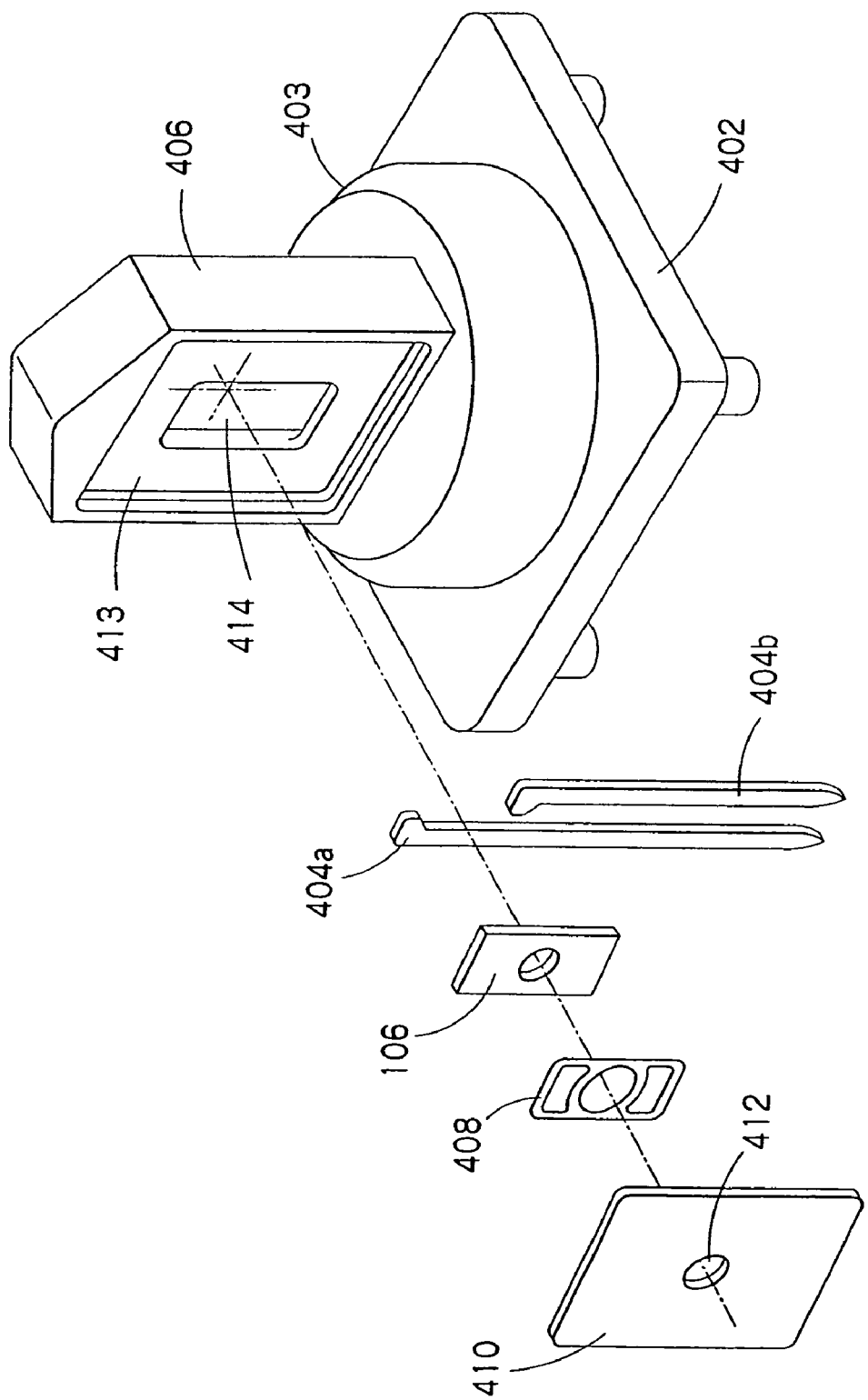
FIG. 29 is an exploded view showing constitution of the module shown in FIG. 28.

FIG. 29 is an exploded perspective view of the module 400 shown in FIG. 28. In the same way as with the module 100 shown in FIG. 26, the module 400 includes the mount portion 401 and the receiving portion 405. The mount portion 401 has the substrate 402 and the column 403, and the receiving portion 405 has the plate element 406 and the concavity 413. The actuator 106 is joined to a plate 410, and then fixed to the concavity 413. The module 400 further includes lead wires 404a and 404b, the actuator 106, and a film 408.

In this embodiment, the plate 410 is rectangular, and an opening 414 formed in the plate element 406 is also rectangular. The lead wires 404a and 404b, the actuator 106, the film 408, and the plate 410 may be attached to the substrate 402 in a removable manner. The actuator 106, the film 408, and the plate 410 pass the center of the opening 414 and are arranged symmetrically about a central axis extending perpendicularly to a surface of the opening 414. Further, the centers of the actuator 106, the film 408, and the plate 410 are arranged almost on the central axis of the opening 414.

The area of a through hole 412 formed at the center of the plate 410 is larger than the area of the opening of the cavity 162 of the actuator 106. The cavity 162 of the actuator 106 and the through hole 412 form an ink stagnant area. It is preferable that the thickness of the plate 410 is smaller than the diameter of the through hole 412. For example, the thickness may be set to ⅓ or less of the diameter of the through hole 412. The through hole 412 has an almost circle shape symmetrical about the central axis of the module 400. The periphery of a section of the through hole 412 may be tapered or stepped. The module 400 can be mounted to the bottom wall of the container 1 in such a manner that through hole 412 is arranged in the container 1. The actuator 106 is arranged in the container 1 so as to extend in a vertical direction perpendicular to the bottom wall. Thus, by changing the height of the substrate 402 and changing the height of the actuator 106 when it is arranged in the container 1, the setting of the point of time of an ink end condition can be easily changed.

Figure 30A:
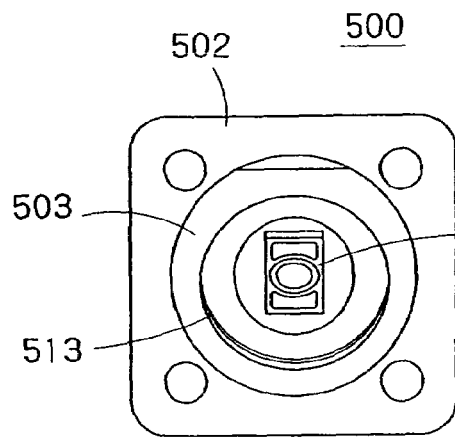
FIGS. 30A to 30C show still another embodiment of the module.
Figure 30C:
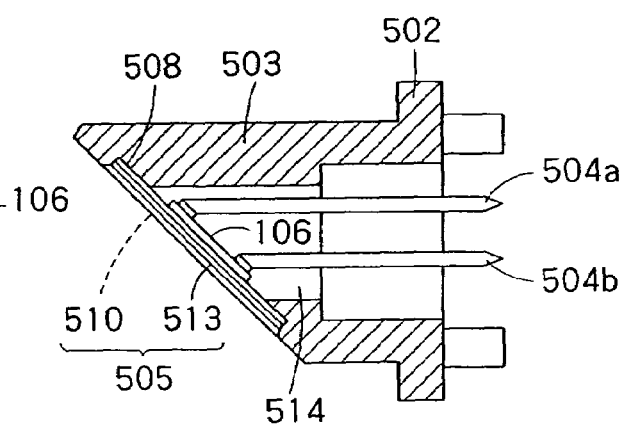
Figure 30B:
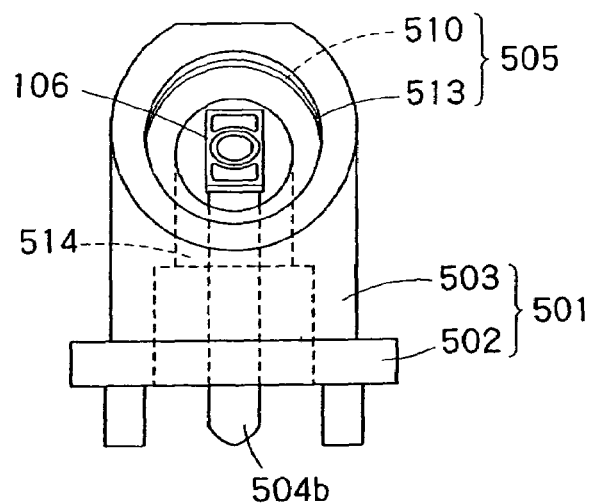

FIGS. 30A to 30C show still another embodiment of the module. In the same way as with the module 100 shown in FIG. 26, a module 500 shown in FIGS. 30A to 30C includes a mount portion 501 having a substrate 502 and a column 503. The module 500 further includes lead wires 504a and 504b, the actuator 106, a film 508, and a plate 510. In the substrate 502 included in the mount portion 501, an opening 514 is formed at the center thereof so as to house the lead wires 504a and 504b, and a concavity 513 is formed around the opening 514 so as to house the actuator 106, the film 508, and the plate 510. The actuator 106 is fixed to a receiving portion 505 via the plate 510. Therefore, the lead wires 504a and 504b, the actuator 106, the film 508, and the plate 510 are integrally attached to the mount portion 501.

In the module 500 of this embodiment, the column 503 whose top surface is vertically inclined is formed on the substrate 502 that has an almost square surface with round corners. The actuator 106 is arranged on the concavity 513 which is provided at the top surface of the column 503 slantwise in the vertical direction.

That is, the top end of the module 500 is inclined, and the actuator 106 is mounted on the inclined surface thereof. Therefore, when the module 500 is mounted on the bottom wall or the side wall of the container 1, the actuator 106 is inclined against the vertical direction of the container 1. It is desirable to set the inclination angle of the top end of the module 500 between about 30° and 60° from a viewpoint of detection performance.

The module 500 is mounted on the bottom wall or the side wall of the container 1 in such a manner that the actuator 106 is arranged in the container 1. When the module 500 is mounted on the side wall of the container 1, the actuator 106 is attached to the container 1 in such a manner that it is directed toward the top side, the bottom side, or a lateral side of the container 1 in an inclined state. On the other hand, when the module 500 is mounted on the bottom wall of the container 1, it is preferable that the actuator 106 is attached to the container 1 in such a manner that it is directed toward the ink-supplying-port side of the container 1 in an inclined state.

Figure 31:
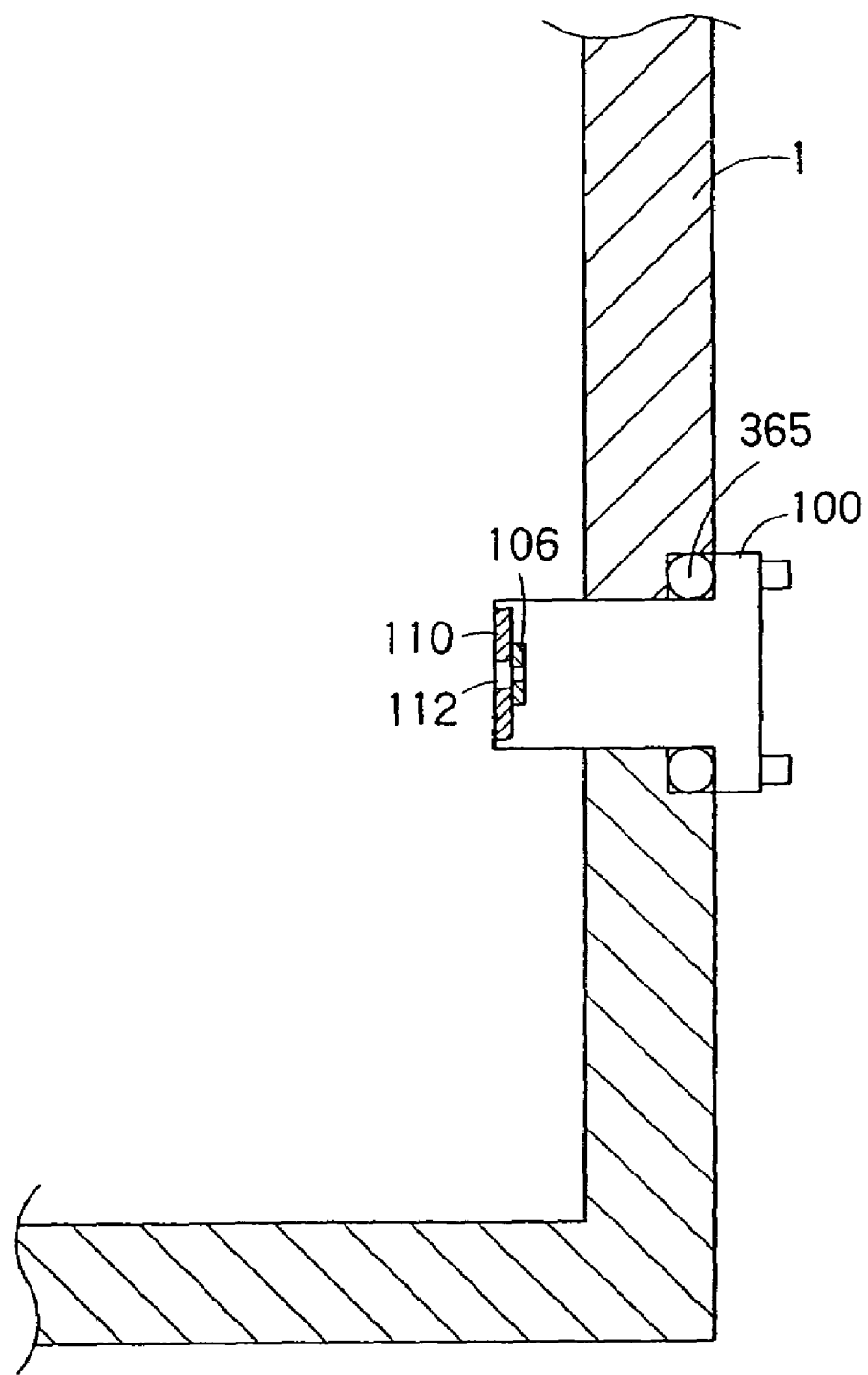
FIG. 31 is a drawing showing an example of the cross section when the module 100 shown in FIG. 26 is mounted to the ink container 1.

FIG. 31 is a cross sectional view of the neighborhood of the bottom of the ink container when the module 100 shown in FIG. 26 is mounted to the container 1. The module 100 is mounted so as to pass through the side wall of the container 1. At the junction between the side wall of the container 1 and the module 100, an O-ring 365 is provided so as to keep the module 100 and the container 1 liquid-tight. It is preferable that the module 100 has a column as explained in FIG. 26 so as to enable the sealing by the O-ring 365.

When the top end of the module 100 is inserted into the container 1, the ink in the container 1 comes in contact with the actuator 106 via the through hole 112 of the plate 110. A resonance frequency of residual vibration of the actuator 106 varies with whether the medium around the vibration part of the actuator 106 is a liquid or a gas, so that an ink consumption condition can be detected by using the module 100. In addition to the module 100, the module 400 shown in FIG. 28, the module 500 shown in FIGS. 30A to 30C, or modules 700A, 700B, 750A and 750B or a molded structure 600, which will be shown in FIGS. 32A to 33C next, may be mounted in the container 1 to detect the existence of the ink.

Figure 32A:
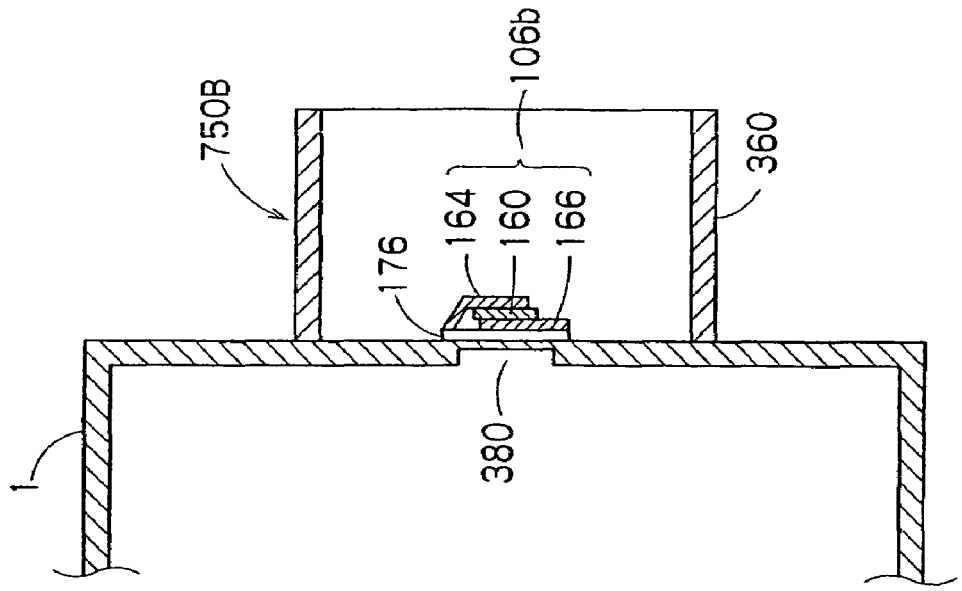
FIGS. 32A and 32B show other embodiments of the module.
Figure 32B:
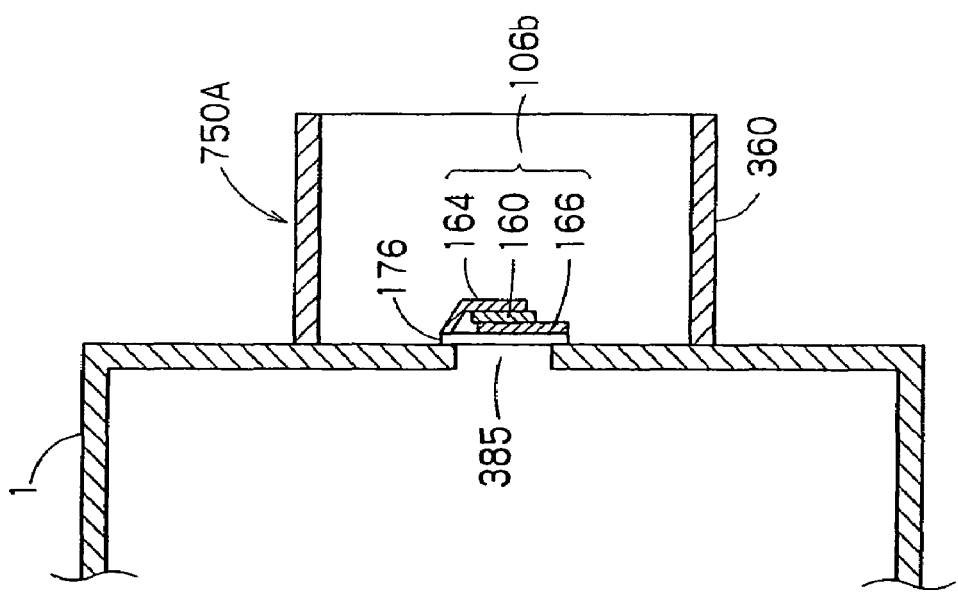

FIGS. 32A and 32B show other embodiments of the module body 100. The module body 750A has an actuator 106b and a mounting member 360. The module body 750A is attached to the container 1 in such a manner that a front surface of the module 750A substantially conforms to an inside surface of the side wall of the container 1. The actuator 106b includes the piezoelectric layer 160, the upper electrode 164, the lower electrode 166, and the vibrating plate 176. The lower electrode 166 is formed on the upper surface of the vibrating plate 176. The piezoelectric layer 160 is formed on the upper surface of the lower electrode 166 and the upper electrode 164 is formed on the upper surface of the piezoelectric layer 160. Therefore, the piezoelectric layer 160 is sandwiched between the upper electrode 164 and the lower electrode 166. The piezoelectric layer 160, the upper electrode 164 and the lower electrode 166 form a piezoelectric device. The piezoelectric device is formed on the vibrating plate 176. The piezoelectric device and the vibration area of the vibrating plate 176 are the vibrating part where the actuator actually vibrates. A through hole 385 is formed in the side wall of the container 1. Thus, the ink is contact with the vibrating plate 176 via the through hole 385.

Next, an operation of the module 750A shown in FIG. 32A is explained. The upper electrode 164 and the lower electrode 166 transmit a driving signal to the piezoelectric layer 160 and a resonance-frequency signal detected by the piezoelectric layer 160 to the recording apparatus. The piezoelectric layer 160 generates a vibration by the driving signal transmitted by the upper electrode 164 and the lower electrode 166, and then residual vibration remains. Due to the residual vibration, the piezoelectric layer 160 generates a counter electromotive force. Then, the vibration period of the counter electromotive force signal is counted so that the resonance frequency at that time is detected. Thus, it can be detected whether the ink exits or not.

As shown in FIG. 32A, in the module body 750A, the surface of the vibrating part of the actuator 106b opposite to the piezoelectric device, that is, only the vibrating plate 176 can be contact with the ink in the ink container 1. In the module 750A shown in FIG. 32A, embedding of the electrodes of the lead wires (104a, 104b, 404a, 404b, 504a, and 504b) shown in FIGS. 26 to 30C into the module is not required. As a result, the molding step is simplified. Further, the module 750A can be exchanged and recycled. In addition, the mounting member 360 protects the actuator 106b, so that the actuator 106 can be protected from external touch.

FIG. 32B shows another embodiment of the module body. The module body 750B shown in FIG. 32B has also an actuator 106b and a mounting member 360. The module body 750B is attached to the container 1 in such a manner that a front surface of the module 750B substantially conforms to an inside surface of the side wall of the container 1. The actuator 106b includes the piezoelectric layer 160, the upper electrode 164, the lower electrode 166, and the vibrating plate 176. The lower electrode 166 is formed on the upper surface of the vibrating plate 176. The piezoelectric layer 160 is formed on the upper surface of the lower electrode 166 and the upper electrode 164 is formed on the upper surface of the piezoelectric layer 160. Therefore, the piezoelectric layer 160 is sandwiched between the upper electrode 164 and the lower electrode 166. The piezoelectric layer 160, the upper electrode 164 and the lower electrode 166 form a piezoelectric device. The piezoelectric device is formed on the vibrating plate 176. The piezoelectric device and the vibration area of the vibrating plate 176 are the vibrating part where the actuator actually vibrates. A thin wall 380 is provided in the side wall of the container 1. As shown in FIG. 32B, in the module body 750B, the surface of the vibrating part of the actuator 106b opposite to the piezoelectric device, that is, only the vibrating plate 176 can be contact with the thin wall 380 in the ink container 1. Thus, the vibrating part of the actuator 106b vibrates residually together with the thin wall 380.

Next, an operation of the module 750B shown in FIG. 32B is explained. The upper electrode 164 and the lower electrode 166 transmit a driving signal to the piezoelectric layer 160 and a resonance-frequency signal detected by the piezoelectric layer 160 to the recording apparatus. The piezoelectric layer 160 generates a vibration by the driving signal transmitted by the upper electrode 164 and the lower electrode 166, and then vibrates residually with the resonance period. Because the vibrating plate 176 is contact with the thin wall 380 of the container 1, the vibrating part of the actuator 106b vibrates together with the thin wall 380. The inside surface of the thin wall 380 is contact with the ink. Thus, when the actuator 106b vibrates residually together with the thin wall 380, the resonance frequency and the amplitude of the residual vibration depend on the amount of the residual ink. Due to the residual vibration, the piezoelectric layer 160 generates a counter electromotive force. Then, the vibration period of the counter electromotive force signal is counted so that the resonance frequency at that time is detected. Thus, the amount of the residual ink can be detected.

In the module 750B shown in FIG. 32B, embedding of the electrodes of the lead wires (104a, 104b, 404a, 404b, 504a, and 504b) shown in FIGS. 26 to 30C into the module is not required. As a result, the molding step is simplified. Further, the module 750B can be exchanged and recycled. In addition, the mounting member 360 protects the actuator 106b, so that the actuator 106 can be protected from external touch.

FIG. 33A shows a cross sectional view of the ink container when the module 700B is mounted in the container 1. In the case of FIG. 33A, the module 700B is used as one of the mounting structures. The module 700B is mounted to the container 1 in such a manner that a mount portion 360 is projected into the container 1. A through hole 370 is formed in a mounting plate 350, and the through hole 370 and the vibration part of the actuator 106 are opposite to each other. Further, a hole 382 is formed in the bottom wall of the module 700B to form a receiving portion 363. The actuator 106b is arranged so as to block (seal) the hole 382.

Therefore, the ink is in contact with the vibrating plate 176 via the hole 382 of the receiving portion 363 and the through hole 370 of the mounting plate 350. The hole 382 of the receiving portion 363 and the through hole 370 of the mounting plate 350 form an ink stagnant area. The receiving portion 363 and the actuator 106b are fixed by the mounting plate 350 and a film member. At the connecting part of the mount portion 360 and the container 1, a sealing structure 372 is installed. The sealing structure 372 may be formed by a plastic material such as synthetic resin or may be formed by an O-ring. The module 700B and the container 1 shown in FIG. 33A are formed independently with each other. However, as shown in FIG. 33B, the receiving portion of the module 700B may be composed of a part of the container 1.

The module 700B shown in FIG. 33A does not require embedding of the lead wires shown in FIGS. 26 to 30C into the module. As a result, the molding step is simplified. Further, the module 700B can be exchanged and recycled.

The ink may adhere to the top wall or the side wall of the container 1 when the ink cartridge is vibrated or swung. The adhering ink may drop from the top wall or the side wall of the container 1 and may come in contact with the actuator 106, so that the actuator 106 may malfunction. However, if the mount portion 360 of the module 700B is projected into the container 1, the actuator 106 will not malfunction due to the ink dropping from the top wall or the side wall of the container 1.

According to the embodiment shown in FIG. 33A, the vibrating plate 176 and a portion of the mounting plate 350 are mounted in the container 1 in such a manner that they alone come in contact with the ink in the container 1.

FIG. 33B shows a cross sectional view of an ink container of another embodiment when the actuator 106b is mounted in the container 1. In the ink cartridge of the embodiment shown in FIG. 33B, a protective member 361 is attached to the container 1 separately from the actuator 106b. Therefore, the protective member 361 and the actuator 106 are not integrated as a module. However, the protective member 361 can protect the actuator 106b from being touched by user's hand. A hole 380 is formed in the side wall of the container 1 correspondingly to a front surface of the actuator 106.

The actuator 106b includes the piezoelectric layer 160, the upper electrode 164, the lower electrode 166, the vibrating plate 176, and the mounting plate 350. The vibrating plate 176 is formed on the upper surface of the mounting plate 350, and the lower electrode 166 is formed on the upper surface of the vibrating plate 176. The piezoelectric layer 160 is formed on the upper surface of the lower electrode 166, and the upper electrode 164 is formed on the upper surface of the piezoelectric layer 160. Therefore, the main part of the piezoelectric layer 160 is sandwiched between the main part of the upper electrode 164 and the main part of the lower electrode 166. The circular parts, which are the respective main parts of the piezoelectric layer 160, the upper electrode 164, and the lower electrode 166, form a piezoelectric device. The piezoelectric device is formed on the vibrating plate 176. The piezoelectric device and the vibration area of the vibrating plate 176 are the vibrating part where the actuator actually vibrates. The through hole 370 is formed in the mounting plate 350. Therefore, the ink is in contact with the vibrating plate 176 via the hole 380 of the container 1 and the through hole 370 of the mounting plate 350. The hole 380 of the container 1 and the through hole 370 of the mounting plate 350 form an ink stagnant area. According to the embodiment shown in FIG. 33B, the actuator 106b is protected from contact with the outside by the protective member 361.

The actuator 106b and the mounting plate 350 shown in the examples in FIGS. 33A and 33B can be replaced with the actuator 106 having the substrate 178 shown in FIGS. 1A and 1B.

FIG. 33C shows an embodiment having a molded structure 600 including the actuator 106b. This embodiment uses the molded structure 600 as a mounting structure. The molded structure 600 has the actuator 106b and a molding part 364. The actuator 106b and the molding part 364 are integrally formed. The molding part 364 is formed by a plastic material such as silicone resin. The molding part 364 is formed so as to have two legs extended from the actuator 106b. Each of the legs of the molding part 364 has a lead wire 362 therein. To fix the molding part 364 and the container 1 in a liquid-tight manner, the ends of the two legs of the molding part 364 are formed semispherically outside the container 1. The molding part 364 is mounted to the container 1 in such a manner that the actuator 106b is projected into the container 1. Thus, the vibrating part of the actuator 106b comes in contact with the ink in the container 1. The upper electrode 164, the piezoelectric layer 160 and the lower electrode 166 of the actuator 106b are protected from contact with the ink by the molding part 364.

The molded structure 600 shown in FIG. 33C does not require the sealing structure 372 between the molding part 364 and the container 1, so that the ink hardly leaks from the container 1. Further, the molded structure 600 is not projected outward from the container 1, so that the actuator 106b is protected from contact with the outside. In the molded structure 600, the molding part 364 is projected into the container 1, so that the actuator 106 will not malfunction even if the ink drops from the top wall or the side wall of the container 1.

In the above embodiments, each module body has one actuator. However, each module body may have two actuators. FIG. 34 schematically shows such a case. If the module body 4000 shown in FIG. 34 is used, as shown in FIG. 35, the liquid surface level can be controlled extremely precisely to a predetermined level LL, as mentioned above with reference to FIGS. 10 and 11. In addition, equipment can be made more compact and accuracy of its positioning can be improved, compared with a case wherein two actuators are independently arranged.

The above explanation is given to the carriage and the ink cartridge mounted on the carriage, that is, not integrally formed with the carriage, when the actuator 106 is attached to the carriage or the ink cartridge. However, the actuator may be attached to an ink tank integrally formed with the carriage, which ink tank may be mounted on an ink-jet recording apparatus together with the carriage. In addition, the actuator 106 may be attached to an off-carriage type of ink tank, which is not integrally formed with the carriage and is adapted to supply ink to the carriage via a tube or the like. Furthermore, the actuator may be attached to a part corresponding to an ink cartridge of a replaceable structure wherein a recording head and an ink container are integrally formed.

In addition, the recording apparatus controllers 2000, 2004 and 2006 and/or each component thereof and the controlling unit 840c (see FIG. 15) can be materialized by a computer system. A program for materializing the component or the like in the computer system, and a storage medium 201 (see FIG. 5) storing the program capable of being read by a computer, should be protected by the application as well.

If the above component or the like is materialized by a second program such as OS executed by a computer system, a program including a command for controlling the second program to materialize it and/or a storage medium 202 storing the program capable of being read by a computer, should be protected by the application as well.

The storage medium 201, 202 may be not only a substantial object such as a floppy disk or the like, but also a network for transmitting various signals.

The liquid may be glue, nail polish or the like, instead of the ink.

In each of the embodiments mentioned above, it is preferable that the vibration part and/or the cavity is structured as an ink-philic (liquid-philic) part. Such a case will be explained by referring to FIGS. 36 to 40.

Figure 36:
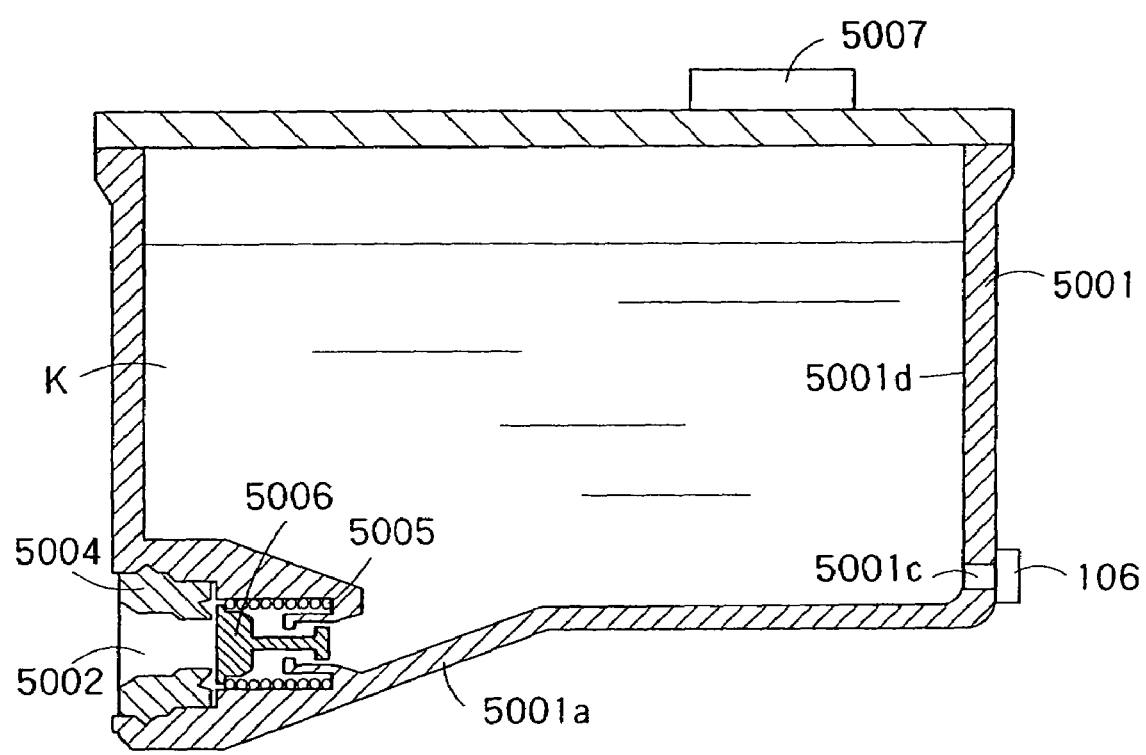
FIG. 36 is a cross sectional view of an embodiment of the ink cartridge for black ink.

FIG. 36 is a cross sectional view of an embodiment of an ink cartridge for black ink. In a container body 5001 for containing ink, an ink feed port 5002, which is adapted to be connected to an ink feed needle of a recording apparatus, is installed. On a side surface in the neighborhood of a bottom 5001a of a container body 5001, for example, an actuator 106 as shown in FIG. 1 is attached so as to come in contact with inner ink via a through hole 5001c.

So as to change the medium in contact with the actuator 106 from the ink to a gas at a stage of almost consumption of the ink K, that is, at a stage (at the point of time) of an ink-near-end condition, the actuator 106 is installed at a position slightly above the ink feed port 5002. It is possible to install a means for generating vibration independently and use the actuator 106 just as a detection means.

Figure 37:
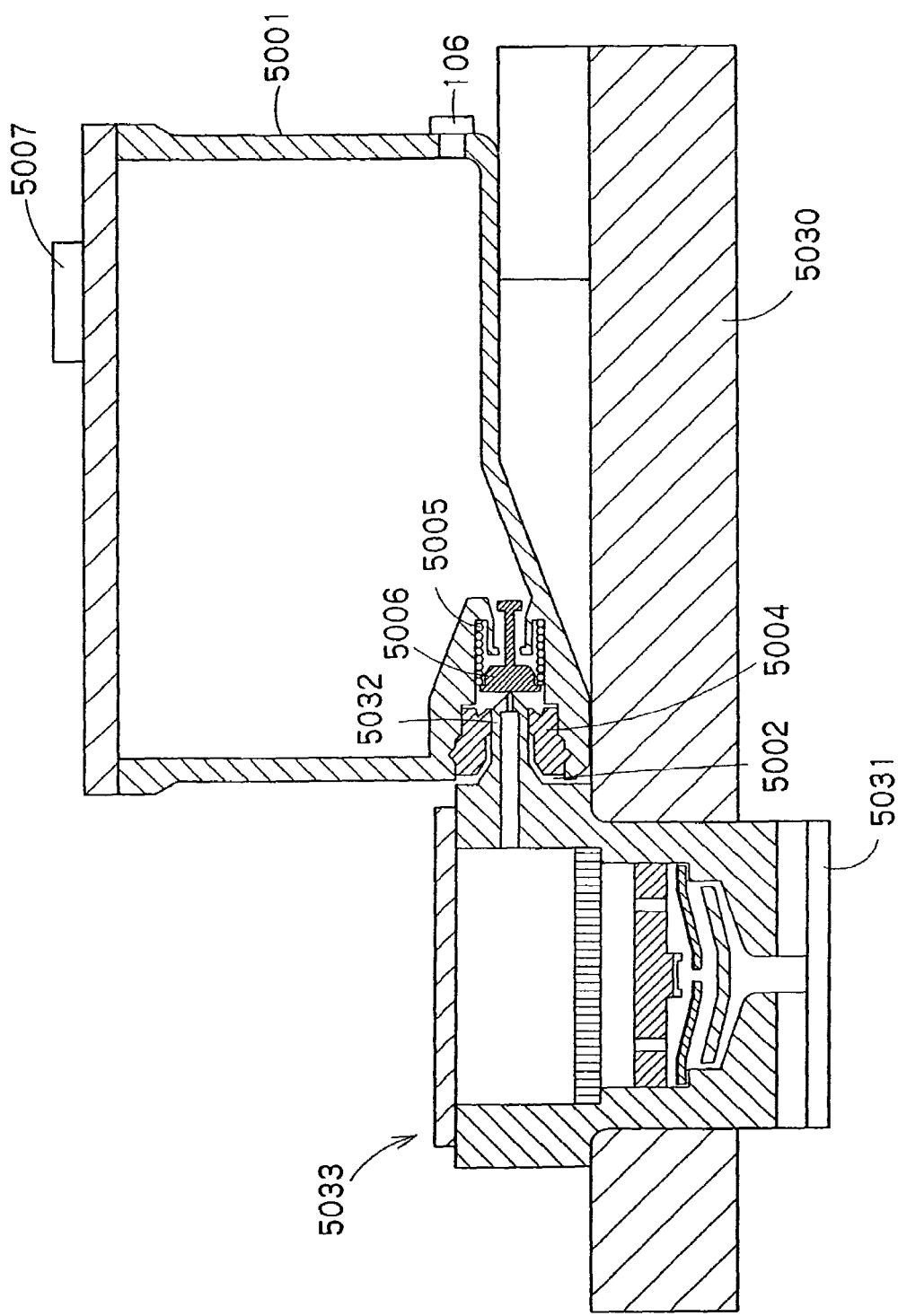
FIG. 37 is a cross sectional view showing a main part of an ink-jet recording apparatus suitable for the ink cartridge shown in FIG. 36.

As shown in FIGS. 36 and 37, in the ink feed port 5002, a packing 5004 and a valve body 5006 are installed. Particularly, as shown in FIG. 37, the packing 5004 is liquid-tightly joined to an ink feed needle 5032 interconnecting to a recording head 5031. The valve body 5006 is always contacted with the packing 5004 elastically by a spring 5005.

When the ink feed needle 5032 is inserted, the valve body 5006 is pressed by the ink feed needle 5032 to open an ink flow path, so that the ink in the container body 5001 is fed to the recording head 5031 via the ink feed port 5002 and the ink feed needle 5032.

As shown in FIG. 37, a carriage 5030 movable back and forth in a width direction of a recording paper has a subtank unit 5033. The recording head 5031 is installed on the bottom of the subtank unit 5033. The ink feed needle 5032 is installed on the ink cartridge loading side of the subtank unit 5033. On the upper wall of the container body 5001, a semiconductor storage unit 5007 storing information concerning ink in the ink cartridge is mounted.

Figure 38A:
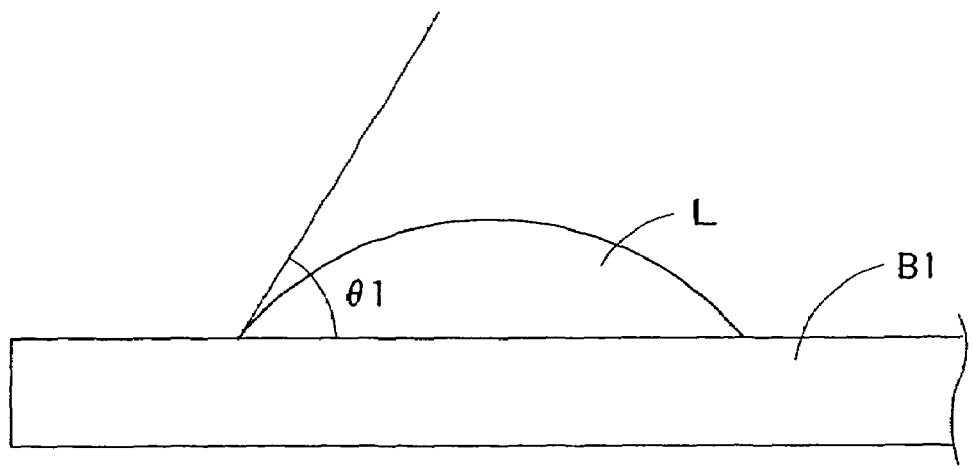
FIGS. 38A and 38B are views for explaining a liquid-philic material and a liquid-phobic material with respect to a liquid.
Figure 38B:
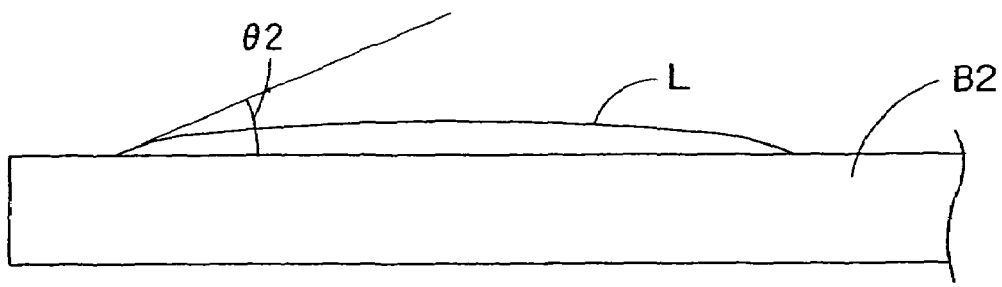

FIGS. 38A and 38B are drawings for explaining a liquid-phobic material B1 and a liquid-philic material B2. The liquid-philic nature means affinity with an optional liquid to be contained in the liquid container and includes hydrophilic nature, lipophilic (oil-philic) nature, ultra-hydrophilic nature, and ultra-oil-philic nature.

As shown in FIGS. 38A and 38B, the contact angle (rising angle) $\theta 1$ when a liquid L is in contact with a liquid-phobic material B1 is larger than the contact angle $\theta 2$ when the liquid L is in contact with a liquid-philic material B2. That is, the liquid-philic nature affects the contact angle of the concerned liquid (the liquid concerned with the liquid-philic nature). The contact angle $\theta 2$ with the liquid-philic material B2 is comparatively acute. In this embodiment, the contact angle of the liquid L with the liquid-philic part is about 30 degrees or less. It is preferable that the contact angle is closer to 0 degrees for the reason which will be described later.

The liquid-philic part can be formed by making the material itself liquid-philic, or by performing a surface roughening process to the material, or by covering the material with a liquid-philic material. A highly liquid-philic material generally has small liquid surface tension in the relationship with the concerned liquid.

FIG. 39A is an enlarged view of the neighborhood of the actuator 106 shown in FIG. 36. FIG. 39B is a drawing similar to FIG. 39A for comparison and explanation of a case having no liquid-philic part.

In FIG. 39B, no liquid-philic part is provided. Therefore, if ink is locally adhered to a vibration area 176a when there is no ink around the actuator 106, an ink drop M may be stagnated. Thereby, the actuator 106 may detect existence of the ink by mistake, although there is no ink.

On the other hand, when at least the vibration area 176a in contact with the ink among a vibration plate 176 is included in the liquid-philic part, even if the ink is locally adhered to the vibration area 176a when there is no ink around the actuator 106, the contact angle of the concerned ink is small, and the concerned ink only stays thinly on a surface of the vibration area 176a, and most ink flows down without staying. Therefore, detection of existence of the ink by the actuator is not affected practically.

Vaporized ink is also prevented from dew condensation in the vibration area 176a due to a temperature difference between an outside and an inside of the ink cartridge. Even in a case of dew condensation of ink, the contact angle of ink is small, so that the ink just stays thinly on the surface of the vibration area 176a. Therefore, the actuator 106 can not detect existence of the ink by mistake although there is no ink. Further, the ink staying on the surface of the vibration area 176a included in the liquid-philic part is very thin, so that it is not shown in FIG. 39A.

It is also preferable to make the periphery of the vibration area 176a liquid-philic. For example, it is preferable to make an inner side surface 161a of a cavity 162 liquid-philic. Furthermore, a back side surface 178a of a substrate 178 facing on an inner side of the container body 1 may be made liquid-philic (ink-philic). It is also preferable to make not only the actuator 106 but also the through hole 5001c of the container body 5001 and an inner wall 5001d of the container body 5001 liquid-philic. When the periphery of the vibration area 176a is made liquid-philic, the ink adhered thereto by mistake may not stay in the cavity 162 and the through hole 5001c.

Furthermore, if the cavity 162 or the through hole 5001c is made liquid-philic, when the ink cartridge is to be replenished (recharged) with ink, an effect is produced that the ink is easily introduced into the cavity 162 or the through hole 5001c. As a result, the ink can be easily refilled into the ink cartridge without using a particular method. Therefore, when the actuator 106 arranged in the ink cartridge mounted in the ink-jet recording apparatus detects an ink end condition, a user can easily replenish the ink cartridge with the ink. Namely, the ink cartridge can be recycled easily.

In FIG. 39(A), the cavity 162 and the through hole 5001c are designed so as to prevent the ink from staying in the cavity 162 or the through hole 5001c after the ink surface level has passed through the actuator 106. However, the cavity 162 or the through hole 5001c may be designed so as to make the ink positively remain in the cavity 162 or the through hole 5001c. For example, when the cavity 162 or the through hole 5001c is made liquid-philic and a capillary force acting at the cavity 162 or the through hole 5001c is used, the ink can be made to remain easily in the cavity 162 or the through hole 5001c.

When the ink is made to positively remain in the cavity 162 or the through hole 5001c, the following advantage can be obtained. Namely, even if the liquid container swings and the liquid surface level waves, since the ink remains in the cavity 162 or the through hole 5001c, ink drops do not adhere locally to the vibration area of the actuator 106. Accordingly, malfunctions of the actuator can be prevented.

Assuming a condition wherein that a liquid in the liquid container remains in the cavity 162 or the through hole 5001c as a threshold value of existence of the liquid, when there is no liquid around the cavity 162 and the amount of the liquid in the cavity 162 or the through hole 5001c is smaller than the threshold value, the condition may be judged to be a liquid-not-existence condition, and when there is a liquid around the cavity 162 or the through hole 5001c and the amount of the liquid is larger than the threshold value, the condition may be judged to be a liquid-existence condition.

In such a case, even when the ink in the cavity is dried and exhausted, the condition can be judged to be a liquid-not-existence condition. Further, even if the ink is adhered to the cavity again due to swing or vibration of the carriage when the ink in the cavity is exhausted, since the amount of liquid does not exceed the threshold value, the condition can be judged to be a liquid-not-existence condition.

As another modified example, all the portions in contact with the ink in the ink cartridge including the actuator 106, the container body 5001 and the ink feed port 5002 may be made liquid-philic.

When the whole of the inside surface of the ink cartridge is made liquid-philic, the inside of the ink cartridge can be easily cleaned by a predetermined cleaning liquid suited to the liquid-philic nature. More in detail, after the ink cartridge is used, it can be cleaned by a liquid of the liquid-philic nature.

It is preferable that this predetermined cleaning liquid is a liquid having higher affinity to the inner wall of the ink cartridge and the actuator 106 than the ink contained in the container body 5001. For example, when an aqueous ink remains in the ink cartridge, it is preferable to clean the inside of the ink cartridge with an oily cleaning liquid having higher affinity thereto. The kind of cleaning liquid is not limited as far as the cleaning liquid has a higher liquid-philic nature than the ink to the inner wall of the ink cartridge and the actuator.

Since the cleaning liquid has a higher liquid-philic nature than the ink to the inner wall of the ink cartridge and the actuator 106, it becomes easily conformed to (concordant with) the inner wall of the ink cartridge and the actuator 106. Therefore, old ink and impurities remaining in the ink cartridge can be washed away simply. Furthermore, it is preferable that the boiling point of a cleaning liquid is lower so that the ink cartridge can be dried easily after cleaning.

Further, the ink itself to be recharged in the ink cartridge may be used as a predetermined cleaning liquid. Even in such a case, the ink cartridge can be recycled without stagnating impurities in the container body 5001.

Furthermore, if the actuator 106 is made liquid-philic, when the ink is replenished in the container body 5001, the ink becomes easily conformed to the actuator 106. Accordingly, the ink can be introduced easily into the cavity of the actuator 106. Therefore, when the ink cartridge including the container body 5001 replenished with the ink is mounted on the ink-jet recording apparatus, the actuator 106 may not detect an ink-non-existence condition by mistake.

As mentioned above, a liquid-philic part may be formed so as to make the ink remain in the cavity 162 or the through hole 5001c when the ink in the ink cartridge is consumed. For example, the vibration area 176a and the inner side surface 161a of the cavity 162 are made liquid-philic, and the opening 161 is structured in such a size that a capillary force can act. In this case, the ink may be easily introduced into the cavity 162, and when the cavity 162 is filled with the ink once, the ink is held by the capillary force. Therefore, the ink in the ink cartridge is consumed and even when there is no ink around the actuator 106, the ink remains in the cavity 162. Furthermore, when the through hole 5001c is formed in such a size that the capillary force can act, the ink can remain not only in the cavity 162 but also in the through hole 5001c.

Furthermore, for example, in order to make the ink remain in the cavity 162, it is possible to make the inside surface of the cavity 162 liquid-philic and make the substrate back surface 178a around the cavity 162 liquid-phobic.

The liquid-phobic nature means a phobic nature with respect to an optional liquid to be contained in the liquid container and includes the hydrophobic nature, lipophobic (oil-phobic) nature, water repellency, oil repellency, water release nature, oil release nature, ultra-hydrophobic nature, ultra-lipophobic (ultra-oil-phobic) nature, ultra-water repellency, ultra-oil repellency, ultra-water release nature, and ultra-oil release nature. The contact angle of the liquid with the liquid-phobic part is 60 degrees or higher and preferably closer to 180 degrees.

In addition, in order to make the ink remain in the through hole 5001c, it is possible to make the inside of the cavity 162, the substrate back surface 178a and the inner wall of the through hole 5001c ink-philic and to make the inner side surface 5001d around the through hole 5001c ink-phobic.

When the inside of the cavity 162 or the through hole 5001c is made ink-philic and the periphery of the cavity 162 or the through hole 5001c is made ink-phobic, the ink surely remains in the cavity 162 or the through hole 5001c. Furthermore, the ink can be prevented from adhering to the periphery of the portion where the ink is caused to remain.

A case wherein it is preferable to design so as to make a liquid in the liquid container remain in the cavity 162 is indicated below.

Depending on the mounting position and/or the mounting angle of the actuator to the liquid container, even if the surface level of a liquid in the liquid container is lower than the mounting position of the actuator, the liquid may be adhered to the vibration area of the actuator. If the actuator detects existence of the liquid only by existence of the liquid in the vibration area, the liquid adhered to the vibration area of the actuator may disturb accurate detection of existence of the liquid. For example, when the liquid surface level is lower than the mounting position of the actuator, if the liquid container swings due to a reciprocating motion of the carriage, and hence the liquid waves, and liquid drops are adhered to the vibration area, the actuator may judge by mistake that there is sufficient liquid in the liquid container.

Therefore, inversely, when a cavity designed so as to accurately detect existence of the liquid even if the liquid remains therein is positively installed, even if the liquid container swings and thus the liquid surface level waves, malfunctions of the actuator can be prevented. By making the inside of the cavity liquid-philic and positively making the liquid remain in the cavity, the actuator can be effectively prevented from malfunctions.

In this case, a condition wherein the ink is consumed so much that the ink surface level passes through the actuator 106 and the liquid in the liquid container remains in the cavity 162 of the actuator 106 is assumed as a threshold value with respect to existence of the liquid. Namely, when there is no liquid around the cavity 162 and the amount of the liquid in the cavity is smaller than the threshold value, the condition may be judged to be an ink-not-existence condition. When there is a liquid around the cavity 162 and the amount of the liquid is larger than the threshold value, the condition may be judged to be an ink-existence condition.

For example, if the actuator 106 is mounted to a side wall of the liquid container, when the liquid surface level in the liquid container is lower than the mounting position of the actuator 106, the amount of the liquid in the cavity is smaller than the threshold value, so that the actuator 106 detects an ink-not-existence condition. When the liquid surface level in the liquid container is higher than the mounting position of the actuator 106, the amount of the liquid in the cavity is larger than the threshold value, so that the actuator 106 detects an ink-existence condition. By setting the threshold value as described above, even when the ink in the cavity is dried and exhausted, the condition can be judged to be an ink-not-existence condition. Further, even if the ink is adhered to the cavity again due to swing or vibration of the carriage when the ink in the cavity is exhausted, since the amount of liquid does not exceed the threshold value, the condition can be judged to be an ink-non-existence condition.

In addition, if the cavity 162 is made liquid-philic and the ink is caused to remain only in the cavity 162 after the ink surface level passes through the mounting level of the actuator 106, the amount of ink remaining in the cavity 162 can be used as a threshold value. If the cavity 162 and the through hole 5001c are made liquid-philic and the ink is caused to remain in the cavity 162 and the through hole 5001c, the amount of ink remaining in the cavity 162 and the through hole 5001c can be used as a threshold value.

Whether or not to make the ink remain in the cavity 162 and/or the through hole 5001c can be properly decided depending on purpose of use and/or a mounting position or the like of the actuator 106.

Figure 40A:
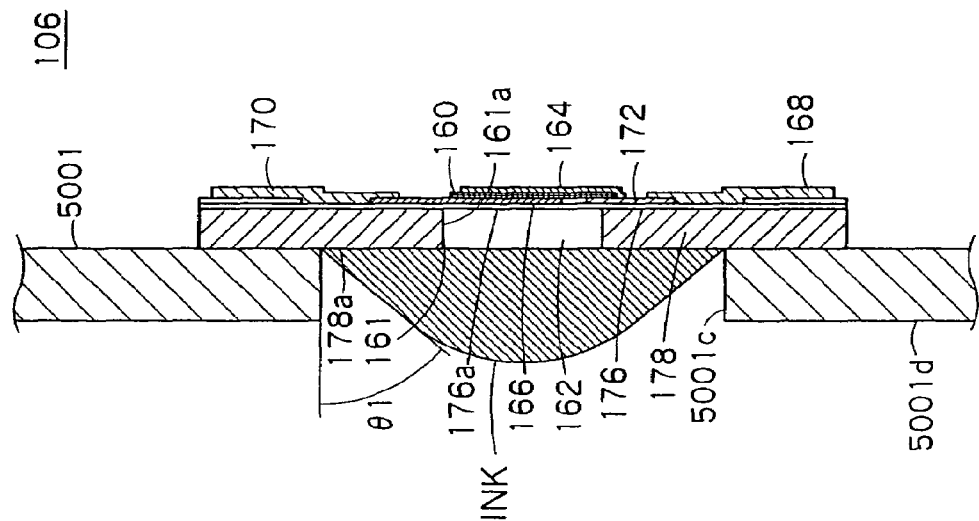
FIGS. 40A and 40B are enlarged views of the neighborhood of the actuator.
Figure 40B:
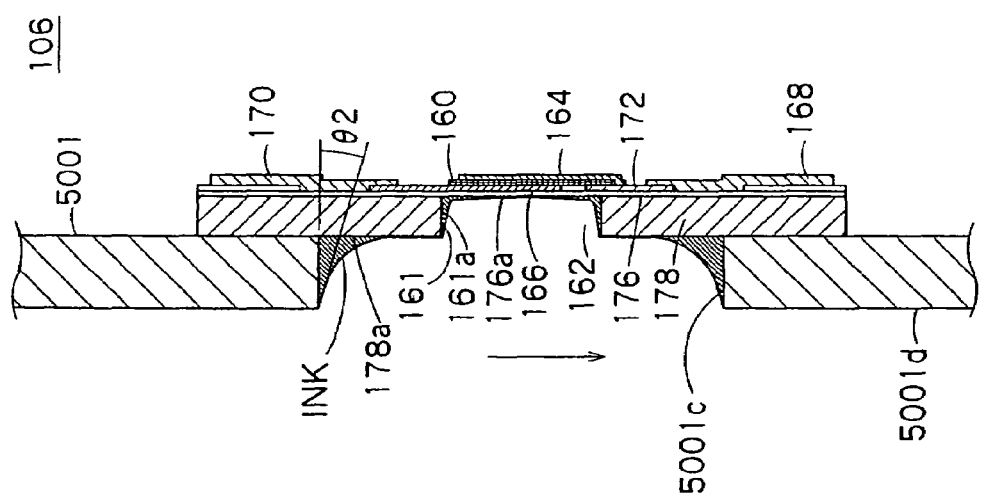

FIG. 40A is an enlarged view of the neighborhood of the actuator 106 shown in FIG. 36, and it shows a case wherein ink drops are adhered only to the actuator 106 and its periphery. FIG. 40B is a view similar to FIG. 40A for explaining a case having no liquid-philic part. In the case shown in FIG. 40A, the portion in contact with the ink in the ink cartridge is formed by a liquid-philic material or covered with a liquid-philic material.

In the case shown in FIG. 40A, the contact angle θ2 of the ink with the wall surface of the ink cartridge is comparatively small and acute. Therefore, even if the ink is adhered to the area of the through hole 5001c where the actuator 106 is arranged, the ink becomes conformed to the liquid-philic part, that is, the ink only stays thinly on a surface of the liquid-philic part and most ink flows down without staying. As a result, the ink does not stay at the area of the through hole 5001c. The contact angle θ2 is about 20 degrees or lower and preferably closer to 0 degrees.

On the other hand, in the cartridge shown in FIG. 40B, no liquid-philic process is performed, so that the contact angle θ1 of the ink with the wall surface of the ink cartridge is comparatively large, for example, within a range from about 30 degrees to about 60 degrees. Therefore, when the ink is adhered to the area of the through hole 5001c where the actuator 106 is arranged, the ink can stay on the area of the through hole 5001c.

Therefore, in the ink cartridge shown in FIG. 40B, there is a possibility that the actuator 106 may misdetect existence of the ink although there is practically no ink in the ink cartridge.

On the other hand, as mentioned above, in the ink cartridge shown in FIG. 40A, there is no possibility that the actuator 106 may misdetect existence of the ink although there is practically no ink in the ink cartridge.

Next, a liquid-philic material will be explained. Needless to say, a liquid-philic material for forming a liquid-philic part is not limited. Therefore, an optional liquid-philic material can be used. As a strongly liquid-philic material, for example, a material on which a photocatalyst has been covered and then ultraviolet rays have been irradiated, an inorganic material, a material having an activated surface, a hydrophilic epoxy compound, a material containing fine silica particles, a compound having two or more functional groups selected from a carboxyl group, a phenolic hydroxyl group, and an epoxy group in a molecule thereof, and so on may be cited.

As a material of the photocatalyst mentioned above, a titanium oxide photocatalyst may be considered. More in detail, anatase-type titania and rutile-type titania may be cited. When these materials are coated on a predetermined part and irradiated with ultraviolet rays, a liquid-philic part can be formed.

As a material containing silica particles, a material wherein colloidal silica is dispersed and stabilized in water or an organic solvent may be considered. For example, there is a material in that inorganic silica is added to a resin containing a hydroxyl group or an amino group. As a resin containing the hydroxyl group, acrylic resin, polyvinyl alcohol resin, epoxy resin, and so on may be cited. As a resin containing the amino group, amide resin and amino resin may be cited. Resins may be mixed so as to contain both of the hydroxyl group and the amino group, or may be compounded at the time of synthesis. More in detail, acrylic amide resin, methacrylic amide resin, amino acrylic resin, epoxy amide resin, and amino expoxy resin may be cited. When a hydroxyl group equivalent of resin, an amino group equivalent of resin, or a functional group equivalent when both the hydroxyl group equivalent and the amino group equivalent are considered as the functional group, are 3000 or less, the liquid-philic nature is particularly satisfactory.

Furthermore, a material wherein an organic silane compound has been reacted with a resin containing a hydroxyl group, a resin containing an amino group, or a resin containing both a hydroxyl group and an amino group may be used as a liquid-philic material.

A method of covering a surface of a predetermined base material with a liquid-philic material is not limited. Therefore, an optional method for covering a base material with a liquid-philic material may be used. As such a method, for example, there are a plating process, a coating process, a depositing process, and so on. Alternatively, by using the other known optional arts, a liquid-philic material can be covered.

As a concrete example of coating process, a spin coating process wherein a liquid-philic material is dropped before or during rotation of a liquid-philic part and a coating process is executed by the rotation of the liquid-philic part, a dip coating process wherein a coating process is executed by immersing a liquid-philic part in a liquid-philic material, and a roll coating process wherein a coating process is executed by applying a liquid-philic material to a liquid-philic part by using a roll member; are available. Further, a liquid-philic material may be coated on a liquid-philic part by using a brush or the like.

On the other hand, a liquid-phobic part may be formed by attaching a coating layer formed from a liquid-phobic material on a predetermined area.

As a deposition process, there are a CVD process, a plasma CVD process, a sputtering process, and a vacuum deposition process available.

Further, the surface roughness of a material may affect the liquid-philic nature. For example, by performing a surface roughening process for a material having a large contact angle, the liquid-philic nature of the material can be enhanced. Further, for example, when a material is a liquid-philic material having a fractal structure, by increasing the roughness of a surface thereof, an ultra-hydrophilic surface or an ultra-lipophilic surface may be formed. Therefore, it is preferable to perform a surface roughening process to a surface of a liquid-philic material having the fractal structure, thereby form a liquid-philic part. Needless to say, if a material can be made liquid-philic by performing a surface roughening process, it is not limited to a material having the fractal structure.

When the actuator 106 is installed in any of various module bodies 100, 400, 500, and 700, it may be preferable to form a liquid-philic part also on an ink contact part of the module body.

Next, a manufacturing method of an ink cartridge having a liquid-philic part will be explained in detail. Here, an example of manufacturing method of an ink cartridge having the module body 100 shown in FIG. 26 will be explained.

In a first manufacturing method, firstly, the actuator 106 is set in a predetermined jig in such a manner that the cavity 162 is exposed. Next, the area not to be made liquid-philic is masked. Then, the predetermined jig with the actuator 106 set in is attached to a device for forming a liquid-philic part, and the inside of the cavity 162 is processed to be made liquid-philic (for example, a liquid-philic material is covered or plated thereon). Thereafter, the actuator 106 is attached to the module body 100. Then, the module body 100 with the actuator 106 attached is mounted (arranged) to the ink cartridge.

The predetermined jig is formed, for example, from a resin or a metallic material in such a manner that a hole is formed in an area corresponding to the cavity 162. The aforementioned masking process can be carried out by using a thermoplastic resin. For example, all the portions other than the cavity 162 may be masked.

According to this method, a liquid-philic part can be formed only in the actuator 106, Further, at the time of forming the liquid-philic part, only the actuator 106 is handled. Therefore, equipment for giving a liquid-philic nature can be made comparatively small. Thereby, the cost for manufacturing the same ink cartridge can be reduced.

In a second manufacturing method, firstly, the actuator 106 is attached to the module body 100. Next, the module body 100 is set in a predetermined jig in such a manner that the cavity 162 of the actuator 106 is exposed. Then, the predetermined jig with the module body 100 set in is attached to a device for forming a liquid-philic part, and then a necessary masking process is executed, and the inside of the cavity 162 and/or the module body 100 around the cavity 162 is processed to be made liquid-philic (for example, a liquid-philic material is covered or plated thereon). Thereafter, the module body 100 is mounted to the ink cartridge.

According to this method, the liquid-philic process can be performed to the portion of the module body 100 around the cavity 162 of the actuator 106, simultaneously with to the inside of the cavity 162. Thus, the inside of the cavity 162 and the portion of the module body 100 around it can be made liquid-philic suitably.

In a third manufacturing method, firstly, the actuator 106 is attached to the module body 100. Next, the module body 100 is mounted to the ink cartridge. Then, the ink cartridge itself is set in a predetermined jig in such a manner that the cavity 162 of the actuator 106 is exposed. Thereafter, the predetermined jig is attached to a device for forming a liquid-philic part, and then a necessary masking process is executed, and the inside of the cavity 162, the portion of the module body 100 around the cavity 162, and/or the inside of the ink cartridge are made liquid-philic (for example, a liquid-philic material is covered or plated thereon).

According to this method, the liquid-philic process can be performed at the same time to the actuator 106, the module body 100 and/or the inside of the ink cartridge. Thus, the inside of the cavity 162, the module body 100 around it, and moreover the inside of the ink cartridge can be made liquid-philic suitably.

In this case, when the ink is filled or refilled at the time of manufacture or recycle of the ink cartridge, the ink can be surely brought into contact with the piezoelectric device fully.

Figure 41:
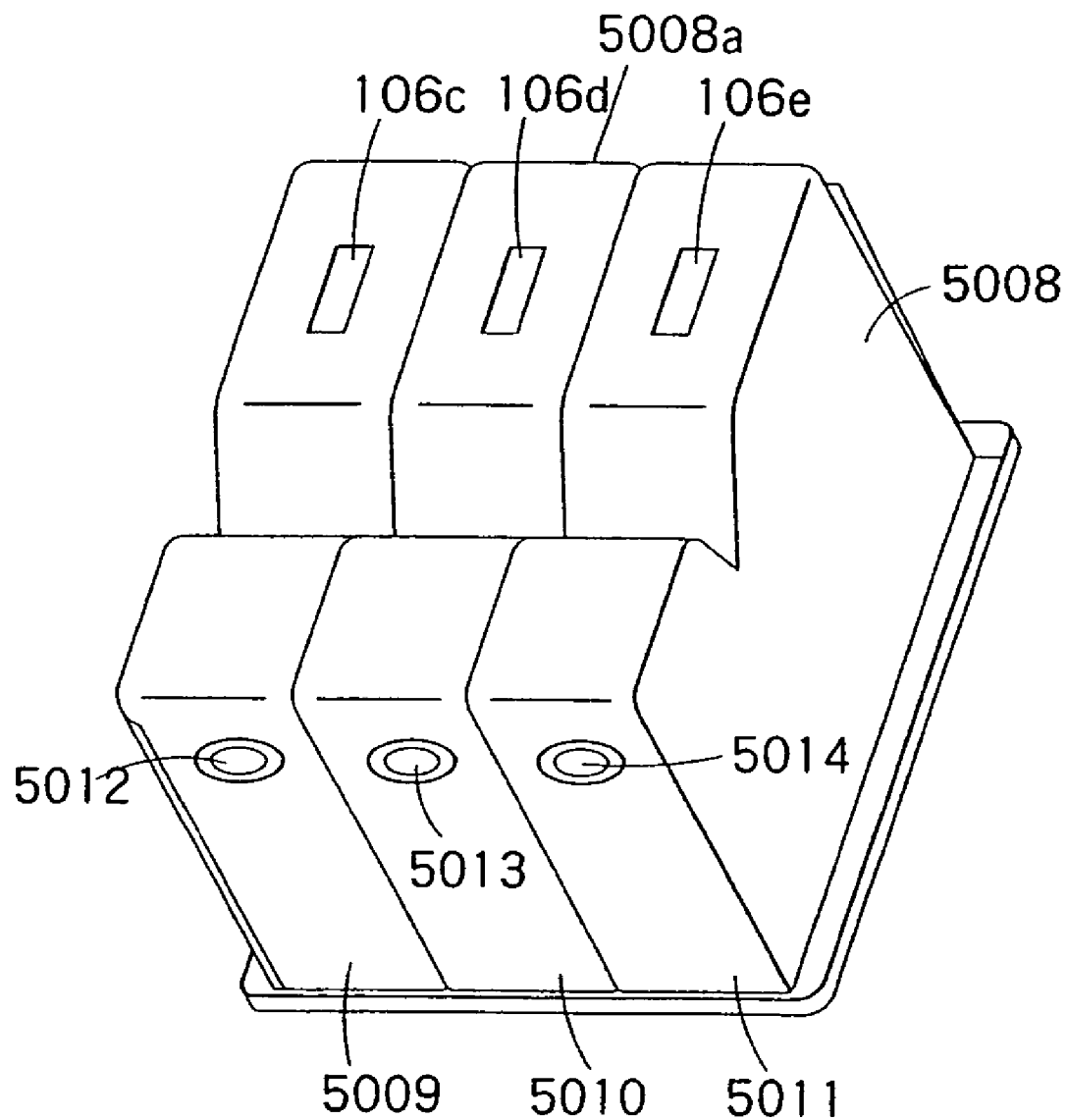
FIG. 41 is a perspective view of an embodiment of the ink cartridge for containing a plurality of kinds of ink, as seen from a back side thereof.

FIG. 41 is a perspective view of an embodiment of an ink cartridge for containing a plurality of kinds of ink, as seen from a back side thereof. A container 5008 is divided into three ink chambers 5009, 5010, and 5011 by partitions. In the respective ink chambers, ink feed ports 5012, 5013, and 5014 are formed, respectively. Actuators 106c, 106d, and 106e are attached to respective bottoms 5008a of the respective ink chambers 5009, 5010, and 5011, in such a manner that the actuators can transmit an elastic wave to ink contained in the respective ink chambers via the container 5008. Regarding the inside of the container 5008 of the ink cartridge or the actuators 106c, 106d, and 106e in this embodiment, it is preferable to make a portion or portions in contact with the ink liquid-philic.

The embodiments of the present invention are explained above. The scope of the present invention is not limited to the range described in the embodiments aforementioned. Various changes or improvements can be applied to the embodiments aforementioned. It is obvious from the description in the claims that any configuration to which such various changes or improvements are applied is included in the scope of the present invention.

According to a feature of the invention, a liquid-full condition of the containing space can be detected highly reliably. This feature is very effective for a liquid replenishment operation to fill the containing space to a liquid-full condition.

Alternatively, according to a feature of the invention, a liquid-full condition and a liquid-end condition of the containing space can be detected highly reliably. This feature is very effective for a liquid replenishment operation to fill the containing space to a liquid-full condition after a liquid-end condition has been detected.

Alternatively, according to a feature of the invention, it can be detected highly reliably whether a liquid surface level in the containing space exists in a predetermined area defined by the two vibrating parts or not. This feature is very effective for maintaining a liquid surface level at a substantially fixed point to maintain a liquid-head pressure at a substantially fixed point.

The invention claimed is:

1. A detector of liquid consumption condition comprising;
   a first vibrating part that can vibrate relatively to a containing space that can be filled and refilled with a liquid, at least a portion of the first vibrating part being exposed to the containing space through a first opening formed in a wall part defining the containing space, the first opening determining an area of the first vibrating part,
   a first piezoelectric device that can cause the first vibrating part to vibrate based on a driving signal and that can generate a counter electromotive force signal based on a residual vibration of the first vibrating part depending on a liquid consumption condition,
   a second vibrating part that can vibrate relatively to the containing space, at least a portion of the second vibrating part being exposed to the containing space through a second opening formed in the wall part defining the containing space, the second opening determining an area of the second vibrating part,
   a second piezoelectric device that can cause the second vibrating part to vibrate based on a driving signal and that can generate a counter electromotive force signal based on a residual vibration of the second vibrating part depending on the liquid consumption condition, and
   a liquid consumption condition detecting part that can detect the liquid consumption condition based on the counter electromotive force signal from at least one of the piezoelectric devices,
   wherein:
   the containing space can contain only a predetermined volume of the liquid,
   the first vibrating part and the first piezoelectric device are provided in a vicinity of a liquid surface in the containing space when the containing space contains the predetermined volume of the liquid, and
   the second vibrating part and the second piezoelectric device are provided in a vicinity of a liquid surface in the containing space when the liquid is exhausted from the containing space.

2. A detector of liquid consumption condition according to claim 1, wherein:
   the liquid consumption condition detecting part is adapted to detect the liquid consumption condition based on a relative relationship between the two counter electromotive force signals from the first piezoelectric device and the second piezoelectric device.

3. A detector of liquid consumption condition according to claim 1, wherein:
   the liquid consumption condition detecting part is adapted to measure a frequency of the counter electromotive force signal.

4. A detector of liquid consumption condition according to claim 3, wherein:
   the liquid consumption condition detecting part has a counter that can count the number of vibrations in the counter electromotive force signal for a predetermined time, and
   the liquid consumption condition detecting part is adapted to measure the frequency of the counter electromotive force signal, based on the number counted by the counter.

5. A detector of liquid consumption condition according to claim 3, wherein:
   the liquid consumption condition detecting part has a clock-counter that can measure a time for which the counter electromotive force signal vibrates a predetermined number of times, and
   the liquid consumption condition detecting part is adapted to measure the frequency of the counter electromotive force signal, based on the time measured by the clock-counter.

6. A liquid container comprising;
   a wall part defining a containing space that can contain a liquid in a refillable manner,
   a first vibrating part that can vibrate relatively to the containing space, at least a portion of the first vibrating part being exposed to the containing space through a first opening formed in the wall part, the first opening determining an area of the first vibrating part,
   a first piezoelectric device that can cause the first vibrating part to vibrate based on a driving signal and that can generate a counter electromotive force signal based on a residual vibration of the first vibrating part depending on a liquid consumption condition,
   a second vibrating part that can vibrate relatively to the containing space, at least a portion of the second vibrating part being exposed to the containing space through a second opening formed in the wall part, the second opening determining an area of the second vibrating part, and
   a second piezoelectric device that can cause the second vibrating part to vibrate based on a driving signal and that can generate a counter electromotive force signal based on a residual vibration of the second vibrating part depending on the liquid consumption condition,
   wherein:
   the containing space can contain only a predetermined volume of the liquid,
   the first vibrating part and the first piezoelectric device are provided in a vicinity of a liquid surface in the containing space when the containing space contains the predetermined volume of the liquid, and
   the second vibrating part and the second piezoelectric device are provided in a vicinity of a liquid surface in the containing space when the liquid is exhausted from the containing space.

* * * * *